(12) United States Patent
Suzuki et al.

(10) Patent No.: US 8,332,361 B2
(45) Date of Patent: Dec. 11, 2012

(54) DATA PROCESSING SYSTEM AND STORAGE SUBSYSTEM PROVIDED IN DATA PROCESSING SYSTEM

(75) Inventors: Toro Suzuki, Odawara (JP); Yusuke Hirakawa, Odawara (JP); Yoshihiro Asaka, Odawara (JP); Shuji Kondo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/327,613

(22) Filed: Dec. 15, 2011

(65) Prior Publication Data

US 2012/0089779 A1 Apr. 12, 2012

Related U.S. Application Data

(63) Continuation of application No. 12/107,139, filed on Apr. 22, 2008, now Pat. No. 8,103,630, which is a continuation of application No. 11/303,764, filed on Dec. 15, 2005, now Pat. No. 7,421,435, which is a continuation of application No. 10/972,246, filed on Oct. 21, 2004, now Pat. No. 7,395,265.

(30) Foreign Application Priority Data

Aug. 27, 2004 (JP) ................................. 2004-248256
Aug. 27, 2004 (JP) ................................. 2004-248320

(51) Int. Cl.
*G06F 17/30* (2006.01)
(52) U.S. Cl. ........ 707/660; 707/661; 711/112; 711/114; 711/161; 711/162; 714/5
(58) Field of Classification Search .................. 707/640, 707/661
See application file for complete search history.

(56) References Cited

U.S. PATENT DOCUMENTS

| 5,544,347 | A | * | 8/1996 | Yanai et al. | 711/162 |
|---|---|---|---|---|---|
| 5,692,155 | A | * | 11/1997 | Iskiyan et al. | 711/162 |
| 5,734,818 | A | * | 3/1998 | Kern et al. | 714/20 |
| 6,209,002 | B1 | * | 3/2001 | Gagne et al. | 1/1 |
| 6,654,752 | B2 | * | 11/2003 | Ofek | 1/1 |
| 7,149,859 | B2 | * | 12/2006 | Fujibayashi | 711/162 |
| 2003/0126107 | A1 | * | 7/2003 | Yamagami | 707/1 |

FOREIGN PATENT DOCUMENTS

| JP | 2000-259505 A | 9/2000 |
|---|---|---|
| JP | 2003-122509 A | 4/2003 |
| JP | 2004-013367 A | 1/2004 |

OTHER PUBLICATIONS

Japan Patent Office (JPO) office action for JPO patent application JP2004-248256 (Feb. 23, 2010).

* cited by examiner

*Primary Examiner* — Son T Hoang
(74) *Attorney, Agent, or Firm* — Kilpatrick Townsend & Stockton LLP

(57) ABSTRACT

A first storage subsystem 100A includes a first storage device 6A1 and one or more second storage devices 6A2, 6A3. A second storage subsystem 100B comprises a third storage device 6B1 and a fourth storage device 6B2. A third storage subsystem 100C comprises a fifth storage device 6C1 and a sixth storage device 6C2. The first storage subsystem 100A generates a data set, stores the generated data set in the second storage devices 6A2, 6A3, and transmits the data set to the second and third storage subsystems 100B, 100C. Each of the second and third storage subsystems 100B, 100C stores the received data set in the third storage device 6B1 or fifth storage device 6C1, reads a data set from the third or fifth storage device 6B1, 6C1, and stores the write data within the data set in the fourth storage device 6B2 or sixth storage device 6C2.

12 Claims, 40 Drawing Sheets

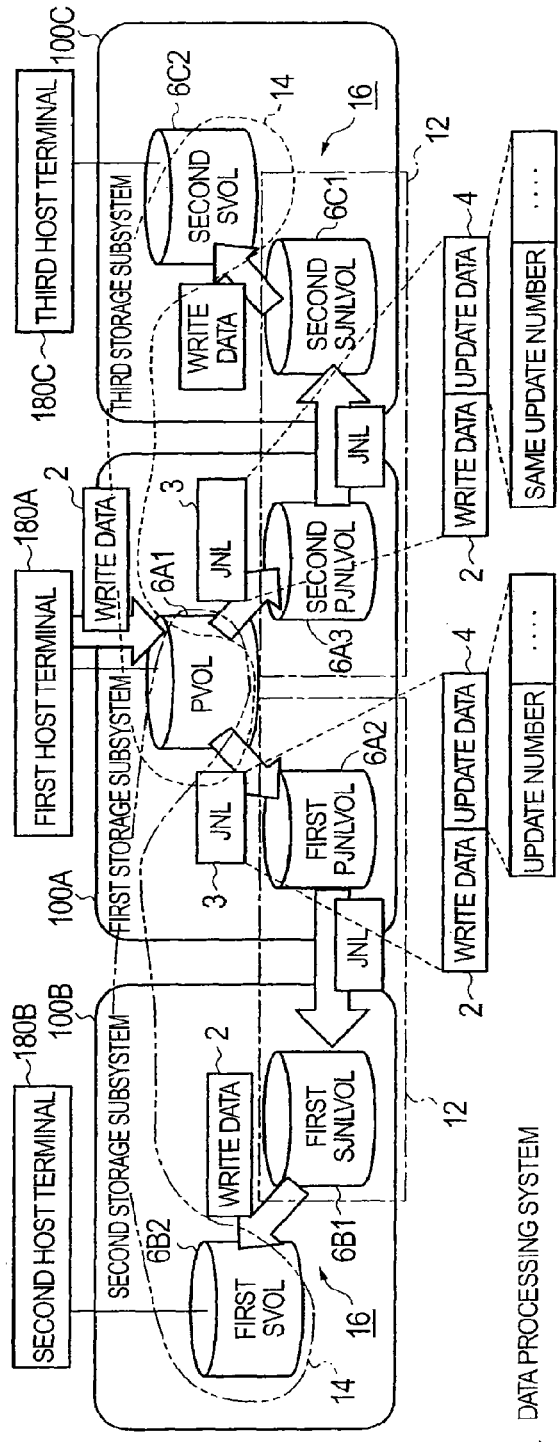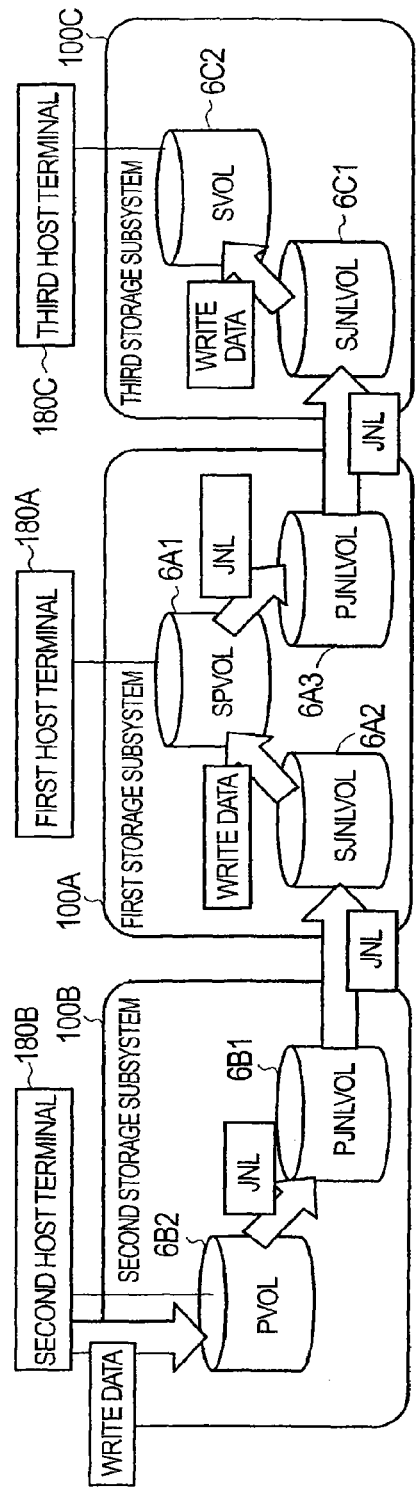

FIG. 2

| SETTING ITEM | EXAMPLE OF SETTING VALUE |
|---|---|
| WRITE COMMAND RECEPTION TIME | 1999/3/17 22:20:10 |
| UPDATE NUMBER | 4 |
| LOGICAL ADDRESS OF WRITE COMMAND | VOLID:1<br>POSITION FROM TOP OF VOL STORAGE AREA: 700 |
| DATA SIZE (KB) OF WRITE DATA | 300 |
| LOGICAL ADDRESS OF JNLVOL STORING WRITE DATA | VOLID:4<br>POSITION FROM TOP OF VOL STORAGE AREA: 1500 |

FIG. 6A

| VOL ID | VOL CONDITION | FORMAT | VOL CAPACITY (GIGABYTES) | PHYSICAL ADDRESS | |
|---|---|---|---|---|---|
| | | | | STORAGE DEVICE ID | POSITION FROM TOP |
| 1 | PRIMARY | OPEN3 | 3 | 1 | 0 |
| 2 | NORMAL | OPEN6 | 6 | 1 | 3 |
| 3 | UNUSED | OPEN6 | 6 | 1 | 9 |
| 4 | PRIMARY | OPEN9 | 9 | 2 | 0 |
| 5 | PRIMARY | OPEN3 | 9 | 2 | 9 |
| .. | .. | .. | .. | .. | .. |

400A VOLUME MANAGEMENT DATA

FIG. 6B

| VOL ID | VOL CONDITION | FORMAT | VOL CAPACITY (GIGABYTES) | PHYSICAL ADDRESS | |
|---|---|---|---|---|---|
| | | | | STORAGE DEVICE ID | POSITION FROM TOP |
| 1 | PRIMARY, SECONDARY | OPEN3 | 3 | 1 | 0 |
| 2 | NORMAL | OPEN6 | 6 | 1 | 3 |
| 3 | UNUSED | OPEN6 | 6 | 1 | 9 |
| 4 | SECONDARY | OPEN9 | 9 | 2 | 0 |
| 5 | PRIMARY | OPEN3 | 9 | 2 | 9 |
| .. | .. | .. | .. | .. | .. |

400A VOLUME MANAGEMENT DATA

FIG.7A

500A PATH MANAGEMENT DATA

501A PAIR MANAGEMENT SUB DATA

| VOL PAIR ID | VOL PAIR CONDITION | PRIMARY STORAGE SUBSYSTEM ID | PVOL-ID | PJNLVOL-ID | SECONDARY STORAGE SUBSYSTEM ID | SVOL-ID | SJNLVOL-ID | COPY COMPLETE ADDRESS |
|---|---|---|---|---|---|---|---|---|
| 1 | NORMAL | 1 | 1 | 4 | 2 | 1 | 2 | 0 |
| 2 | NORMAL | 1 | 1 | 5 | 3 | 1 | 3 | 0 |
| 3 | UNUSED | 0 | 0 | 0 | 0 | 0 | 0 | 0 |
| 4 | UNUSED | 0 | 0 | 0 | 0 | 0 | 0 | 0 |
| .. | .. | .. | .. | .. | .. | .. | .. | .. |

502A MIRROR MANAGEMENT SUB DATA

| MIRROR ID | PJNLVOL-ID | SJNLVOL-ID | JNL GENERATION UPDATE NUMBER | JNL REPLICATION UPDATE NUMBER | RESTORATION UPDATE NUMBER |
|---|---|---|---|---|---|
| 1 | 4 | 2 | 12 | 9 | - |
| 2 | 5 | 3 | 12 | 11 | - |
| .. | .. | .. | .. | .. | .. |

FIG.7B

500A PATH MANAGEMENT DATA

501A PAIR MANAGEMENT SUB DATA

| VOL PAIR ID | VOL PAIR CONDITION | PRIMARY STORAGE SUBSYSTEM ID | PVOL-ID | PJNLVOL-ID | SECONDARY STORAGE SUBSYSTEM ID | SVOL-ID | SJNLVOL-ID | COPY COMPLETE ADDRESS |
|---|---|---|---|---|---|---|---|---|
| 1 | NORMAL | 2 | 1 | 2 | 1 | 1 | 4 | 0 |
| 2 | NORMAL | 1 | 1 | 5 | 3 | 1 | 3 | 0 |
| 3 | UNUSED | 0 | 0 | 0 | 0 | 0 | 0 | 0 |
| 4 | UNUSED | 0 | 0 | 0 | 0 | 0 | 0 | 0 |
| .. | .. | .. | .. | .. | .. | .. | .. | .. |

502A MIRROR MANAGEMENT SUB DATA

| MIRROR ID | PJNLVOL-ID | SJNLVOL-ID | JNL GENERATION UPDATE NUMBER | JNL REPLICATION UPDATE NUMBER | RESTORATION UPDATE NUMBER |
|---|---|---|---|---|---|
| 1 | 2 | 4 | - | 9 | 8 |
| 2 | 5 | 3 | 12 | 11 | 1 |
| .. | .. | .. | .. | .. | .. |

FIG. 8

| LOGICAL ADDRESS | | |
|---|---|---|
| | VOLID | POSITION FROM TOP OF VOL |
| UPDATE DATA AREA TOP ADDRESS | 4 | 0 |
| WRITE DATA AREA TOP ADDRESS | 4 | 700 |
| NEWEST UPDATE DATA ADDRESS | 4 | 500 |
| OLDEST UPDATE DATA ADDRESS | 4 | 200 |
| NEWEST WRITE DATA ADDRESS | 4 | 2200 |
| OLDEST WRITE DATA ADDRESS | 4 | 1300 |
| READ START ADDRESS | 4 | 400 |
| RETRY START ADDRESS | 4 | 300 |

700A POINTER MANAGEMENT DATA

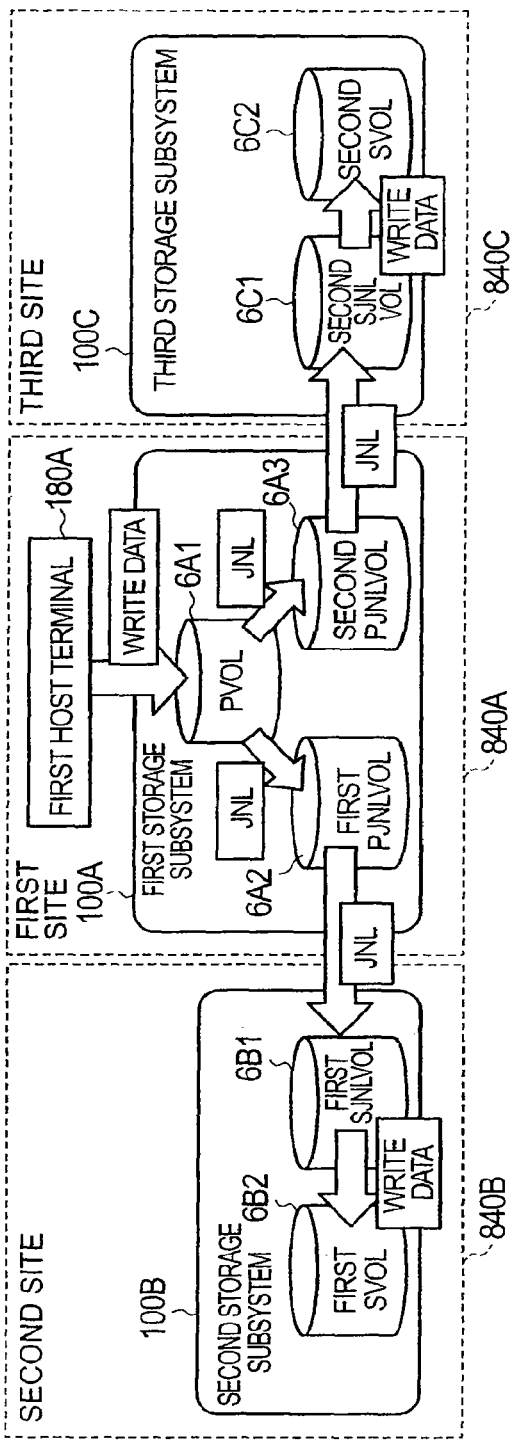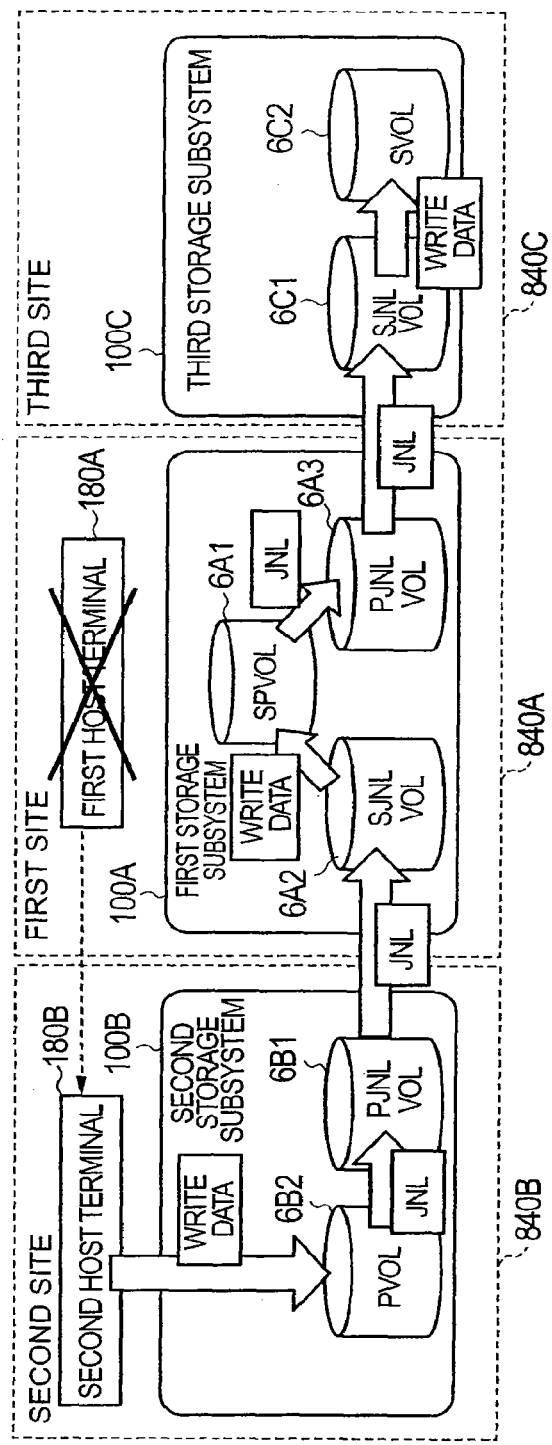

FIG. 22

| TIME | FIRST STORAGE SUBSYSTEM | HOST TERMINAL | SECOND STORAGE SUBSYSTEM | THIRD STORAGE SUBSYSTEM |
|---|---|---|---|---|
| 1 | JNLs WITH UPDATE NUMBERS FROM "1" TO "15" EXIST IN FIRST PJNLVOL | FAULT OCCURS IN FIRST HOST TERMINAL (S100) | JNLs WITH UPDATE NUMBERS FROM "1" TO "9" RESTORED IN SVOL | JNLs WITH UPDATE NUMBERS FROM "1" TO "10" RESTORED IN SVOL |
| 2 | | PROCESSING OF FIRST HOST TERMINAL TAKEN OVER BY SECOND HOST TERMINAL (S101) SECOND HOST TERMINAL TRANSMITS PROCESSING START INSTRUCTION TO SECOND STORAGE SUBSYSTEM (S102) | JNLs WITH UPDATE NUMBERS UP TO "15" COPIED FROM FIRST PJNLVOL TO FIRST SJNLVOL (S103A) RESTORATION PROCESSING FROM FIRST SJNLVOL TO FIRST SVOL PERFORMED ON WRITE DATA BASED ON JNLs WITH UPDATE NUMBERS FROM "10" TO "15" (S103B) | |
| 3 | COPY REVERSAL PROCESSING (S104B) | | COPY REVERSAL PROCESSING (S104A) | |
| 4 | | | TRANSMIT USABILITY NOTIFICATION TO SECOND HOST TERMINAL (S105) | |
| 5 | MULTIHOP SYSTEM PROCESSING | | | |

FIG. 24

| TIME | FIRST STORAGE SUBSYSTEM | HOST TERMINAL | SECOND STORAGE SUBSYSTEM | THIRD STORAGE SUBSYSTEM |
|---|---|---|---|---|
| 1 | JNLs WITH UPDATE NUMBERS FROM "1" TO "15" EXIST IN FIRST PJNLVOL | FAULT OCCURS IN FIRST HOST TERMINAL (S100) | JNLs WITH UPDATE NUMBERS FROM "1" TO "9" RESTORED IN SVOL | JNLs WITH UPDATE NUMBERS FROM "1" TO "10" RESTORED IN SVOL |
| 2 | | PROCESSING OF FIRST HOST TERMINAL TAKEN OVER BY SECOND HOST TERMINAL (S101) SECOND HOST TERMINAL TRANSMITS PROCESSING START INSTRUCTION TO SECOND STORAGE SUBSYSTEM (S102) | JNLs WITH UPDATE NUMBERS UP TO "15" COPIED FROM FIRST PJNLVOL TO FIRST SJNLVOL (S103A) RESTORATION PROCESSING FROM FIRST SJNLVOL TO FIRST SVOL PERFORMED ON WRITE DATA BASED ON JNLs WITH UPDATE NUMBERS FROM "1" TO "15" (S103B) | |
| 3 | COPY REVERSAL PROCESSING (S104B) | | COPY REVERSAL PROCESSING (S104A) | |
| 4 | | | TRANSMIT USABILITY NOTIFICATION TO SECOND HOST TERMINAL (S105) | |
| 4 | VOL GROUP RESTRUCTURING PROCESSING (S106) | | | |
| 5 | PROCESSING ACCORDING TO ANOTHER MULTITARGET SYSTEM | | | |

FIG. 26

| TIME | FIRST STORAGE SUBSYSTEM | HOST TERMINAL | SECOND STORAGE SUBSYSTEM | THIRD STORAGE SUBSYSTEM |
|---|---|---|---|---|
| 1 | (JNLs FROM "1" TO "15" STORED IN PJNLVOLs 6A2, 6A3) FAULT (S110) | | JNLs WITH UPDATE NUMBERS FROM "1" TO "9" RESTORED IN SVOL | JNLs WITH UPDATE NUMBERS FROM "1" TO "7" RESTORED IN SVOL |
| 2 | | PROCESSING OF FIRST HOST TERMINAL TAKEN OVER BY SECOND HOST TERMINAL (S111) | | |
| 3 | VOL GROUP RESTRUCTURING PROCESSING (S112) | | | |
| 4 | REPLICATION PROCESSING WITH RESTRUCTURED VOL GROUP | | | |

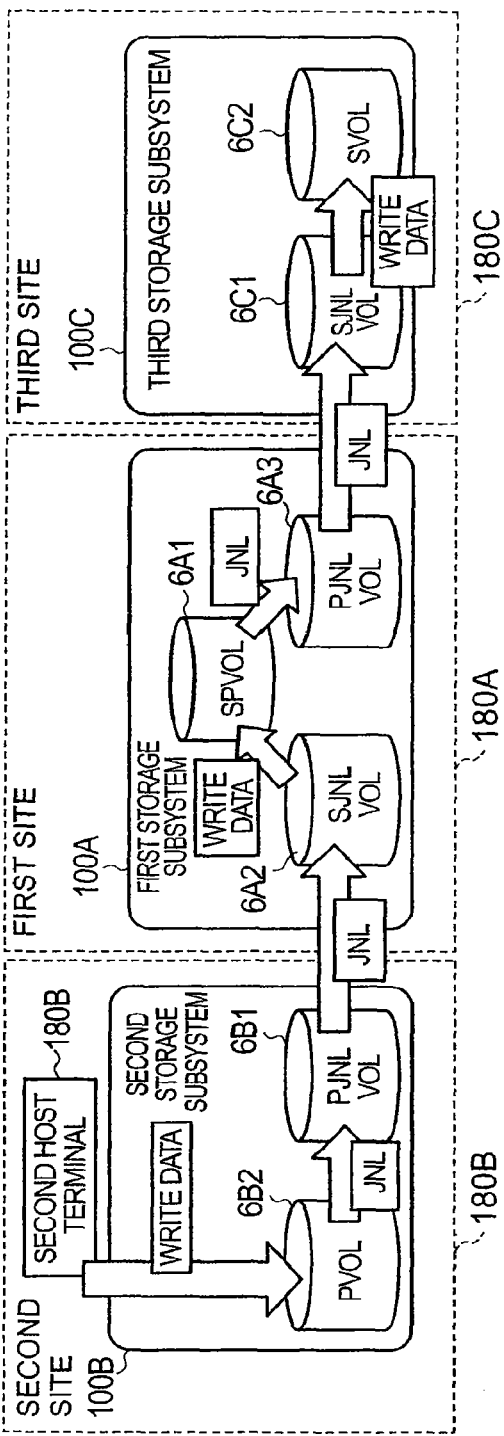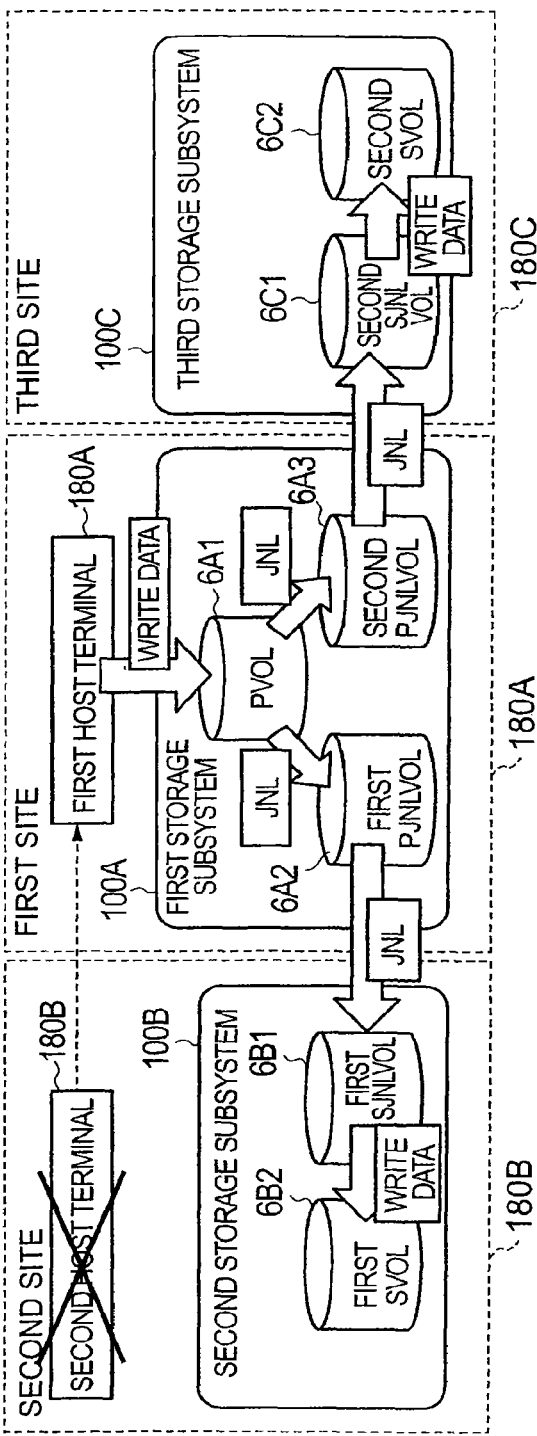
FIG.30A
FIG.30B

FIG. 31

| TIME | SECOND STORAGE SUBSYSTEM | HOST TERMINAL | FIRST STORAGE SUBSYSTEM | THIRD STORAGE SUBSYSTEM |
|---|---|---|---|---|
| 1 | JNLs WITH UPDATE NUMBERS FROM "1" TO "15" EXIST IN FIRST PJNLVOL | FAULT OCCURS IN SECOND HOST TERMINAL (S200) | JNLs WITH UPDATE NUMBERS FROM "1" TO "9" RESTORED IN SPVOL | JNLs WITH UPDATE NUMBERS FROM "1" TO "7" RESTORED IN SVOL |
| 2 | | PROCESSING OF SECOND HOST TERMINAL TAKEN OVER BY FIRST HOST TERMINAL (S201) FIRST HOST TERMINAL TRANSMITS PROCESSING START INSTRUCTION TO FIRST STORAGE SUBSYSTEM (S202) | JNLs WITH UPDATE NUMBERS UP TO "15" COPIED FROM PJNLVOL 6B1 TO SJNLVOL 6A2 (S203A) RESTORATION PROCESSING FROM SJNLVOL 6A2 TO SPVOL 6A1 PERFORMED ON WRITE DATA BASED ON JNLs WITH UPDATE NUMBERS FROM "10" TO "15" (S203B) | |
| 3 | COPY REVERSAL PROCESSING (S204B) | | COPY REVERSAL PROCESSING (S204A) | |
| 4 | | | TRANSMIT USABILITY NOTIFICATION TO FIRST HOST TERMINAL (S205) | |
| 5 | MULTITARGET SYSTEM PROCESSING | | | |

FIG. 33

| TIME | SECOND STORAGE SUBSYSTEM | HOST TERMINAL | FIRST STORAGE SUBSYSTEM | THIRD STORAGE SUBSYSTEM |
|---|---|---|---|---|
| 1 | JNLs WITH UPDATE NUMBERS FROM "1" TO "15" EXIST IN FIRST PJNLVOL | FAULT OCCURS IN SECOND HOST TERMINAL (S210) | JNLs WITH UPDATE NUMBERS FROM "1" TO "9" RESTORED IN SPVOL | JNLs WITH UPDATE NUMBERS FROM "1" TO "7" RESTORED IN SVOL |
| 2 | | PROCESSING OF SECOND HOST TERMINAL TAKEN OVER BY THIRD HOST TERMINAL (S211) THIRD HOST TERMINAL TRANSMITS PROCESSING START INSTRUCTION TO FIRST AND THIRD STORAGE SUBSYSTEMS (S212) | JNLs WITH UPDATE NUMBERS UP TO "15" COPIED FROM PJNLVOL 6B1 TO SJNLVOL 6A2 (S213A) RESTORATION PROCESSING FROM SJNLVOL 6A2 TO SPVOL 6A1 PERFORMED ON WRITE DATA BASED ON JNLs WITH UPDATE NUMBERS FROM "10" TO "15" (S213B) JNL GENERATED AND STORED IN PJNLVOL 6A3 BASED ON RESTORATION PROCESSING INTO SPVOL 6A1 (S213C) | JNLs WITH UPDATE NUMBERS UP TO "15" COPIED FROM PJNLVOL 6A3 TO SJNLVOL 6C1 (S213D) RESTORATION PROCESSING FROM SJNLVOL 6C1 TO SVOL 6C2 PERFORMED ON WRITE DATA BASED ON JNLs WITH UPDATE NUMBERS FROM "8" TO "15" (S213E) |
| 3 | COPY REVERSAL PROCESSING (S214B) | | COPY REVERSAL PROCESSING (S214A) REVERSAL RESULT NOTIFICATION PROCESSING (S214C) COPT REVERSAL PROCESSING (S214E) | COPY REVERSAL PROCESSING (S214D) |
| 4 | | | | TRANSMIT SIGNAL CORRESPONDING TO REVERSAL RESULT TO THIRD HOST TERMINAL (S215) |
| 5 | | PROCESSING ACCORDING TO NEW MULTIHOP SYSTEM | | |

FIG. 35

| TIME | SECOND STORAGE SUBSYSTEM | HOST TERMINAL | FIRST STORAGE SUBSYSTEM | THIRD STORAGE SUBSYSTEM |
|---|---|---|---|---|
| 1 | JNLs FROM "1" TO "15" STORED IN PJNLVOL 6B1 | | JNLs WITH UPDATE NUMBERS FROM "1" TO "9" RESTORED IN SVOL | JNLs WITH UPDATE NUMBERS FROM "1" TO "7" RESTORED IN SVOL |
| 2 | | FAULT (S220) | | |
| 3 | VOL GROUP RESTRUCTURING PROCESSING (S221) | | | |
| 4 | REPLICATION PROCESSING WITH RESTRUCTURED VOL GROUP | | | |

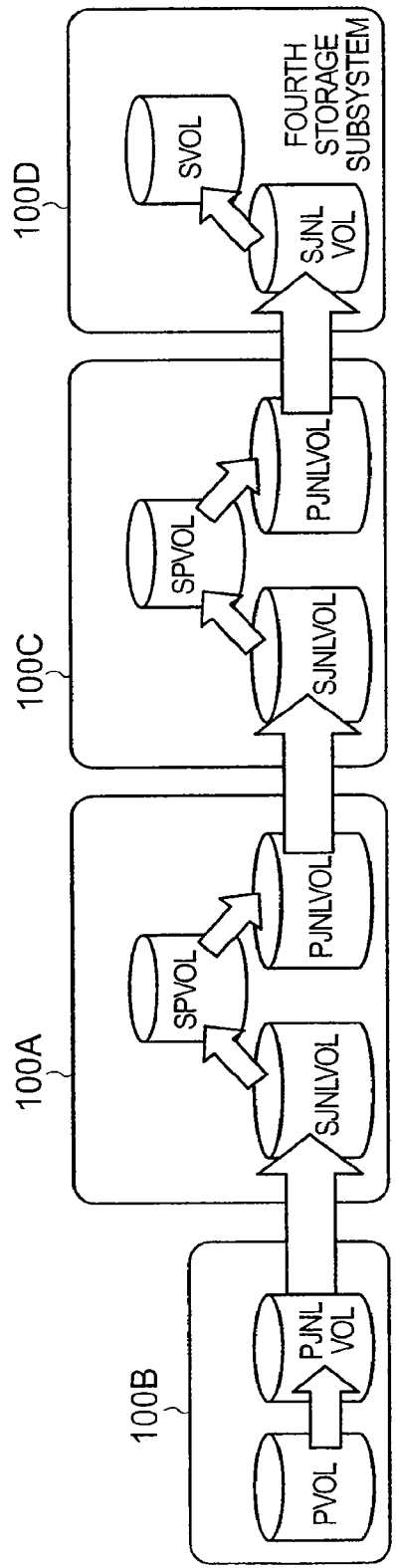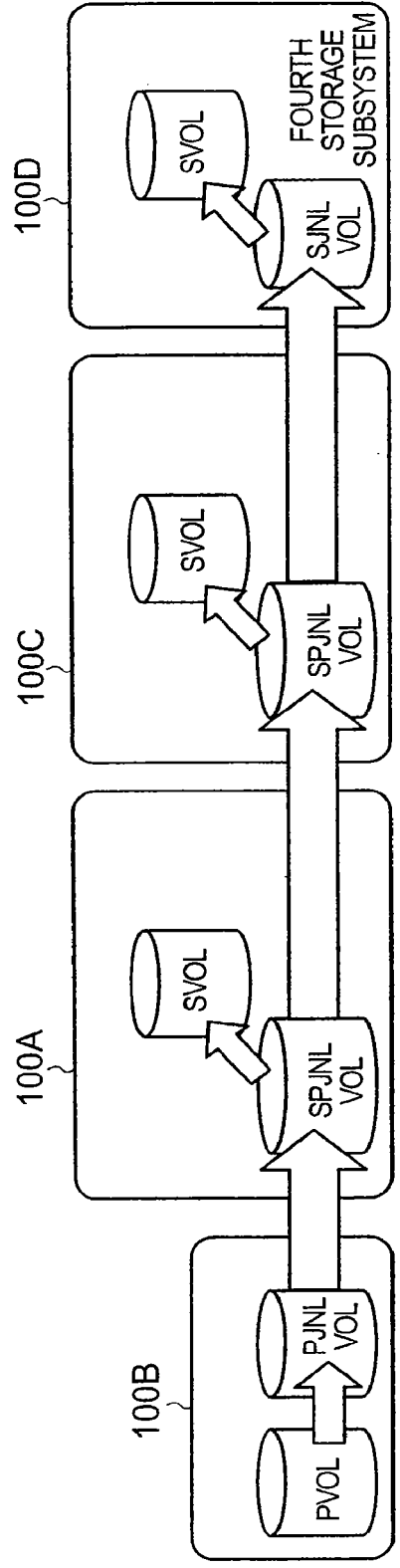

FIG. 39B

| Paircreate | ☒ |

Port-G-ID-LUN
- P-VOL: CL1-E-00-005
- S-VOL: [CL1-A ▼] [00 ▼] [000 ▼] ---- 5002
- Select Other S-VOL(s) [▼]

5003 ----

| | M-JNL | Mirror ID | R-JNL |
|---|---|---|---|
| Mirror: | 00 ▼ | 00 ▼ | 01 ▼ | ---- 5005

5004 points to Mirror ID

- CT Group: [00* ▼]

DKC S/N,CTRLID,Path
- DKC: [63513,04,Fibre ▼] ---- 5006

- Initial copy: [Entire ▼]
- Priority: [32 ▼]
- JNL Cntrol: [Activate JNL if not active ▼]

| | JNL ful | M-JNL failure | R-JNL failure |
|---|---|---|---|
| Suspend Condition: | Yes ▼ | Yes ▼ | Yes ▼ |

M-JNL Information:
Current Mirror(s): 1    Total Mirror(s): 1

---- 5007

[Set]  [Cancel]

DATA PROCESSING SYSTEM AND STORAGE SUBSYSTEM PROVIDED IN DATA PROCESSING SYSTEM

CROSS-REFERENCE TO RELATED APPLICATION(S)

This is a continuation of U.S. patent application Ser. No. 12/107,139 filed on Apr. 22, 2008 now U.S. Pat. No. 8,103,630, which is a continuation of U.S. patent application Ser. No. 11/303,764 filed on Dec. 15, 2005 now U.S. Pat. No. 7,421,435, which is a continuation of U.S. patent application Ser. No. 10/972,246 filed on Oct. 21, 2004 now U.S. Pat. No. 7,395,265, which application claims priority from Japanese Patent Application No. 2004-248256 filed on Aug. 27, 2004 and No. 2004-248320 filed on Aug. 27, 2004, the entire disclosures of which are incorporated herein by reference.

BACKGROUND OF THE INVENTION

1. Field of the Invention

The present invention relates to data storage and processing technology, for example to the replication of data among a plurality of storage subsystems.

2. Description of the Related Art

In the past, a technique in which data stored in a first storage subsystem are replicated in second and third storage subsystems has been considered so that when a fault occurs in the first storage subsystem, a data processing system comprising the first storage subsystem can continue to provide service. An example of this type of technique is disclosed in Japanese Unexamined Patent Application Publication 2003-122509. According to this technique, a first storage subsystem holds a first logical volume, a second storage subsystem holds a second logical volume, and a third storage subsystem holds a third logical volume. When the first storage subsystem writes data (to be referred to as "data A" hereafter) into the first logical volume, the data A are transferred to the second storage subsystem and written into the second logical volume synchronously with the timing at which the data A are written into the second logical volume, and the data A are transferred to the third storage subsystem and written into the third logical volume asynchronously with the timing at which the data A are written into the first logical volume.

Furthermore, the system described below, disclosed in U.S. Pat. No. 6,209,002, is known as an example of a data processing system comprising three or more storage subsystems.

A first storage subsystem holds a first logical volume serving as a replication source. A second storage subsystem holds a second logical volume serving as the replication destination of the first logical volume, and a third logical volume serving as the replication source of the second logical volume. A third storage subsystem holds a fourth logical volume serving as the replication destination of the third logical volume. When the first storage subsystem performs a data update on the first logical volume serving as the replication source, the data in the second logical volume of the second storage subsystem are updated. The second storage subsystem executes data replication processing from the second logical volume to the third logical volume and data replication processing from the third logical volume to the fourth logical volume exclusively.

In the prior art which is Japanese Unexamined Patent Application Publication 2003-122509, a function for learning the state of progress of data transfer, reception, and update between the second storage subsystem and third storage subsystem is provided in each of the second storage subsystem and third storage subsystem. In certain cases, however, it is desirable to perform replication between the second and third storage subsystems while maintaining data consistency without providing such a function.

Furthermore, in the prior art which is U.S. Pat. No. 6,209,002, upon reception of a data write command, the first storage subsystem writes data into both the first logical volume and the second logical volume in the second storage subsystem, and hence the response time to the write command may lengthen depending on the physical distance between the first storage subsystem and second storage subsystem. To reduce the response time to a write command, the physical distance between the first storage subsystem and second storage subsystem must be shortened.

BRIEF SUMMARY OF THE INVENTION

It is therefore an object of the present invention to provide a data processing system comprising at least three or more storage subsystems such that when data written into the first storage subsystem are transferred to and held in each of the second and third storage subsystems, data consistency can be maintained between the second and third storage subsystems without the need for the second and third storage subsystems to make inquiries of each other regarding the state of progress of data update.

Furthermore, It is an other object of the present invention to provide a data processing system comprising at least three storage subsystems, which is not restricted by the physical distance between a first storage subsystem and a second storage subsystem.

Other objects of the present invention will become clear from the following description.

A data processing system according to a first aspect of the present invention comprises a first storage subsystem which receives write data serving as data to be subjected to writing from a first host terminal which transmits these write data, and stores the received write data, a second storage subsystem connected to the first storage subsystem, and a third storage subsystem connected to the first storage subsystem.

The first storage subsystem comprises a first storage device assigned with an attribute as a first replication source, and one or more second storage devices which are associated with the first storage device and assigned with an attribute as second replication sources. The first storage subsystem stores the write data received from the first host terminal in the first storage device. The first storage subsystem also issues an update number expressing the update order of the first storage device when the write data are stored in the first storage device, generates a data set comprising the issued update number and the write data, and stores the generated data set in the one or more second storage devices. Further, the first storage subsystem reads the data set from the one or more second storage devices, and transmits the read data set to the second storage subsystem. The first storage subsystem also reads the data set from the one or more second storage devices, and transmits the read data set to the third storage subsystem.

The second storage subsystem comprises a third storage device which is associated with at least one of the one or more second storage devices and assigned with an attribute as a second replication destination to form a pair with the second replication source, and a fourth storage device which is associated with the third storage device and assigned with an attribute as a first replication destination to form a pair with the first replication source. The second storage subsystem receives the data set from the first storage subsystem, and stores the received data set in the third storage device. The second storage subsystem also selects a data set to be subjected to reading from within the third storage device on the basis of the update numbers included in each of the one or more data sets in the third storage device, reads the selected data set from the third storage device, and stores the write data within the read data set in the fourth storage device.

The third storage subsystem comprises a fifth storage device which is associated with at least one of the one or more second storage devices and assigned with an attribute as the second replication destination, and a sixth storage device which is associated with the fifth storage device and assigned with an attribute as the first replication destination. The third storage subsystem receives the data set from the first storage subsystem, and stores the received data set in the fifth storage device. The third storage subsystem also selects a data set to be subjected to reading from within the fifth storage device on the basis of the update numbers included in each of the one or more data sets in the fifth storage device, reads the selected data set from the fifth storage device, and stores the write data within the read data set in the sixth storage device.

The data set that is read from the third or fifth storage device is the data set having the youngest update number from among the unread data sets, for example. In other words, data set reading from the third or fifth storage device is performed in update number order.

In a first embodiment of the data processing system described above, when the second storage subsystem is connected to a second host terminal for transmitting write data and a fault occurs in the first host terminal, the first storage subsystem reads at least a data set that has not been transmitted to the second storage subsystem, from among the one or more data sets in the one or more second storage devices, and transmits the read untransmitted data set to the second storage subsystem. The second storage subsystem receives the untransmitted data set from the first storage subsystem, and stores the received data set in the third storage device. The second storage subsystem then reads one or more data sets that have not been read from the third storage device in update number order, and stores the write data within the read data sets in the fourth storage device. The data processing system switches the first replication source, which is the attribute of the first storage device, with the first replication destination, which is the attribute of the fourth storage device, and switches the second replication source, which is the attribute of the one or more second storage devices, with the second replication destination, which is the attribute of the third storage device. The second storage subsystem then receives write data from the second host terminal and stores the received write data in the fourth storage device. The second storage subsystem also issues an update number expressing the update order of the fourth storage device when the write data are stored in the fourth storage device, generates a data set comprising the issued update number and the write data, and stores the generated data set in the third storage device. Further, the second storage subsystem reads the data set from the third storage device and transmits the read data set to the first storage subsystem. The first storage subsystem receives the data set from the second storage subsystem, and stores the received data set in the one or more second storage devices. The first storage subsystem also selects a data set to be subjected to reading from within the one or more second storage devices on the basis of the update numbers included in the one or more data sets within the one or more second storage devices, reads the selected data set from the one or more second storage devices, and stores the write data within the read data set in the first storage device.

In a second embodiment of the data processing system described above, pertaining to the first embodiment, the third storage subsystem is connected to the second storage subsystem. The first storage subsystem or second storage subsystem reads at least a data set that has not been transmitted to the third storage subsystem, from among the one or more data sets within the one or more second storage devices, and transmits the read untransmitted data set to the third storage subsystem. The third storage subsystem receives the untransmitted data set from the first storage subsystem and stores the received data set in the fifth storage device. The third storage subsystem also reads one or more data sets that have not been read from the fifth storage device in update number order, and stores the write data within the read data sets in the sixth storage device. The data processing system associates the fifth storage device assigned as the second replication destination with the third storage device assigned as the second replication source by switching the second replication destination with the second replication source. The second storage subsystem reads a data set from the third storage device and transmits the read data set to the third storage subsystem. The third storage subsystem receives the data set from the second storage subsystem and stores the received data set in the fifth storage device.

In a third embodiment of the data processing system described above, the first storage subsystem and third storage subsystem maintain communication independently, even when communication between the first storage subsystem and second storage subsystem is halted.

More specifically, for example, when at least one of the second storage subsystem and first storage subsystem is unable to read the data set having the next update number after the update number of the data set read from the third storage device most recently, communication between the first storage subsystem and second storage subsystem is halted. However, if the first storage subsystem and third storage subsystem are able to read the data set having the next update number after the update number of the data set read from the fifth storage device most recently, then communication between the first storage subsystem and third storage subsystem is maintained even when communication between the first storage subsystem and second storage subsystem is halted.

In a fourth embodiment of the data processing system described above, at least one of the second storage subsystem and third storage subsystem transmits a read command to the first storage subsystem. Having received the read command, the first storage subsystem transmits the read data set to at least one of the second storage subsystem and third storage subsystem in response to the read command.

In a fifth embodiment of the data processing system described above, the one or more second storage devices comprise a first second storage device associated with the third storage device and a second second storage device associated with the fifth storage device, and the first storage subsystem stores the generated data set in both the first and second second storage devices.

In a sixth embodiment of the data processing system described above, when there are no more empty storage areas in the storage device assigned as the second replication source or the second replication destination, at least one of the first through third storage subsystems deletes the data set having the oldest update number from among the one or more data sets stored in this storage device.

In a seventh embodiment of the data processing system described above, when the second storage subsystem is connected to the third storage subsystem and a fault occurs in the first storage subsystem, at least one of the second storage subsystem and third storage subsystem associates the third storage device assigned with an attribute as the second replication source with the fifth storage device assigned with an attribute as the second replication destination. The second storage subsystem then transmits a data set read from the third storage device to the third storage subsystem. The third storage subsystem receives the data set from the second storage subsystem and stores the received data set in the fifth storage device.

A storage subsystem according to a second aspect of the present invention can be connected to a host terminal for transmitting write data serving as data to be subjected to writing, a second storage subsystem, and a third storage subsystem, and comprises a first storage device, one or more second storage devices, and a control device for controlling access to the first storage device and the one or more second storage devices. The control device stores write data received from the first host terminal in the first storage device. The control device also issues an update number expressing the update order of the first storage device when the write data are stored in the first storage device, generates a data set comprising the issued update number and the write data, and stores the generated data set in the one or more second storage devices. Further, the control device reads the data set from the one or more second storage devices and transmits the read data set to the second storage subsystem. The control device also reads the data set from the one or more second storage devices and transmits the read data set to the third storage subsystem.

A data processing method according to a third aspect of the present invention is realized in a data processing system comprising a first storage subsystem which receives write data serving as data to be subjected to writing from a first host terminal which transmits the write data, and stores the received write data, a second storage subsystem connected to the first storage subsystem, and a third storage subsystem connected to the first storage subsystem. The first storage subsystem comprises a first storage device and one or more second storage devices. The second storage subsystem comprises a third storage device and a fourth storage device. The third storage subsystem comprises a fifth storage device and a sixth storage device. The data processing method comprises the steps of: storing write data transmitted from the first host terminal in the first storage device; issuing an update number expressing the update order of the first storage device when the write data are stored in the first storage device; generating a data set comprising the issued update number and the write data, and storing the generated data set in the one or more second storage devices; reading the data set from the one or more second storage devices; storing the read data set in the third storage device and fifth storage device; reading a data set from the third storage device on the basis of the update numbers included in each of the one or more data sets within the third storage device, and storing the write data within the read data set in the fourth storage device; and reading a data set from the fifth storage device on the basis of the update numbers included in each of the one or more data sets within the fifth storage device, and storing the write data within the read data set in the sixth storage device.

A data processing system according to a forth aspect of the present invention comprises a first storage subsystem which receives write data, serving as data to be subjected to writing, from a first host terminal which transmits the write data, and stores the received write data, a second storage subsystem connected to the first storage subsystem, and a third storage subsystem connected to the second storage subsystem.

The first storage subsystem comprises a first storage device assigned with an attribute as a first replication source, and a second storage device associated with the first storage device and assigned with an attribute as a second replication source. The first storage subsystem stores write data received from the first host terminal in the first storage device. The first storage subsystem then issues an update number expressing the update order of the first storage device when the write data are stored in the first storage device, generates a data set comprising the issued update number and write data, and stores the generated data set in the second storage device. The first storage subsystem then reads the data set from the second storage device and transmits the read data set to the second storage subsystem.

The second storage subsystem comprises one or more third storage devices which are associated with the second storage device and assigned with an attribute both as a second replication destination forming a pair with the second replication source, and as the second replication source, and a fourth storage device which is associated with the one or more third storage devices and assigned with an attribute as a first replication destination forming a pair with the first replication source. The second storage subsystem receives the data set from the first storage subsystem and stores the received data set in the one or more third storage devices. The second storage subsystem then selects a data set to be subjected to reading from within the one or more third storage devices on the basis of the update numbers included in each of the one or more data sets in the one or more third storage devices, reads the selected data set from the one or more third storage devices, and stores the write data within the read data set in the fourth storage device. The second storage subsystem then transmits the data set read from the one or more third storage devices to the third storage subsystem.

The third storage subsystem comprises a fifth storage device which is associated with at least one of the one or more third storage devices and assigned with an attribute as the second replication destination, and a sixth storage device which is associated with the fifth storage device and assigned with an attribute as the first replication destination. The third storage subsystem receives the data set from the second storage subsystem and stores the received data set in the fifth storage device. The third storage subsystem then selects a data set to be subjected to reading from within the fifth storage device on the basis of the update numbers included in each of the one or more data sets in the fifth storage device, reads the selected data set from the fifth storage device, and stores the write data within the read data set in the sixth storage device.

In a first embodiment of the data processing system described above, the one or more third storage devices comprise a first third storage device associated with the second storage device and assigned with an attribute as the second replication destination, and a second third storage device associated with the fourth storage device and assigned with an attribute as the second replication source. The fourth storage device is also assigned with an attribute as the first replication source. In this case, the second storage subsystem reads a data set from the first third storage device on the basis of the update numbers in the first third storage device, and stores the write data within the read data set in the fourth storage device. At an identical or different timing to the timing at which the write data are written into the fourth storage device, the second storage subsystem generates a data set comprising an identical update number to the update number in the read data set and the write data stored in the fourth storage device, and stores the generated data set in the second third storage device. The second storage subsystem then reads the data set from the second third storage device and transmits the read data set to the third storage subsystem.

In a second embodiment of the data processing system described above, pertaining to the first embodiment, when the second storage subsystem is connected to a second host terminal for transmitting write data and a fault occurs in the first host terminal, the first storage subsystem reads at least a data set that has not been transmitted to the second storage subsystem, from among the one or more data sets in the second storage device, and transmits the read untransmitted data set to the second storage subsystem. The second storage subsystem receives the untransmitted data set from the first storage subsystem and stores the received data set in the first third storage device, and then reads one or more data sets that have not been read from the first third storage device in update number order and stores the write data within the read data sets in the fourth storage device. The data processing system then switches the first replication source, which is the attribute of the first storage device, with the first replication destination, which is the attribute of the fourth storage device, and switches the second replication source, which is the attribute of the second storage device, with the second replication destination, which is the attribute of the first third storage device. Thereafter, the second storage subsystem receives write data from the second host terminal and stores the received write data in the fourth storage device. The second storage subsystem then issues an update number expressing the update order of the fourth storage device when the write data are stored in the fourth storage device, generates a data set comprising the issued update number and write data, and stores the generated data set in the first third storage device and second third storage device. The second storage subsystem then reads the data set from the first third storage device and transmits the read data set to the first storage subsystem, and reads the data set from the second third storage device and transmits the read data set to the third storage subsystem. The first storage subsystem receives the data set from the second storage subsystem, and stores the received data set in the second storage device, and then selects a data set to be subjected to reading from within the second storage device on the basis of the update numbers included in the one or more data sets within the second storage device, reads the selected data set from the second storage device, and stores the write data within the read data set in the first storage device.

In a third embodiment of the data processing system described above, when the third storage subsystem is connected to a third host terminal for transmitting write data and a fault occurs in the first host terminal, the first storage subsystem reads at least a data set that has not been transmitted to the second storage subsystem, from among the one or more data sets in the second storage device, and transmits the read untransmitted data set to the second storage subsystem. The second storage subsystem receives the untransmitted data set from the first storage subsystem and stores the received data set in the one or more third storage devices, and reads one or more data sets that have not been transmitted to the third storage subsystem from the one or more third storage devices and transmits the read one or more data sets to the third storage subsystem. The third storage subsystem receives the one or more untransmitted data sets from the second storage subsystem and stores the one or more received data sets in the fifth storage device, and reads one or more data sets that have not been read from the fifth storage device in update number order, and stores the write data within the read data sets in the sixth storage device. The data processing system switches the first replication source, which is the attribute of the first storage device, with the first replication destination, which is the attribute of the fourth storage device, switches the second replication source, which is the attribute of the second storage device, with the second replication destination, which is the attribute of the one or more third storage devices, switches the first replication source, which is the attribute of the fourth storage device, with the first replication destination, which is the attribute of the sixth storage device, and switches the second replication source, which is the attribute of the one or more third storage devices, with the second replication destination, which is the attribute of the fifth storage device. Thereafter, the third storage subsystem receives write data from the third host terminal and stores the received write data in the sixth storage device. The third storage subsystem then issues an update number expressing the update order of the sixth storage device when the write data are stored in the sixth storage device, generates a data set comprising the issued update number and write data, and stores the generated data set in the fifth storage device. The third storage subsystem then reads the data set from the fifth storage device and transmits the read data set to the second storage subsystem. The second storage subsystem receives the data set from the third storage subsystem, and stores the received data set in the one or more third storage devices. The second storage subsystem then reads a data set from the one or more third storage devices and stores the write data within the read data set in the fourth storage device. The second storage subsystem then transmits the data set read from the one or more third storage devices to the first storage subsystem. The first storage subsystem receives the data set from the second storage subsystem and stores the received data set in the second storage device, and reads a data set from the second storage device and stores the write data within the read data set in the first storage device.

In a fourth embodiment of the data processing system described above, reading of a data set from the second storage device into the one or more third storage devices or reading of a data set from the one or more third storage devices into the fifth storage device is performed in response to the transmission of a read command from the storage subsystem that is to receive the data set.

In a fifth embodiment of the data processing system described above, when the first storage subsystem is connected to the third storage subsystem and a fault occurs in the second storage subsystem, at least one of the first storage subsystem and third storage subsystem associates the second storage device assigned with an attribute as the second replication source with the fifth storage device assigned with an attribute as the second replication destination. The first storage subsystem then transmits a data set read from the second storage device to the third storage subsystem. The third storage subsystem receives the data set from the first storage subsystem and stores the received data set in the fifth storage device.

In a sixth embodiment of the data processing system described above, pertaining to the fifth embodiment, when at least one of the first storage subsystem and third storage subsystem is unable to obtain a data set comprising the next update number after the newest update number in the fifth storage device, communication between the first storage subsystem and the third storage subsystem is halted.

In a seventh embodiment of the data processing system described above, when there are no more empty storage areas in the storage device assigned as the second replication source or the second replication destination, at least one of the first through third storage subsystems deletes the data set having the oldest update number from among the one or more data sets stored in the storage device.

A data processing method according to a fifth aspect of the present invention is realized in a data processing system comprising a first storage subsystem which receives write data serving as data to be subjected to writing from a first host terminal which transmits the write data, and stores the received write data, a second storage subsystem connected to the first storage subsystem, and a third storage subsystem connected to the second storage subsystem. The first storage subsystem comprises a first storage device assigned with an attribute as a first replication source, and a second storage device associated with the first storage device and assigned with an attribute as a second replication source. The second storage subsystem comprises one or more third storage devices which are associated with the second storage device and assigned with an attribute both as a second replication destination to form a pair with the second replication source, and as the second replication source, and a fourth storage device which is associated with the one or more third storage devices and assigned with an attribute as a first replication destination to form a pair with the first replication source. The third storage subsystem comprises a fifth storage device which is associated with at least one of the one or more third storage devices and assigned with an attribute as the second replication destination, and a sixth storage device which is associated with the fifth storage device and assigned with an attribute as the first replication destination. This data processing method comprises the steps of: storing write data transmitted from the first host terminal in the first storage device; issuing an update number expressing the update order of the first storage device when the write data are stored in the first storage device; generating a data set comprising the issued update number and write data, and storing the generated data set in the second storage device; reading the data set from the second storage device and storing the read data set in the one or more third storage devices; selecting a data set to be subjected to reading from within the one or more third storage devices on the basis of the update numbers included in each of the one or more data sets in the one or more third storage devices, reading the selected data set from the one or more third storage devices, and storing the write data within the read data set in the fourth storage device; storing the data set read from the one or more third storage devices in the fifth storage device; and selecting a data set to be subjected to reading from within the fifth storage device on the basis of the update numbers included in each of the one or more data sets in the fifth storage device, reading the selected data set from the fifth storage device, and storing the write data within the read data set in the sixth storage device.

BRIEF DESCRIPTION OF THE DRAWINGS

FIG. 1A shows an outline of first replication processing performed by a data processing system according to an embodiment of the present invention;

FIG. 1B shows an outline of second replication processing performed by the data processing system;

FIG. 2 shows a constitutional example of update data 4;

FIG. 6A shows a constitutional example of VOL management data 400A when a multitarget system illustrated in FIG. 1A is employed;

FIG. 6B shows a constitutional example of the VOL management data 400A when a multihop system illustrated in FIG. 1B is employed;

FIG. 7A shows a constitutional example of path management data 500A when the multitarget system illustrated in FIG. 1A is employed;

FIG. 7B shows a constitutional example of the path management data 500A when the multihop system illustrated in FIG. 1B is employed;

FIG. 8 shows a constitutional example of pointer management data 700;

FIG. 21A shows an outline of replication processing performed during a normal operation by a data processing system according to a first example of an embodiment of the present invention;

FIG. 21B shows an outline of replication processing after a fault occurs in a first host terminal of the data processing system;

FIG. 22 shows the flow of processing to switch from the multitarget system to the multihop system, which is performed when a fault occurs in the first host terminal;

FIG. 24 shows the flow of processing to switch from the multitarget system to another multitarget system, which is performed when a fault occurs in the first host terminal 180A during the multitarget system replication processing shown in FIG. 21A;

FIG. 26 shows the flow of the processing performed when a fault occurs in the first storage subsystem 100A during the multitarget system replication processing shown in FIG. 21A;

FIG. 30A shows an outline of multihop system replication processing performed during a normal operation by a data processing system according to a second example of an embodiment of the present invention;

FIG. 30B shows an outline of replication processing after a fault occurs in a second host terminal in the data processing system;

FIG. 31 shows the flow of processing to switch from the multihop system to the multitarget system, which is performed when a fault occurs in the second host terminal during the replication processing in FIG. 30A;

FIG. 33 shows the flow of processing to switch from the multihop system to another multihop system, which is performed when a fault occurs in the second host terminal 180B during the replication processing shown in FIG. 30A;

FIG. 35 shows the flow of processing performed when a fault occurs in the first storage subsystem 100A during the multihop system replication processing shown in FIG. 30A;

FIG. 37A shows an outline of multihop system replication processing according to a fourth modified example of the second example of the present invention;

FIG. 37B shows an outline of multihop system replication processing according to a fifth modified example of the second example of the present invention;

FIG. 39B shows a constitutional example of a second GUI screen according to the third example of the present invention.

DETAILED DESCRIPTION OF THE INVENTION

Figure 3:
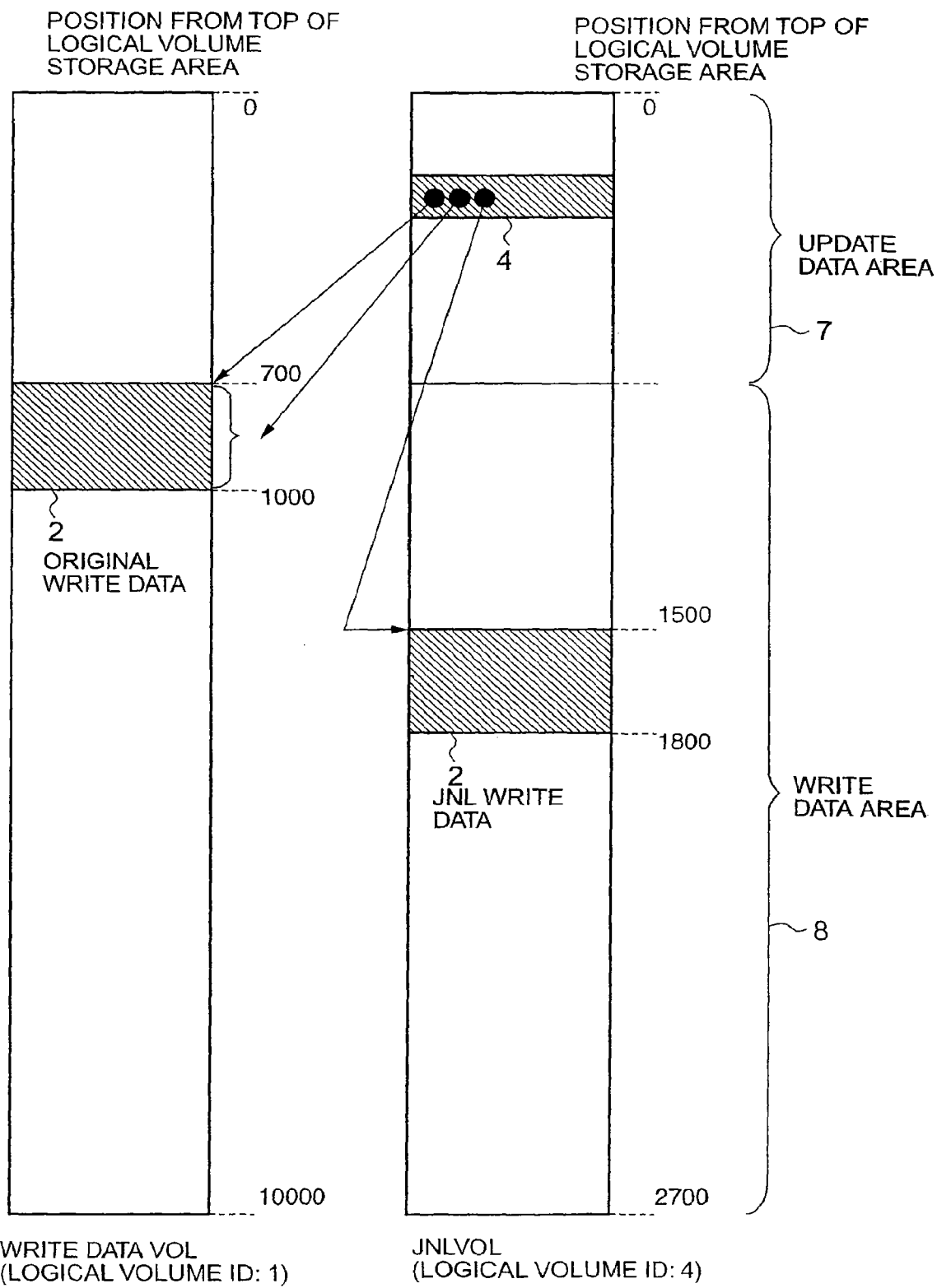
FIG. 3 shows a constitutional example of a write data VOL and a JNLVOL, and particularly an illustrative example of the update data 4 shown in FIG. 2.

An embodiment of the present invention and several examples based on this embodiment will be described below with reference to the drawings.

FIG. 1A shows an outline of first replication processing performed by a data processing system according to an embodiment of the present invention, and FIG. 1B shows an outline of second replication processing performed by the data processing system.

A data processing system 1 comprises at least three storage subsystems 100, for example a first storage subsystem 100A, a second storage subsystem 100B, and a third storage subsystem 100C. Hereafter, to facilitate understanding, the affix "A" will be added to the reference numbers of elements relating to the first storage subsystem 100A, the affix "B" will be added to the reference numbers of elements relating to the second storage subsystem 100B, and the affix "C" will be added to the reference numbers of elements relating to the third storage subsystem 100C.

Each of the storage subsystems 100A, 100B, 100C are capable of communicating with a host terminal 180. The host terminal 180 is a computer comprising a CPU, memory, and so on as hardware resources. More specifically, the host terminal 180 may be a personal computer or a server machine, for example. Hereafter, the host terminal 180 which serves as the communication partner of the first storage subsystem 100A will be referred to as "first host terminal 180A", the host terminal 180 which serves as the communication partner of the second storage subsystem 100B will be referred to as "second host terminal 180B", and the host terminal 180 which serves as the communication partner of the third storage subsystem 100C will be referred to as "third host terminal 180C".

Each of the storage subsystems 100A, 100B, 100C further comprises one or a plurality of physical storage devices (for example, a hard disk drive), not shown in the drawing. These single or plural storage devices are provided with a plurality of logical volumes (to be referred to simply as "VOL" hereafter) 6 serving as logical storage devices. For example, the first storage subsystem 100A comprises three VOLs 6A1 to 6A3, the second storage subsystem 100B comprises two VOLs 6B1 and 6B2, and the third storage subsystem 100C comprises two VOLs 6C1 and 6C2.

At least one type of VOL attribute from among a plurality is assigned to the VOL 6. The four types of VOL attributes that may be assigned are PVOL, SVOL, PJNLVOL, and SJNLVOL, for example.

When assigned with the VOL attribute "PVOL", the VOL 6 (to be referred to hereafter as "write data VOL") serves as the write destination of data to be written (to be referred to hereafter as "write data") 2 that is received by the storage subsystem 100 from the host terminal 180, and also serves as a primary write data VOL which is the replication source of the write data 2. Hereafter, the VOL 6 that is assigned with the VOL attribute "PVOL" will be denoted as "PVOL 6".

When assigned with the VOL attribute "SVOL", the VOL 6 serves as a secondary write data VOL which is the replication destination of the write data 2 stored in the PVOL 6. Hereafter, the VOL 6 that is assigned with the VOL attribute "SVOL" will be denoted as "SVOL 6".

When assigned with the VOL attribute "PJNLVOL", the VOL 6 serves as a VOL (JNLVOL hereafter) which stores a journal (abbreviated as "JNL" hereafter) 3 that is generated on the basis of the write data 2, and also serves as a primary JNLVOL which is the replication source of the JNL. Hereafter, the VOL 6 that is assigned with the VOL attribute "PJN-LVOL" will be denoted as "PJNLVOL 6".

When assigned with the VOL attribute "SJNLVOL", the VOL 6 serves as a secondary JNLVOL which is the replication destination of the JNL 3 stored in the PJNLVOL 6. Hereafter, the VOL 6 that is assigned with the VOL attribute "SJNLVOL" will be denoted as "SJNLVOL 6".

The VOL 6 may sometimes be assigned with the two VOL attributes "SVOL" and "PVOL". In this case, the write data 2 are written into the VOL 6 serving as the SVOL 6 (that is, the replication destination of the write data 2), and the write data 2 are read from the VOL 6 serving as the PVOL 6 (that is, the replication source of the write data 2). Likewise, the VOL 6 may sometimes be assigned with the two VOL attributes "SJNLVOL" and "PJNLVOL". In this case, the JNL 3 is written into the VOL 6 serving as the SJNLVOL 6 (that is, the replication destination of the JNL 3), and the JNL 3 is read from the VOL 6 serving as the PJNLVOL 6 (that is, the replication source of the JNL 3). Hereafter, a VOL 6 having both "SVOL" and "PVOL" as VOL attributes will be denoted as "SPVOL 6", and a VOL 6 having both "SJNLVOL" and "PJNLVOL" as VOL attributes will be denoted as "SPJNLVOL 6".

The JNL 3 is a data set generated by the storage subsystem 100 on the basis of the write data 2. The JNL 3 comprises the write data 2 and update data 4. The update data 4 are data for managing the storage position, update order, and so on of the write data 2.

FIG. 2 shows a constitutional example of the update data 4. FIG. 3 shows a constitutional example of a write data VOL and a JNLVOL, and particularly an illustrative example of the update data 4 shown in FIG. 2. Hereafter, for the sake of convenience, positions from the top of the storage area of the VOL 6 (in other words, positions in relation to the top) will be denoted as "addresses". Further, the write data 2 comprised in the JNL 3 including the update data 4 will be referred to as "JNL write data 2", and the write data 2 that are written in accordance with a write command will be referred to as "original write data 2".

The data element items constituting the update data 4 are the following items (1) through (5), for example:

(1) Time at which write command was received
(2) Update number
(3) Logical address of write command (for example, a set comprising the VOL ID and VOL address of the VOL into which the original write data 2 are to be written)
(4) Data size of write data
(5) Logical address of JNLVOL storing write data It can be seen from the example of the update data 4 shown in FIG. 2 that the JNL write data 2 correspond to the original write data 2 written in accordance with a write command received at 22:20 and ten seconds on Mar. 17, 1999. As shown in FIG. 3, the write command indicates that writing of the original write data 2 is to begin from an address 700 of the write data VOL 6 which has a VOL ID (the identifier of the VOL 6) of "1", and that the data size of the original write data 2 is 300 KB. It can also be seen from FIG. 3 that writing of the JNL write data 2 corresponding to the original write data 2 is begun from an address 1500 of the JNLVOL 6 which has a VOL ID of "4". It can be seen that the JNL write data 2 are write data 2 written on a fourth update. Note that the update data 4 need only include one of the write command reception time and update number. Further, when a write command from the host terminal 180 contains the time at which the write command was created, this creation time within the write command may be included in the update data 4 instead of the write command reception time.

As shown in FIG. 3, for example, the JNLVOL 6 is divided into a storage area (update data area) 7 for storing the update data 4 and a storage area (write data area) 8 for storing write data. The update data area 7 stores update data in update number order from the top of the update data area 7 such that when the end of the update data area 7 is reached, the next update number is stored from the top of the update data area 7. The write data area 8 stores the JNL write data 2 in sequence from the top of the write data area 8 such that when the end of the write data area 8 is reached, the next JNL write data 2 are stored from the top of the write data area 8. The size ratio of the update data area 7 and write data area 8 may be a fixed value, or may be set variably by a specific terminal such as an SVP (maintenance terminal) to be described below or the host terminal 180. Information relating to these constitutions may be incorporated into pointer management data 700 to be described below. In the following description, the JNLVOL 6 is divided into the update data area 7 and write data area 8, but a system whereby sets of the update data 4 and write data 2 are stored consecutively from the top of the JNLVOL 6 may be employed (in other words, the JNLVOL 6 does not have to be divided into the update data area 7 and write data area 8).

Referring back to FIGS. 1A and 1B, in the data processing system 1 a VOL pair 14 is constituted by the PVOL 6 and SVOL 6, and another VOL pair (to be referred to hereafter as "mirror pair" for convenience) 12 is constituted by the PJNLVOL 6 and SJNLVOL 6. The PVOL 6 of a certain VOL pair 14 is associated with the PJNLVOL 6 of the mirror pair 12, and the SVOL 6 of the VOL pair 14 is associated with the SJNLVOL 6 of the same mirror pair 12. As a result, a VOL group 16 comprising the PVOL 6, PJNLVOL 6, SJNLVOL 6, and SVOL 6, or in other words a VOL group 16 comprising the VOL pair 14 and the mirror pair 12, is established. With this constitution, the original write data 2 stored in the PVOL 6 are replicated in the SVOL 6 according to the following sequence: the original write data 2 are stored in the PVOL 6; the JNL 3 is generated on the basis of the original write data 2 and stored in the PJNLVOL 6; the JNL 3 is read from the PJNLVOL 6 and stored in the SJNLVOL 6; and the original write data 2 are restored in the SVOL 6 on the basis of the JNL 3 stored in the SJNLVOL 6. Note that, depending on the VOL pair combination, the PVOL number to SVOL number (and/or the SVOL number to PVOL number) may be set at one to two or more. Furthermore, depending on the mirror pair combination, the PJNLVOL number to SJNLVOL number (and/or the SJNLVOL number to PJNLVOL number) may be set at one to two or more.

In this embodiment, the VOL group 16 comprising the PVOL 6, PJNLVOL 6, SJNLVOL 6, and SVOL 6 may be defined by determining the PJNLVOL 6 and SJNLVOL 6 that are to constitute the mirror pair 12, the PVOL 6 to be associated with the PJNLVOL 6 of the mirror pair 12, and the SVOL 6 to be associated with the SJNLVOL 6 of the mirror pair 12. Also in this embodiment, whether to set one or more than one data replication path and replication direction (that is, the path and direction of the write data 2) may be determined according to the manner in which a plurality of the VOL groups 16 is combined, or more specifically, whether to provide one VOL group 16 and another VOL group 16 with the same PVOL, or whether to use the same VOL 6 as the PVOL of one VOL group 16 and the SVOL of another VOL group 16, for example. Hereafter, for the sake of convenience, a data replication system having two or more data replication paths and replication directions will be referred to as a "multitarget system", and a data replication system having one data replication path and replication direction will be referred to as a "multihop system".

First, referring to FIG. 1A, an outline of data replication processing using the multitarget system will be described.

As shown in FIG. 1A, the single PVOL 6A1 provided in the first storage subsystem 100A is associated with the first PJNLVOL 6A2 and second PJNLVOL 6A3 provided in the same storage subsystem 100A. The first PJNLVOL 6A2 is associated with a first SJNLVOL 6B1 provided in the second storage subsystem 100B, and the first SJNLVOL 6B1 is associated with a first SVOL 6B2 provided in the same storage subsystem 100B. Meanwhile, the second PJNLVOL 6A3 is associated with a second SJNLVOL 6C1 provided in the third storage subsystem 100C, and the second SJNLVOL 6C1 is associated with a second SVOL 6C2 provided in the same storage subsystem 100C. As a result of this configuration, a first and second data replication path and replication direction are defined, and hence the following processing is performed in the data processing system 1.

The first storage subsystem 100A receives the original write data 2 from the first host terminal 180A, and stores the original write data 2 in the PVOL 6A1. Further, the first storage subsystem 100A generates a duplicate JNL (first and second JNLs hereafter) 3 comprising an update number denoting the update order to the PVOL 6A1 at that time, and stores the first JNL 3 and second JNL 3 in the first PJNLVOL 6A2 and second PJNLVOL 6A3 respectively (duplication of the JNL may be performed in a cache memory 130 to be described below, for example). The update number contained in the first and second JNLs 3 is the same. Note that when the update number contained in the first and second JNLs 3 is the same, the first and second JNLs 3 may be generated by other processing than duplication processing.

Following this processing, replication processing along the first replication path and replication direction, i.e. the path having the PVOL 6A1 as a replication start VOL, the first PJNLVOL 6A2 and first SJNLVOL 6B1 as relay VOLs, and the first SVOL 6B2 as a replication goal VOL, is performed such that the original write data 2 written in the PVOL 6A1 are restored in the first SVOL 6B2. More specifically, at a predetermined or arbitrary timing, the second storage subsystem 100B generates a JNL read command to read the first JNL 3 from the first PJNLVOL 6A2, and transmits this JNL read command to the first storage subsystem 100A. For example, the JNL read command may simply denote a command to read a JNL, or may denote a command to read the first JNL 3 that comprises the youngest update number (in other words, the next update number after the update number in the first JNL 3 that was read on the previous occasion) from among the unread first JNLs 3 (more specifically, a read command containing the update number and the VOL ID of the first PJNLVOL 6A2, for example). In response to the read command, the first storage subsystem 100A reads the first JNL 3 having the update number specified in the read command from the first PJNLVOL 6A2, and returns the read first JNL 3 to the second storage subsystem 100B, which is the transmission source of the read command. The second storage subsystem 100B stores the first JNL 3 received from the first storage subsystem 100A in the first SJNLVOL 6B1. Further, at a predetermined or arbitrary timing, the second storage subsystem 100B reads from the first SJNLVOL 6B1 the first JNL 3 that comprises the youngest update number (in other words, the next update number after the update number in the first JNL 3 that was read on the previous occasion) from among the one or more first JNLs 3 that have not yet been subjected to restoration processing, and stores the JNL write data 2 within the read first JNL 3 in the first SVOL 6B2 as the original write data 2. Note that the timing at which the first JNL 3 is written into the first SJNLVOL 6B1 and the timing at which the first JNL 3 is read from the first SJNLVOL 6B1 may be the same or different. In other words, the update number in the first JNL 3 that is written into the first SJNLVOL 6B1 at a certain timing and the update number in the first JNL 3 that is read from the first SJNLVOL 6B1 at the same or a close timing may be the same or different.

Further, replication processing along the second replication path and replication direction, i.e. the path having the PVOL 6A1 as a replication start VOL, the second PJNLVOL 6A3 and second SJNLVOL 6C1 as relay VOLs, and the second SVOL 6C2 as a replication goal VOL, is performed such that the original write data 2 written in the PVOL 6A1 are restored in the second SVOL 6C2. The specific flow of processing is similar to the replication processing along the first replication path and replication direction. Note that on at least one of the first and second replication paths and replication directions, the first storage subsystem 100A may transmit the JNL 3 to be written and the write command to the SJNLVOL 6B1 or 6B2 so that the JNL3 is stored in the SJNLVOL 6B1 or 6B2.

An outline of replication processing following the multi-target system was described above. According to this replication processing, a plurality of JNLs 3 having the same update number are generated on the basis of the original write data 2 written in the PVOL 6A1, and the plurality of JNLs 3 are stored respectively in the plurality of PJNLVOLs 6A2 and 6A3 that are associated with the PVOL 6A1. The JNLs 3 are then read respectively, in order of the update numbers in the JNLs 3, from the PJNLVOLs 6A2 and 6A3 into the SJNLVOLs 6B1 and 6C1 which constitute the mirror pairs 12 with the PJNLVOLs 6A2 and 6A3 respectively, whereupon identical original write data 2 to the original write data 2 written in the PVOL 6A1 are restored on the basis of the JNLs 3 in the SVOLs 6B2 and 6C2 constituting the VOL pairs 14 with the PVOL 6A1 (in other words, the SVOLs 6B2 and 6C2 associated respectively with the SJNLVOLs 6B1 and 6C1 serving as the replication destinations of the JNLs 3). As a result, data consistency can be maintained between the second storage subsystem 100B and third storage subsystem 100C without the need for the two storage subsystems 100B, 100C to make inquiries of each other as to the state of data update.

Next, referring to FIG. 1B, an outline of data replication processing following the multihop system will be described.

As shown in FIG. 1B, a PJNLVOL 6B1\* provided in the second storage subsystem 100B is associated with a PVOL 6B2 provided in the same storage subsystem 100B. An SJNLVOL 6A2 provided in the first storage subsystem 100A is associated with the PJNLVOL 6B1, and an SPVOL 6A1 provided in the same storage subsystem 100A is associated with the SJNLVOL 6A2 as an SVOL (an SVOL constituting a VOL pair 14 with the PVOL 6B2). A PJNLVOL 6A3 provided in the same storage subsystem 100A is associated with the SPVOL 6A1 with the SPVOL 6A1 serving as a PVOL. An SJNLVOL 6B1 provided in the third storage subsystem 100C is associated with the PJNLVOL 6A3, and an SVOL (an SVOL constituting a VOL pair 14 with the SPVOL 6A1 serving as a PVOL) 6C2 provided in the same storage subsystem 100C is associated with the SJNLVOL 6B1. By means of this constitution, a single data replication path and replication direction is defined with the PVOL 6B2 provided in the second storage subsystem 100B serving as the replication start VOL, the SVOL 6C2 provided in the third storage subsystem 100C serving as the replication goal VOL, and the VOLs 6B2, 6A2, 6A1, 6B3, and 6A2 serving as the relay VOLs, and hence the following processing is performed in the data processing system 1.

The second storage subsystem 100B receives the original write data 2 from the second host terminal 180B and stores the original write data 2 in the PVOL 6B2. Further, the second storage subsystem 100B generates a JNL 3 comprising an update number indicating the update order of the PVOL 6B2 at this time, and stores the JNL 3 in the PJNLVOL 6B1.

At a predetermined or arbitrary timing, the first storage subsystem 100A creates a JNL read command to read the JNL 3 from the PJNLVOL 6B1, and transmits the JNL read command to the second storage subsystem 100B. The JNL read command may simply denote a command to read a JNL, for example, or may denote a command to read the JNL that comprises the youngest update number (in other words, the next update number after the update number in the JNL that was read on the previous occasion) from among the unread JNLs 3 (more specifically, a read command containing the update number and the VOL ID of the PJNLVOL 6B1, for example). In response to the read command, the second storage subsystem 100B reads the JNL 3 having the update number specified in the read command from the PJNLVOL 6B1, and returns the read JNL 3 to the first storage subsystem 100A*, which is the transmission source of the read command. The first storage subsystem 100A stores the JNL 3 received from the second storage subsystem 100B in the SJNLVOL 6A2. Further, at a predetermined or arbitrary timing (at the same time as the JNL is stored in the SJNLVOL 6A2, for example), the first storage subsystem 100A reads from the SJNLVOL 6A2 the JNL 3 that comprises the youngest update number (in other words, the next update number after the update number in the first JNL3 that was read on the previous occasion) in the one or more JNLs 3 that have not yet been subjected to restoration processing, and stores the JNL write data 2 within the read JNL 3 in the SPVOL 6A1 as the original write data 2. Note that the timing at which the JNL 3 is written into the SJNLVOL 6A2 and the timing at which the JNL 3 is read from the SJNLVOL 6A2 may be the same or different. In other words, the update number in the JNL 3 that is written into the SJNLVOL 6A2 at a certain timing, for example, and the update number in the JNL 3 that is read from the SJNLVOL 6A2 at the same or a close timing may be the same or different.

Similar processing to the data replication processing that is performed in the VOL group 16 comprising the PVOL 6B2, PJNLVOL 6B1, SJNLVOL 6A2, and SPVOL 6A1 is performed in the other VOL group 16 comprising the SPVOL 6A1, PJNLVOL 6A3, SJNLVOL 6C1, and SPVOL 6A1. More specifically, the first storage subsystem 100A generates from the SPVOL 6A1 a JNL 3 comprising the update number showing the update order of the SPVOL 6A1, and stores the JNL 3 in the PJNLVOL 6A3. Next, the first storage subsystem 100A receives a read command for the JNL 3 from the third storage subsystem 100C, and in response, reads the JNL 3 from the PJNLVOL 6A3 and transfers the JNL 3 to the third storage subsystem 100C. The JNL 3 is then written into the SJNLVOL 6C1 in the third storage subsystem 100C, whereby the JNL write data 2 in the JNL 3 are restored in the SVOL 6C2 as the original write data 2.

An outline of replication processing following the multihop system was described above. Note that although JNL replication from the PJNLVOL to the SJNLVOL is performed in this case by having the storage subsystem 100 comprising the SJNLVOL transmit a read command to the storage subsystem 100 comprising the PJNLVOL, JNL replication may be performed conversely by having the storage subsystem 100 comprising the PJNLVOL transmit a write command to the storage subsystem 100 comprising the SJNLVOL.

According to this multihop system replication processing, the JNL 3 comprising an update number is generated on the basis of the original write data 2 written in the PVOL 6B2 of the second storage subsystem 100B, and this JNL 3 is stored in the PJNLVOL 6B1 relating to the PVOL 6B2. The write data 2 are then transferred downstream along a single defined replication path and replication direction such that eventually, identical data to the original write data 2 written in the PVOL 6B2 serving as the replication start VOL are replicated in the SVOL 6C2 of the third storage subsystem 100C, which serves as the replication goal VOL of the replication path and replication direction. As a result, data consistency can be maintained between the second storage subsystem 100B and third storage subsystem 100C without the need for the two storage subsystems 100B, 100C to make inquiries of each other as to the state of data update.

The data processing system 1 is capable of switching dynamically between the multitarget system and multihop system described above, or combining the multitarget system and multihop system. If a fault occurs in the first host terminal 180A when the multitarget system shown in FIG. 1A is employed, for example, the data processing system 1 can switch to the multihop system shown in FIG. 1B. Alternatively, if a fault occurs in the second host terminal 180B when the multihop system shown in FIG. 1B is employed, for example, the data processing system 1 can switch to the multitarget system shown in FIG. 1A. Furthermore, when the multitarget system is used with four or more storage subsystems 100, for example, at least one of the first replication path and replication direction and the second replication path and replication direction can be switched to a multihop system replication path and replication direction.

Next, referring to FIGS. 4 through 20, the basic constitution and processes of the data processing system 1 of this embodiment will be described, after which the multitarget system will be described in detail as a first example of this embodiment, after which the multihop system will be described in detail as a second example of this embodiment.

Figure 4:
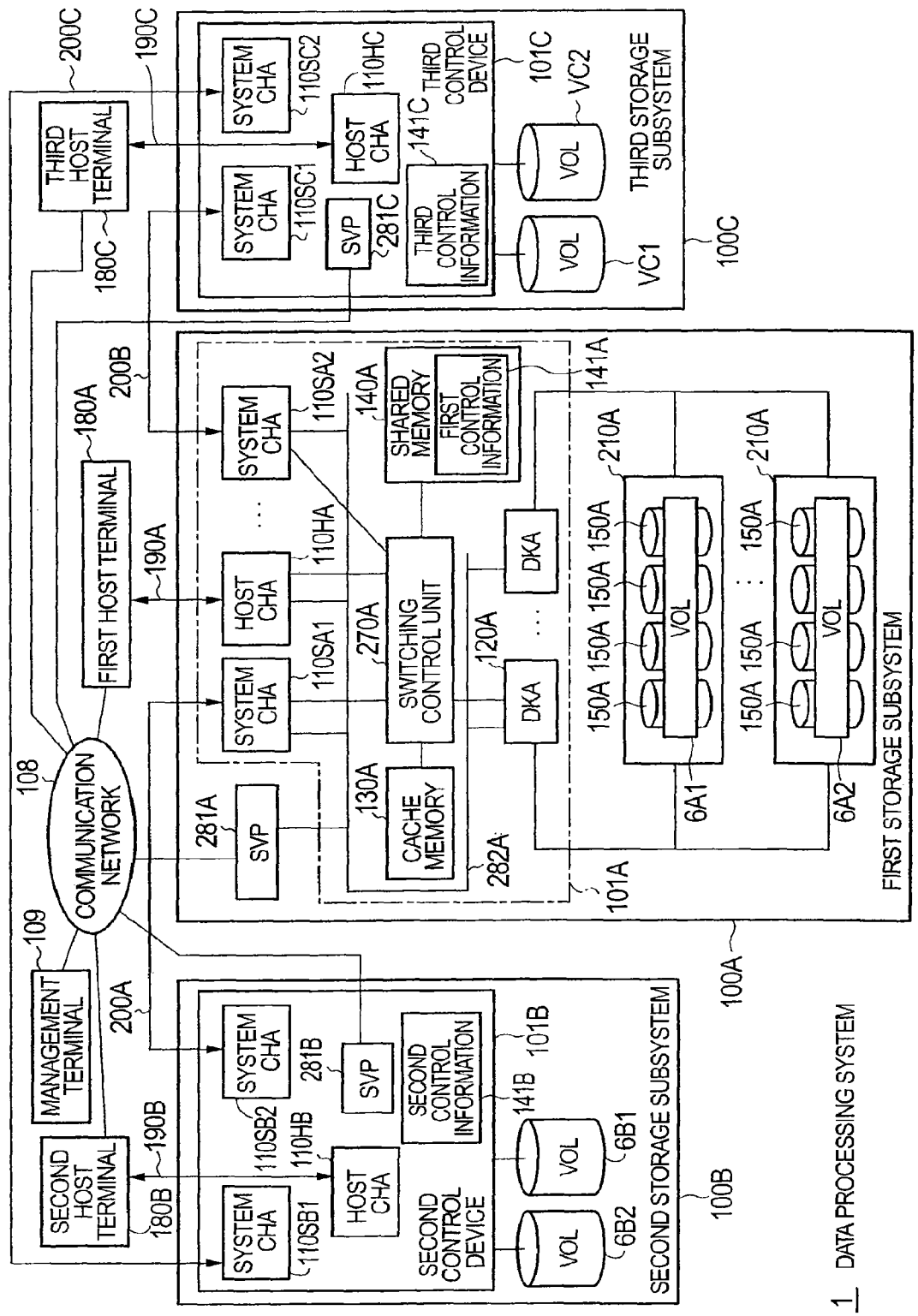
FIG. 4 shows a constitutional example of a data processing system 1 according to an embodiment of the present invention.

FIG. 4 shows a constitutional example of the data processing system 1. Note that in the figure, the constitution of the first storage subsystem 100A is illustrated in detail, but since the other storage subsystems 100B and 100C are constituted similarly to the first storage subsystem 100A, they are only illustrated schematically. In the following, the first storage subsystem 100A will be described as a representative example, and description of the other storage subsystems 100B and 100C will be provided where appropriate.

The first storage subsystem 100A is a disk array system such as a RAID (redundant array of independent disks) system, for example. The first storage subsystem 100A comprises a control device 101A for controlling the processing that is performed by the first storage subsystem 100A, a RAID group 210A, and a service processor (SVP) 281A, for example. The control device 101A comprises a plurality of disk adapters (DKA hereafter) 120A, a plurality of channel adapters (CHA hereafter) 110A, a cache memory 130A, a shared memory 140A, and a switching control unit 270A, for example.

The RAID group 210A comprises a plurality of storage devices 150A which provide redundant storage based on a RAID such as RAID 1 or RAID 5, for example. Each storage device 150A may be constituted by a storage device such as a hard disk drive (or a hard disk itself), a semiconductor memory device, or a magneto-optical disk drive (or a magneto-optical disk itself), for example. At least one VOL 6A may be set as a logical storage area in the physical storage area provided by the storage devices 150A. A plurality of write data from the host terminal 180A may be stored in the VOLs 6A. Further, first control information 141A and the like, to be described below, may be stored in other VOLs 6A and used as a system area. Note that not all of the storage devices 150A need be positioned within the enclosure of the first storage subsystem 100A. For example, the VOLs provided in the other storage subsystems 100B and 100C may be used as VOLs of the first storage subsystem 100A.

Each DKA 120A serves to control data exchange between the storage devices 150A. Each DKA 120A is constituted as a microcomputer system comprising a CPU, ROM, RAM, and so on, for example. A plurality of DKAs 120A is provided in the first storage subsystem 100A. The DKAs 120 perform block level data transfer with the storage devices 150A based on a protocol such as SCSI or iSCSI, for example.

Each of the plurality of CHAs 110A may be constituted as a microcomputer system, similarly to the DKAs 120. The plurality of CHAs 110A comprises one or more host CHAs 110HA for performing data communication with the host terminal 180A via a connection path 190A, and system CHAs 110SA1, 110SA2 for performing data communication with the other storage subsystems 100B and 100C via respective connection paths 200A, 200B. Note that at least one of the connection paths 190A, 200A, and 200B may be a communication network or a dedicated path line. Further, the host CHAs 110HA may be prepared individually in accordance with the type of host terminal 180 (for example, server, mainframe, and so on).

The cache memory 130A may be constituted by volatile or nonvolatile semiconductor memory, for example. The cache memory 130A stores the write data 2 from the host terminal 180A (the data to be written into the VOL), and the write data 2 read from the VOL 6A.

The shared memory 140A may be constituted by nonvolatile or volatile semiconductor memory, for example. The shared memory 140A stores various commands received from the host terminal 180A, the first control information 141A used to control the first storage subsystem 100A, and so on, for example. The commands, first control information 141A to be described below, and so on may be stored redundantly by a plurality of shared memories 140A. Note that the cache memory 130A and shared memory 140A may be provided individually, or a single memory may be divided into a part which is used as a cache memory area and a part which is used as a shared memory area.

The switching control unit 270A connects the DKAs 120A, host CHA 110HA, system CHAs 110SA1 and SA2, cache memory 130A, and shared memory 140A to each other. The switching control unit 270A may be constituted by a very high speed crossbar switch or the like, for example.

The SVP (service processor) 281A gathers and monitors the state of each part of the first storage subsystem 100A via an internal network (a LAN, for example) 282A, for example. The SVP 281A outputs this gathered information on the internal state to an external management terminal (not shown) as raw data or statistical data. Examples of the information that can be gathered by the SVP 281A include the device constitution, a power alarm, a temperature alarm, the input/output velocity, and so on. Through the SVP 281A, a system manager is able to modify the RAID configuration settings, perform blockage processing on various packages (for example, the CHAs 110A and DKAs 120A), and so on from the management terminal. Further, the SVP 281A may be operated remotely from a management terminal 109 via a communication network (a LAN or the Internet, for example) 108.

Next, an example of the processing performed by the first storage subsystem 100A will be described. The host CHA 110HA receives a write command and the write data 2 from the host terminal 180A via the connection path 190A. The received write command is stored in the shared memory 140A, and the received write data 2 are stored in the cache memory 130A. The DKA 120A searches the shared memory 140A periodically. When the DKA 120A discovers an unprocessed write command in the shared memory 140A, it reads the write data 2 from the cache memory 130A in accordance with the write command, and performs address conversion and the like. The DKA 120A then stores the write data 2 in the storage devices 150A constituting the VOL 6A specified in the write command.

A case in which a read command from the host terminal 180A is processed will now be described. When the host CHA 110HA receives a read command from the host terminal 180A, the read command is stored in the shared memory 140A. When the DKA 120A discovers an unprocessed read command in the shared memory 140A, the DKA 120A reads the write data 2 from the storage devices 150A constituting the VOL 6A specified in the read command. The DKA 120A then stores the read write data 2 in the cache memory 130A. The DKA 120A also notifies the host CHA 110HA via the shared memory 140A that reading of the requested write data 2 is complete. The host CHA 110HA reads the write data 2 from the cache memory 130A, and transmits the write data 2 to the host terminal 180A.

An example of data replication (also referred to as "remote copying" hereafter) performed between the first storage subsystem 100A and second storage subsystem 100B via the connection path 200A (which may also be referred to as a remote copying line) will now be described. Note that this description may also be applied to data replication between the first storage subsystem 100A and third storage subsystem 100C via the connection path 200B, and data replication between the second storage subsystem 100B and third storage subsystem 100C via a connection path 200C.

Remote copying is performed in response to a write command or read command that is transferred between the storage subsystems 100A, 100B, rather than a write command or read command from the host terminal 180A, and hence remote copying is data replication processing which does not require the host terminal 180A.

More specifically, for example, whenever the control device 101A of the first storage subsystem 100A updates the PVOL 6A, the control device 101A generates the aforementioned JNL 3 and stores it in the PJNLVOL 6A, and when the control device 101A receives a read command from the second storage subsystem 100B (or issues a write command to the second storage subsystem 100B), the control device 101A transmits the JNL 3 in the PJNLVOL 6A to the second storage subsystem 100B via the connection path 200A. Hence the JNL 3 is stored in the second storage subsystem 100B at an asynchronous timing to storage of the JNL 3 in the first storage subsystem 100A. When restoration processing using the JNL 3 is performed by the second storage subsystem 100B, the SVOL 6B becomes a replica of the PVOL 6A.

A constitutional example of the storage subsystem 100 of this embodiment was described above. Needless to say, the storage subsystem 100 need not be limited to the constitution described above. For example, the connection path 200C need not be provided. Furthermore, the management terminal 109 may control the SVPs 281A to 281C of the respective storage subsystems 100A to 100C remotely via the communication network 108 in order to record the first through third control information 141A to 141C in the respective storage subsystems 100A to 100C. The control device 101 is not limited to the constitution described above, and may be constituted by memory that is capable of storing control information, write data, and the like, an interface device (to be abbreviated to I/F hereafter) for the host terminal 180, an I/F for the other storage subsystems, an I/F for the storage devices 150, and a control unit (a CPU, for example) which controls communication and the like through these I/Fs on the basis of the information in the memory, for example. Further, in the storage subsystem 100, a first data transfer performed from the host terminal 180 (or another storage subsystem) to the cache memory 130 via the CHA 110 and switching control unit 270 and a second data transfer performed from the cache memory 130 to the host terminal (or another storage subsystem) via the switching control unit 270 and CHA 110 may be performed simultaneously if the CHA 110 which controls the first data transfer and the CHA 110 which controls the second data transfer are different and/or the caches serving as the transfer source and transfer destination of the data are different (for example, if the memory address of the transfer source cache and the memory address of the transfer destination cache are different). Likewise, in the storage subsystem 100, a third data transfer performed from the storage device 150 to the cache memory 130 via the DKA 120 and switching control unit 270 and a fourth data transfer performed from the cache memory 130 to the storage device 150 via the switching control unit 270 and DKA 120 may be performed simultaneously if the DKA 120 which controls the third data transfer and the DKA 120 which controls the fourth data transfer are different and/or the caches serving as the transfer source and transfer destination of the data are different (for example, if the memory address of the transfer source cache and the memory address of the transfer destination cache are different). Moreover, if the transfer destination in the first data transfer or the transfer source in the second data transfer differs from the transfer destination in the third data transfer and/or the transfer source in the fourth data transfer, the first data transfer or second data transfer may be performed simultaneously with the third data transfer and/or the fourth data transfer. To perform such simultaneous transfer, an appropriate band (transfer speed) is required for each transfer path (for example, the transfer path between the CHA 110 and switching control unit 270, the transfer path between the DKA 120 and switching control unit 270, and the transfer path between the switching control unit 270 and cache memory 130). When a single switching control unit 270 is connected to two CHAs 110, two DKAs 120, and two cache memories 130, for example, the band between the switching control unit 270 and the cache memories 130 needs to be at least the same as the width of the band between the CHA 110 (or DKA 120) and the switching control unit 270 for the purposes of multiplex transmission, and is preferably at least twice the width thereof. Further, the writing and reading speed of the storage device 150 and the writing and reading speed of the cache memory 130 are preferably higher than the transfer speed of the path between the storage device 150 and cache memory 130, and high enough to ensure that underrun errors and overrun errors do not occur therebetween. Also, the host terminals 180A to 180C and storage subsystems 100A to 100C may be connected to the same communication network (a SAN (storage area network, for example).

Figure 5:
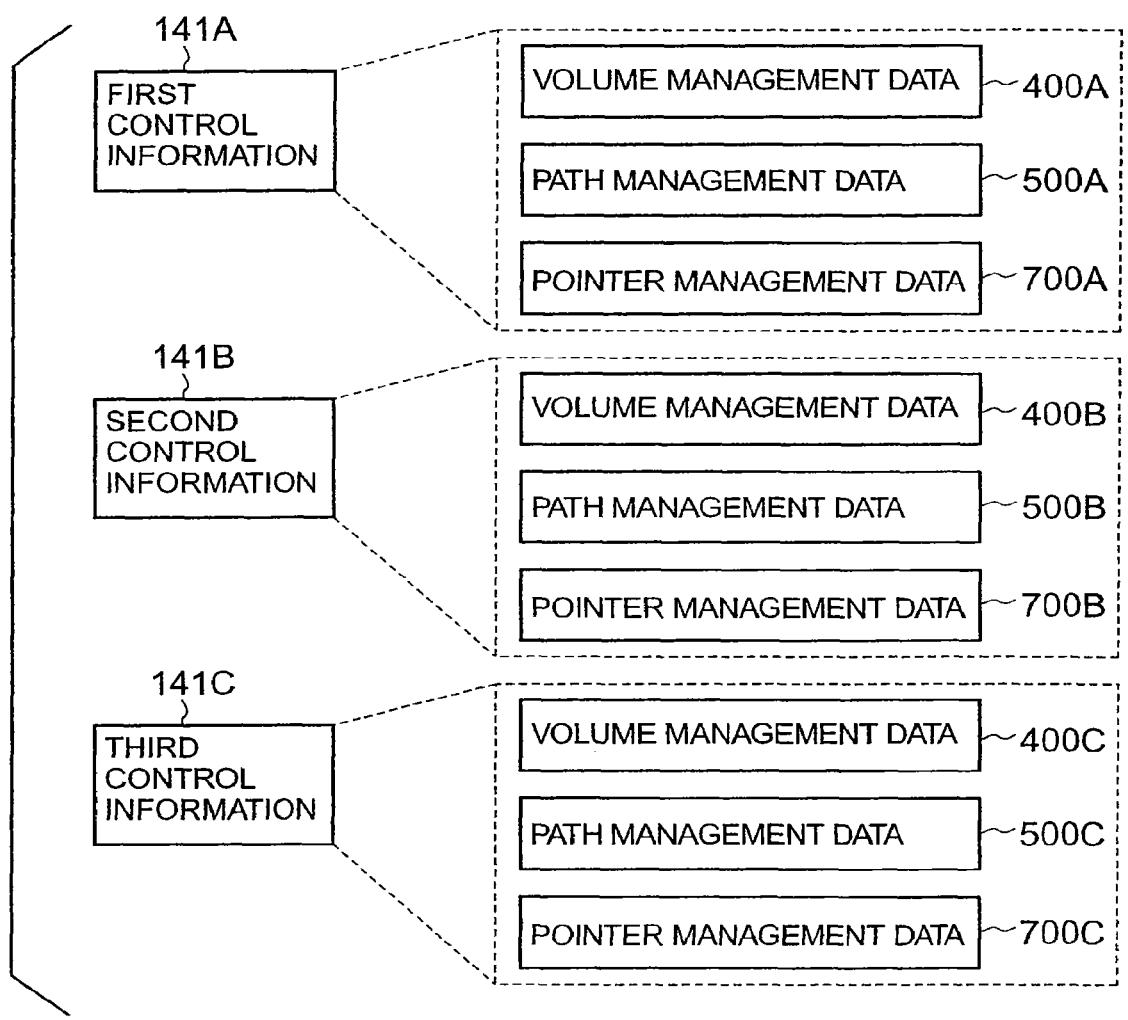
FIG. 5 shows constitutional examples of control information 141A to 141C respectively.

Incidentally, the first control information 141A is stored in memory that is searchable from the CHA 110 and DKA 120, for example the shared memory 140A. The first control information 141A may have a content that is unique to the first storage subsystem 100A, or a content that is shared among all of the storage subsystems 100A to 100C in the data processing system 1. The first control information 141A may be input from the SVP 281A or from the management device 109 via the communication network 108 and SVP 281A. All or a part of the first control information 141A input from the SVP 281A may be stored in at least one of the shared memory 140, cache memory 130, CHA 110, DKA 120, and storage device 150 in either a concentrated or dispersed fashion, for example. In this embodiment, the first control information 141A is recorded in the shared memory 140A from the CHA 110 or DKA 120 via the internal network 282A, for example. As shown in FIG. 5, the first control information 141A comprises VOL management data 400A, path management data 500A, and pointer management data 700A, for example. These data will be described below.

FIG. 6A shows a constitutional example of the VOL management data 400A when the multitarget system shown in FIG. 1A is employed. FIG. 6B shows a constitutional example of the VOL management data 400A when the multihop system shown in FIG. 1B is employed. Note that in FIG. 6B, differences with the content of FIG. 6A are circled by a dotted line.

The VOL management data 400A are data for managing the plurality of VOLs 6A, and include as data elements a VOL ID, a VOL condition, a format, a VOL capacity (in gigabyte units, for example), and a physical address, relating to each of the VOLs 6A, for example.

The VOL ID is an identifier for identifying the VOL 6A. The identifier is a number, for example. Note that in FIGS. 6A and 6B, the VOL ID "1" denotes the VOL 6A1 shown in FIGS. 1A and 1B, the VOL ID "4" denotes the VOL 6A2 shown in FIGS. 1A and 1B, and the VOL ID "5" denotes the VOL 6A3 shown in FIGS. 1A and 1B.

The VOL condition is a data element expressing the condition of the VOL 6A, and may be expressed as "normal", "primary", "secondary", "abnormal", "unused", and so on, for example. A VOL 6A having a VOL condition of "normal" or "primary" may be accessed normally from the host terminal 180A. A VOL 6A having a VOL condition of "secondary" is a VOL 6A for which access from the host terminal 180A may be permitted. A VOL 6A having a VOL condition of "primary" is a PVOL or PJNLVOL. A VOL 6A having a VOL condition of "secondary" is an SVOL or SJNLVOL. A VOL 6A having a VOL condition of "abnormal" cannot be accessed normally due to a fault. Here, the term "fault" indicates a defect in the storage device 150A which holds the VOL 6A, for example. A VOL 6A having the VOL condition "unused" denotes an unused VOL 6A. Determinations as to whether a VOL 6A having a VOL condition of "primary" is a PVOL or a PJNLVOL and whether a VOL 6A having a VOL condition of "secondary" is an SVOL or an SJNLVOL can be performed by referring to pair management sub data 501A to be described below.

The VOL capacity expresses the storage capacity of the VOL 6A.

The physical address denotes a physical storage position within the first storage subsystem 100A, and is constituted, for example, by an ID (a number, for example) identifying the storage device 150 in the first storage subsystem 100A, and a numerical value which indicates the storage area in the storage device 150 uniquely (the position from the top of the storage area in the storage device 150, for example), as shown in the drawing. Note that a single VOL 6A may be a storage area provided in a single storage device 150 or a storage area provided in a plurality of storage devices 150A depending on logical address-physical address conversion (i.e. correspondence).

From the VOL management data 400A shown in FIG. 6A, it can be learned that the VOL 6A having a VOL ID of "1", for example, has a VOL capacity of 3 GB, stores data from the top of the storage area of the storage device 150A having a storage device ID of "1", and is either a PVOL or a PJNLVOL. From the VOL management data 400A shown in FIG. 6B, it can be learned that the VOL 6A having a VOL ID of "1" is either an SPVOL or an SPJNLVOL.

FIG. 7A shows a constitutional example of the path management data 500A when the multitarget system illustrated in FIG. 1A is employed. FIG. 7B shows a constitutional example of the path management data 500A when the multihop system illustrated in FIG. 1B is employed. Note that in FIG. 7B, differences with the content of FIG. 7A are circled by a dotted line.

The path management data 500A comprise the pair management sub data 501A for managing the VOL pairs, and mirror management sub data 502A for managing the mirror pairs.

The pair management sub data 501A include as sub data elements a VOL pair ID, a pair condition, a primary storage subsystem ID, a PVOL-ID, a PJNLVOL-ID, a secondary storage subsystem ID, an SVOL-ID, an SJNLVOL-ID, and a copy complete address, relating to each of the VOL pairs, for example.

The VOL pair ID is an identifier (a number, for example) for identifying a VOL pair.

The VOL pair condition is a sub data element showing the condition of the VOL pair, which may be expressed as "normal", "abnormal", "unused", "not copied", "copying", and so on, for example. The VOL pair condition "normal" indicates that replication of the data in the PVOL 6A is being performed normally. The VOL pair condition "abnormal" indicates that replication of the PVOL 6A cannot be performed due to a fault. Here, the term "fault" denotes disconnection of the connection path 200 or the like, for example. The VOL pair condition "unused" indicates that information regarding the number of the pair corresponding to the VOL pair condition is not valid. The VOL pair condition "copying" indicates that initial copy processing to be described below is underway. The VOL pair condition "not copied" indicates that the initial copy processing to be described below has not yet been performed.

The primary storage subsystem ID is an identifier for specifying the storage subsystem 100 holding the PVOL. At least one of a number, WWN (world wide name), iSCSI name, and MAC address, for example, may be employed as the identifier.

The PVOL-ID is an identifier for the PVOL.

The PJNLVOL-ID is an identifier for the PJNLVOL that is associated with the PVOL.

The secondary storage subsystem ID is an identifier for specifying the storage subsystem 100B holding the SVOL.

The SVOL-ID is an identifier for the SVOL.

The SJNLVOL-ID is an identifier for the SJNLVOL that is associated with the SVOL.

The copy complete address is used during the initial copy processing to be described below (see FIG. 10). The copy complete address will be described below.

The mirror management sub data 502A comprises as sub data elements a mirror ID, a PJNLVOL-ID, an SJNLVOL-ID, a JNL generation update number, a JNL replication update number, and a restoration update number, for example, which are associated with each mirror pair.

The mirror ID is an identifier (a number, for example) for identifying a mirror pair.

The PJNLVOL-ID is an identifier (a number, for example) for specifying a PJNLVOL.

The SJNLVOL-ID is an identifier (a number, for example) for specifying an SJNLVOL.

The JNL generation update number shows the latest JNL number to have been generated in the corresponding mirror pair (in other words, the newest number from among the update numbers in the generated JNLs). In FIG. 7A, for example, the JNL generation update number corresponding to the mirror ID "1" is "12". This signifies that in the mirror pair corresponding to the mirror ID "1", JNLs 3 have been stored in the PJNLVOL up to the update number "11", and hence the next JNL 3 to be generated and stored in the PJNLVOL is the JNL 3 having the update number "12".

The JNL replication update number shows the latest JNL number to have been replicated in the corresponding mirror pair (in other words, the newest number from among the update numbers in the replicated JNLs). In FIG. 7A, for example, the JNL replication update number corresponding to the mirror ID "1" is "9". This signifies that in the mirror pair corresponding to the mirror ID "1", JNLs 3 have been read into the SJNLVOL up to the update number "8", and hence the next JNL 3 to be read from the PJNLVOL is the JNL 3 having the update number "9".

The restoration update number shows the latest JNL on the basis of which restoration has been performed in the corresponding mirror pair (in other words, the newest number from among the update numbers in the JNLs that have been read for the purpose of restoration). When the restoration update number is "8", for example, this signifies that restoration processing based on the JNL 3 with the update number "7" is complete, and hence the JNL 3 comprising the update number "8" is to be read from the SJNLVOL and subjected to restoration processing next. Note that FIG. 7A shows an example of the mirror management sub data 502A in the first storage subsystem 100A, which does not comprise an SVOL, and hence the restoration update number is meaningless. Also, in FIG. 7B no JNL is generated by the first storage subsystem 100A in regard to the mirror ID "1", and hence the JNL generation update number is meaningless.

By referring to the path management data 500A described above, the CHAs 110A and DKAs 120A in the first storage subsystem 100A can determine the VOL for storing write data from the host terminal 180A, the update number of the JNL 3 that is to be read from a VOL and stored in a VOL, the VOL from which this JNL 3 is to be read and the VOL in which it is to be stored, the VOL that is to be used for restoration processing after reading a JNL 3 of a certain update number from a certain VOL, and so on. In the path management data 500A shown in FIG. 7A, for example, by referring to each of the sub data elements associated with the VOL pair IDs "1", "2" and mirror IDs "1", "2", the configuration of the multitarget system shown in FIG. 1A can be specified. Further, by referring to each of the sub data elements associated with the VOL pair IDs "1", "2" and mirror IDs "1", "2" in the path management data 500A shown in FIG. 7B, the configuration of the multihop system shown in FIG. 1B can be specified.

When a fault occurs in the first host terminal 180A, for example, the first control device 101A of the first storage subsystem 100A can switch from the multitarget system shown in FIG. 1A to the multihop system shown in FIG. 1B by switching the content of the path management data 500A from the content shown in FIG. 7A to the content shown in FIG. 7B (more specifically, by reversing the PVOL and SVOL corresponding to the VOL ID "1" and reversing the PJNLVOL and SJNLVOL corresponding to the mirror ID "1"). Further, when a fault occurs in the second host terminal 180B, for example, the first control device 101A can switch from the multihop system shown in FIG. 1B to the multitarget system shown in FIG. 1A by switching the content of the path management data 500A from the content shown in FIG. 7B to the content shown in FIG. 7A (more specifically, by reversing the PVOL and SVOL corresponding to the VOL ID "1" and reversing the PJNLVOL and SJNLVOL corresponding to the mirror ID "1").

Note that when four or more storage subsystems 100 are provided in the data processing system 1, for example, the first storage subsystem 100A cannot specify the location of the replication start VOL or the replication goal VOL if the content of the path management data 500A is unique to the first storage subsystem 100A, and hence it may be impossible to specify the entire configuration of the multitarget system or multihop system. However, since the other storage subsystems 100 are provided with unique path management data 500, and information relating to the replication source of the JNL and the replication destination JNLVOL (for example, the VOL ID and storage subsystem ID) are recorded in the path management data 500, replication processing can be realized in accordance with at least one of the multitarget system, the multihop system, and a combination of both, regardless of the number of storage subsystems 100.

Figure 9:
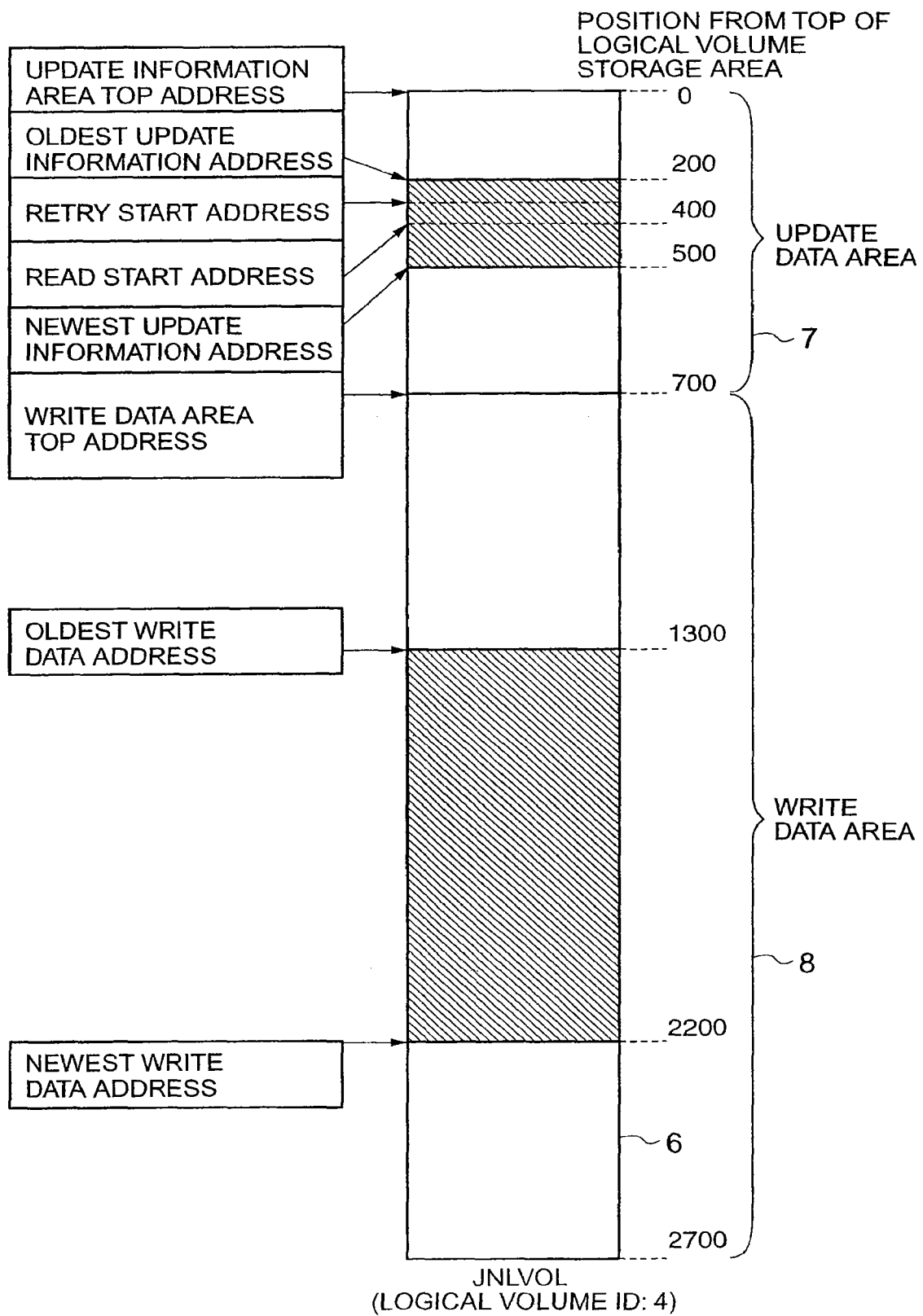
FIG. 9 shows the constitution of a JNLVOL specified by the pointer management data 700 illustrated in FIG. 8.

FIG. 8 shows a constitutional example of the pointer management data 700. FIG. 9 shows a JNLVOL constitution determined from the pointer management data 700 shown in FIG. 8.

As shown in FIG. 8, the pointer management data 700 are prepared for each JNLVOL. The pointer management data 700 include as data elements an update data area top address, a write data area top address, a newest update data address, an oldest update data address, a newest write data address, an oldest write data address, a read start address, and a retry start address, for example.

The update data area top address is the logical address of the top of the storage area (update data area) for storing the update data 4 of the JNLVOL.

The write data area top address is the logical address of the top of the storage area (write data area) for storing the write data 2 of the JNLVOL.

The newest update data address is the logical address of the top [of the area] that is used to store the update data 4 in the next JNL 3 to be stored (in other words, information indicating the position from which writing of the update data 4 in the next JNL 3 is to begin).

The oldest update data address is the logical address of the top of the area for storing the update data 4 of the oldest JNL 3 (the JNL 3 with the smallest update number).

The newest write data address is the logical address of the top [of the area] that is used to store the write data 2 in the next JNL 3 to be stored (in other words, information indicating the position from which writing of the write data 2 in the next JNL 3 is to begin).

The oldest write data address is the logical address of the top of the area for storing the write data 2 of the oldest JNL 3 (the JNL 3 with the smallest update number).

The read start address and retry start address are data elements that are used by the first storage subsystem 100A alone in journal read reception processing to be described below. A detailed description of the read start address and retry start address will be provided below.

From the pointer management data 700 shown in FIGS. 8 and 9, it can be learned that the update data area 7 ranges from the address 0 (top) to the address 699 in the VOL 6 having the JNLVOL-ID "4", and that the write data area 8 ranges from the address 700 to the address 2699 in the VOL 6 having the JNLVOL-ID "4". It can also be learned that the update data 4 of a certain JNL 3 are stored within an address range of 200 to 499 in the VOL 6 having the JNLVOL-ID "4", and that the update data 4 of the JNL 3 with the next update number will be written from the address 500 in the VOL 6 having the JNLVOL-ID "4". Further, it can be learned that the write data 2 in this JNL 3 are stored within an address range of 1300 to 2199 in the VOL 6 having the JNLVOL-ID "4", and that the write data 2 of the next JNL 3 will be written from the address 2200 in the VOL 6 having the JNLVOL-ID "4".

Next, processing relating to the replication of data from the first storage subsystem 100A to the second storage subsystem 100B, in which the first storage subsystem 100A serves as the primary storage subsystem (i.e. the storage subsystem comprising a PVOL) and the second storage subsystem 100B serves as the secondary storage subsystem (i.e. the storage subsystem comprising an SVOL), will be described with reference to FIGS. 10 through 20. Note that in the following description, the PVOL provided in the first storage subsystem 100A is denoted as "PVOL 6A1", the PJNLVOL provided in the first storage subsystem 100A is denoted as "PJNLVOL 6A2", the SJNLVOL provided in the second storage subsystem 100B is denoted as "SJNLVOL 6B1", and the SVOL provided in the second storage subsystem 100B is denoted as "SVOL 6B2".

Figure 10:
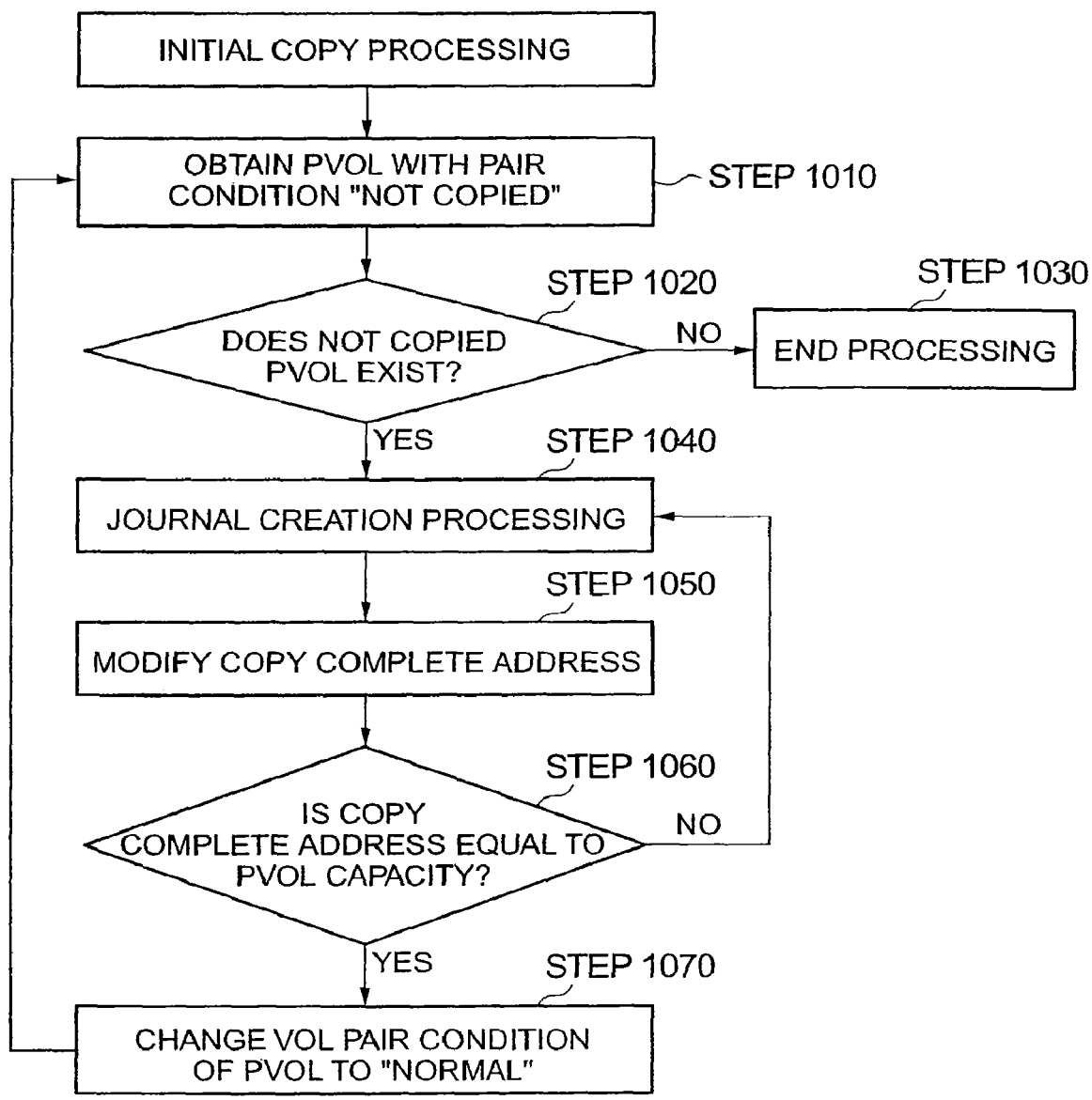
FIG. 10 is a flowchart of initial copy processing.

FIG. 10 is a flowchart of initial copy processing.

Initial copy processing is processing to prepare JNLs 3 for the PVOL 6A1 that has not yet been subjected to replication processing. During initial copy processing, JNLs 3 are created in unit sizes over the entire storage area of the PVOL 6A1 in succession from the top of the storage area using the copy complete address of the path management data 500A. The initial value of the copy complete address is 0, and increases by the created data amount every time a JNL 3 is created. Hence the address range from the top of the storage area of the VOL 6A to one address before the copy complete address indicates the JNLs 3 created during initial copy processing. By performing initial copy processing, the write data 2 of the PVOL 6A1 that have not been updated can be transferred to the SVOL 6B2 which forms a VOL pair with the PVOL 6A1. In the following description, the host CHA 110HA in the first storage subsystem 100A performs the processing, but the DKA 120A may be used instead.

On the basis of the path management data 500A in the first storage subsystem 100A, the host CHA 110HA in the first storage subsystem 100A finds the PVOL 6A1 having a VOL pair condition of "not copied", alters the VOL pair condition relating to the found PVOL 6A1 to "copying", and then performs the following processing repeatedly (steps 1010, 1020). If the PVOL 6A1 having a VOL pair condition of "not copied" does not exist, the host CHA 110HA ends the processing (step 1030).

When the PVOL 6A1 having a VOL pair condition of "not copied" exists in step 1020, the host CHA 110HA creates a JNL 3 using data in unit sizes (1 MB, for example). Journal creation processing will be described below (step 1040).

The host CHA 110HA then adds the data size of the created JNL 3 to the copy complete address (step 1050).

The host CHA 110HA repeats this process until the copy complete address reaches the capacity of the PVOL 6A1 (step 1060). When the copy complete address equals the capacity of the PVOL 6A1, JNLs 3 have been created over the entire storage area of the PVOL 6A1, and hence the VOL pair condition is updated to "normal" and processing is begun on the other PVOLs (step 1070).

In the aforementioned flowchart, the PVOLs are described as being processed one at a time, but JNLs 3 may be generated simultaneously using the plurality of data stored in each of the plurality of PVOLs.

Figure 11:
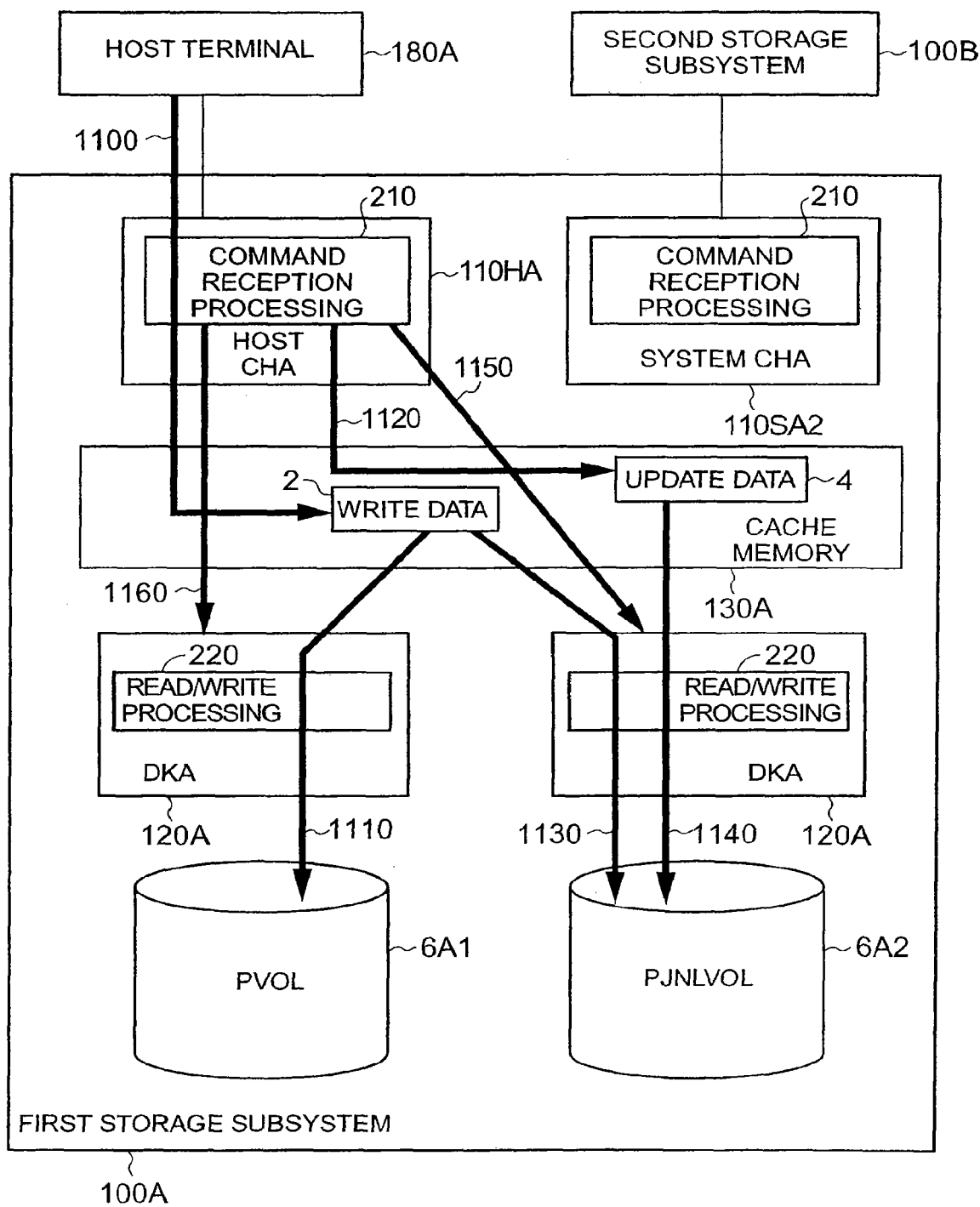
FIG. 11 shows an outline of the flow of command reception processing 210 performed by a first storage subsystem 100A.
Figure 12:
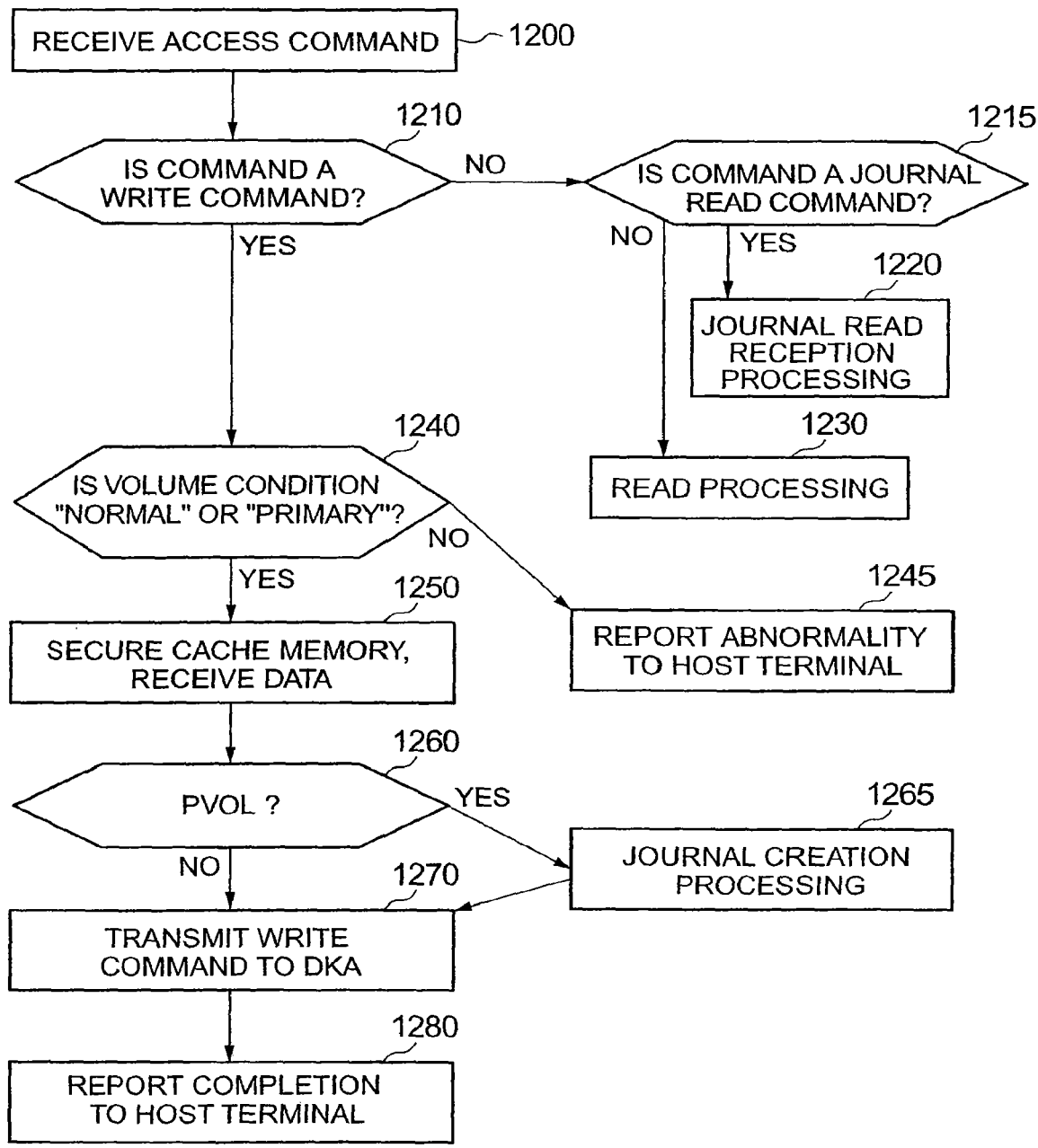
FIG. 12 is a flowchart of the command reception processing 210.
Figure 13:
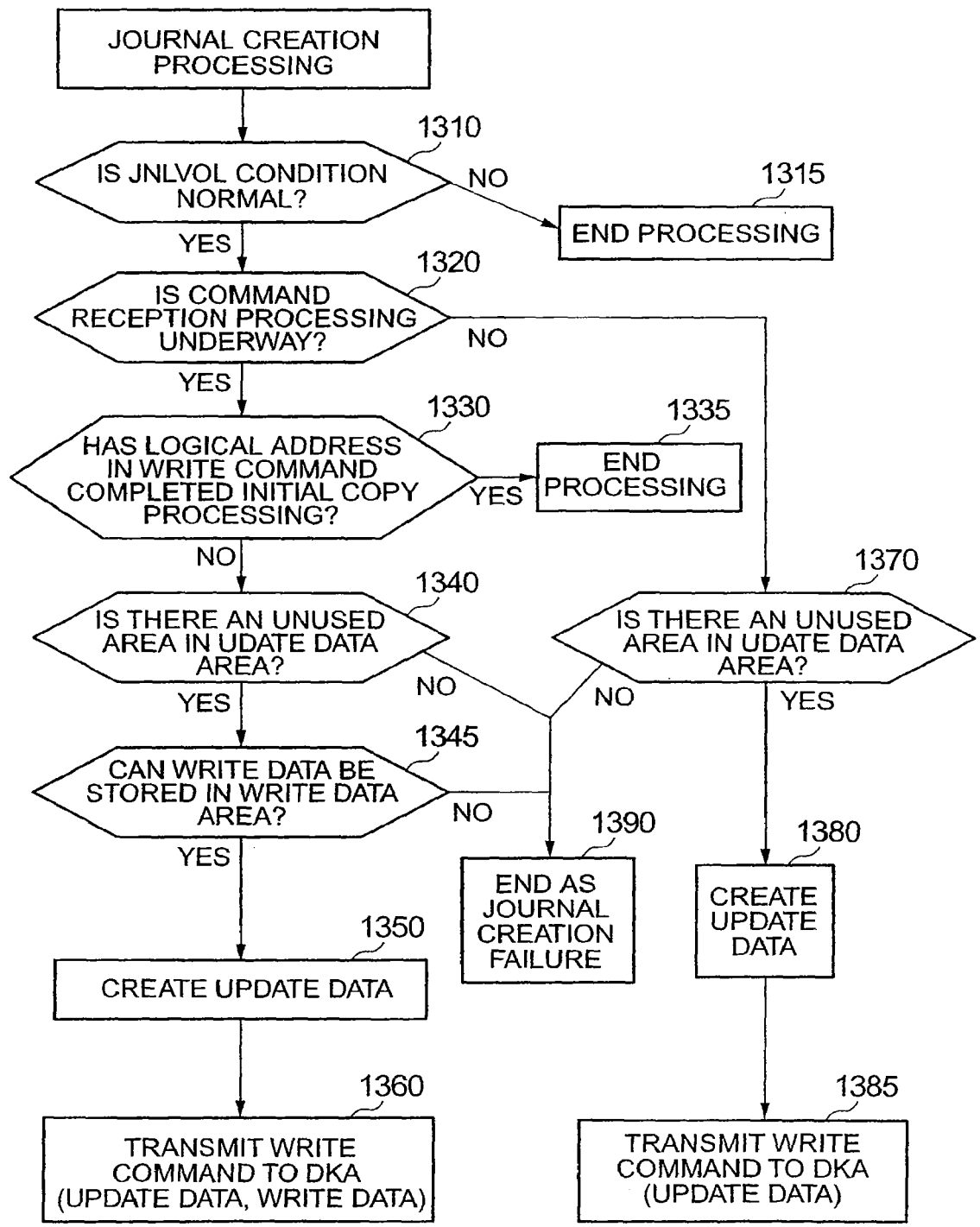
FIG. 13 is a flowchart of JNL creation processing performed by the first storage subsystem 100A.

FIG. 11 shows an outline of the flow of command reception processing 210 performed by the first storage subsystem 100A. FIG. 12 is a flowchart of the command reception processing 210. FIG. 13 is a flowchart of JNL creation processing performed by the first storage subsystem 100A. These drawings will be used below to describe processing performed when the first storage subsystem 100A receives an access command for access to the PVOL 6A1 from the host terminal 180A.

The host CHA 110HA receives an access command from the host terminal 180A (step 1200). The access command comprises an identifier indicating the command type (for example, read, write, or the JNL read command to be described below), the logical address of the command subject (for example, the write destination or read source), the data amount, and so on, for example. In the following, the logical address specified by the access command received in step 1200 will be referred to as "logical address "A"", the VOL ID specified by the access command will be referred to as "VOL ID "A"", the position in the VOL specified by the access command will be referred to as "in-VOL position "A"", and the data amount specified by the access command will be referred to as "data amount "A"". Furthermore, the VOL specified by the VOL ID "A" will be referred to as VOL "A".

The host CHA 110HA checks the access command (steps 1210, 1215). If, as a result of the check in step 1215, the access command is determined to be a JNL read command, the JNL read reception processing to be described below is performed (step 1220). When the access command is a command other than a JNL read command or write command, for example a read command, read processing corresponding to the read command is performed (step 1230).

If, in the check in step 1210, the access command is determined to be a write command, the host CHA 110HA refers to the VOL management data 400A to confirm the VOL condition of the VOL "A" specified in the write command (step 1240). If, in the check in step 1240, the VOL condition of the VOL "A" is determined to be anything other than "normal" or "primary", then the VOL "A" cannot be accessed, and hence the host CHA 110HA informs the host terminal 180 of an abnormal end (step 1245).

If, in the check in step 1240, the VOL condition of the VOL specified in the command is either "normal" or "primary", the host CHA 110HA secures a storage area of a certain size in the cache memory 130 (to be referred to hereafter as "cache area"), and notifies the host terminal 180A that data reception preparation is complete. Having received this notification, the host terminal 180A transmits the write data 2 to the first storage subsystem 100A. The host CHA 110HA receives the write data 2, and stores the write data 2 in the secured cache area (step 1250, 1100 in FIG. 11).

The host CHA 110HA then refers to the VOL management table 400A and path management table 500A to check whether or not the VOL "A" is the PVOL 6A1 (step 1260), and if a positive result is obtained from the check in step 1260, the host CHA 110HA performs the JNL creation processing to be described below (step 1265).

If a negative result is obtained from the check in step 1260 (or once the JNL creation processing of step 1265 is complete), the host CHA 110HA instructs the DKA 120A to write the write data 2 in the VOL "A" (1140 in FIG. 11), and then transmits a completion report to the host terminal 180A (steps 1270, 1280). Then, having received the write command regarding the write data 2, the DKA 120A executes read/write processing 220 in order to store the write data 2 from the cache area in the VOL "A" (1110 in FIG. 11).

Next, referring to FIG. 13, JNL creation processing will be described.

On the basis of the VOL management data 400A and path management data 500A, the host CHA 110HA confirms the VOL condition of the JNLVOL 6A2 associated with the PVOL 6A1 (step 1310). If, in the check in step 1310, the VOL condition of the JNLVOL 6A2 is "abnormal", then the JNL 3 cannot be stored in the JNLVOL 6A2, and hence the host CHA 110HA ends the processing (step 1315). In this case, the host CHA 110HA may perform processing to change the JNLVOL 6A2 to a normal VOL or the like.

If, in the check in step 1310, the JNLVOL 6A2 is normal, the host CHA 110HA continues JNL creation processing. The content of JNL creation processing differs according to whether it is performed during initial copy processing or the command reception processing 210 (step 1320). When JNL creation processing is performed during the command reception processing 210, the host CHA 110HA performs processing from a step 1330. When JNL creation processing is performed during initial copy processing, the host CHA 110HA performs processing from a step 1370.

When JNL creation processing is performed during the command reception processing 210, the host CHA 110HA checks whether the write subject logical address "A" has been subjected to initial copy processing (step 1330). When the VOL pair condition of the VOL "A" is "not copied", then JNL creation processing is performed during the subsequent initial copy processing, and hence the host CHA 110HA ends the processing without creating a JNL 3 (step 1335). When the VOL pair condition of the VOL "A" is "copying" and the copy complete address is equal to (or smaller than) the position "A" in the logical address, then JNL creation processing is performed during the subsequent initial copy processing, and hence the host CHA 110HA ends the processing without creating a JNL 3 (step 1335). In all other cases, i.e. when the VOL pair condition of the VOL "A" is "copying" and the copy complete address is greater than the position "A" in the logical address (or when the VOL pair condition of the VOL "A" is "normal"), initial copy processing is complete, and hence the host CHA 110HA continues JNL creation processing.

Next, the host CHA 110HA checks whether or not the JNL 3 can be stored in the JNLVOL 6A2. More specifically, the host CHA 110HA determines the presence of an unused area in the update data area by referring to the pointer management data 700 (step 1340). When the newest update data address in the pointer management data 700 is equal to the oldest update data address, then no unused area exists in the update data area, and hence the host CHA 110HA ends the processing as a JNL creation failure (step 1390).

If, in the check in step 1340, an unused area exists in the update data area, the host CHA 110HA uses the pointer management data 700 to check whether or not the write data can be stored in the write data area (step 1345). When the sum of the newest write data address and the data amount "A" is equal to (or greater than) the oldest write data address, the write data cannot be stored in the write data area, and hence the host CHA 110HA ends the processing as a JNL creation failure (step 1390).

When the JNL 3 can be stored, the host CHA 110HA obtains the newest update number (specifically, the newest update number from among the one or more update numbers that have been stored in the JNLVOL 6A2), the logical address at which the update data 4 are to be stored, and the logical address at which the write data 2 are to be stored, and creates the update data 4 in the cache area. Further, the host CHA 110HA sets a numerical value obtained by adding 1 to the obtained update number as a new update number in the pair management table 500A. The logical address serving as the storage destination of the update data 4 is the newest update data address in the pointer management data 700, and therefore the host CHA 110HA sets a numerical value obtained by adding the size of the update data 4 as a new newest update data address in the pointer management data 700A. The logical address serving as the storage destination of the write data 2 is the newest write data address in the pointer management data 700A, and therefore the host CHA 110HA sets a numerical value obtained by adding the data amount "A" to the newest write data address as a new newest write data address in the pointer management data 700A.

The host CHA 110HA then sets the numerical values obtained above, the time at which the write command was received, the logical address A in the write command, and the data amount "A" in the update data 4 (step 1350, 1120 in FIG. 11).

The host CHA 110HA then instructs the DKA 120A to write the update data 4 and write data 2 of the JNL 3 in the JNLVOL 6A2, and then brings the processing to a normal end (step 1360, 1130, 1140, 1150 in FIG. 11).

When JNL creation processing is performed during initial copy processing, processing is performed from step 1370. First, the host CHA 110HA checks whether or not the JNL 3 can be created. More specifically, the host CHA 110HA determines the presence of an unused area in the update data area using the pointer management data 700 (step 1370). When the newest update data address in the pointer management data 700 is equal to the oldest update data address, then no unused area exists in the update data area, and hence the host CHA 110HA ends the processing as a JNL creation failure (step 1390). In the initial copy processing of this embodiment, the JNL write data are read from the primary VOL and the write data area is not used, and hence there is no need to find an unused area of the write data area.

If, in the check in step 1370, the JNL 3 can be created, the host CHA 110HA obtains the update number set in the update data 4 (for example, the update number written in the pair management table 500A), and creates the update data 4 in the cache area. The host CHA 110HA then sets a numerical value obtained by adding 1 to the newest update number as a new update number in the pair management table 500A. The logical address for storing the update data 4 corresponds to the position of the newest update data address in the pointer management data 700, and therefore the host CHA 110HA sets a numerical value obtained by adding the size of the update data 4 as a new newest update data address in the pointer management data 700A.

The host CHA 110HA then sets the update number obtained above, the start time of the processing, the logical address of the initial copy processing subject, and so on in the update data 4 created in the cache area (step 1380, 1120 in FIG. 11).

The host CHA 110HA then instructs the DKA 120A to write the update data 4 in the JNLVOL 6A2 (in other words, to write the update data 4 from the new newest update data address in the JNLVOL 6A2), and then brings the processing to a normal end (step 1385, 1140, 1160 in FIG. 11).

This ends the description of FIGS. 11 through 13.

Figure 14:
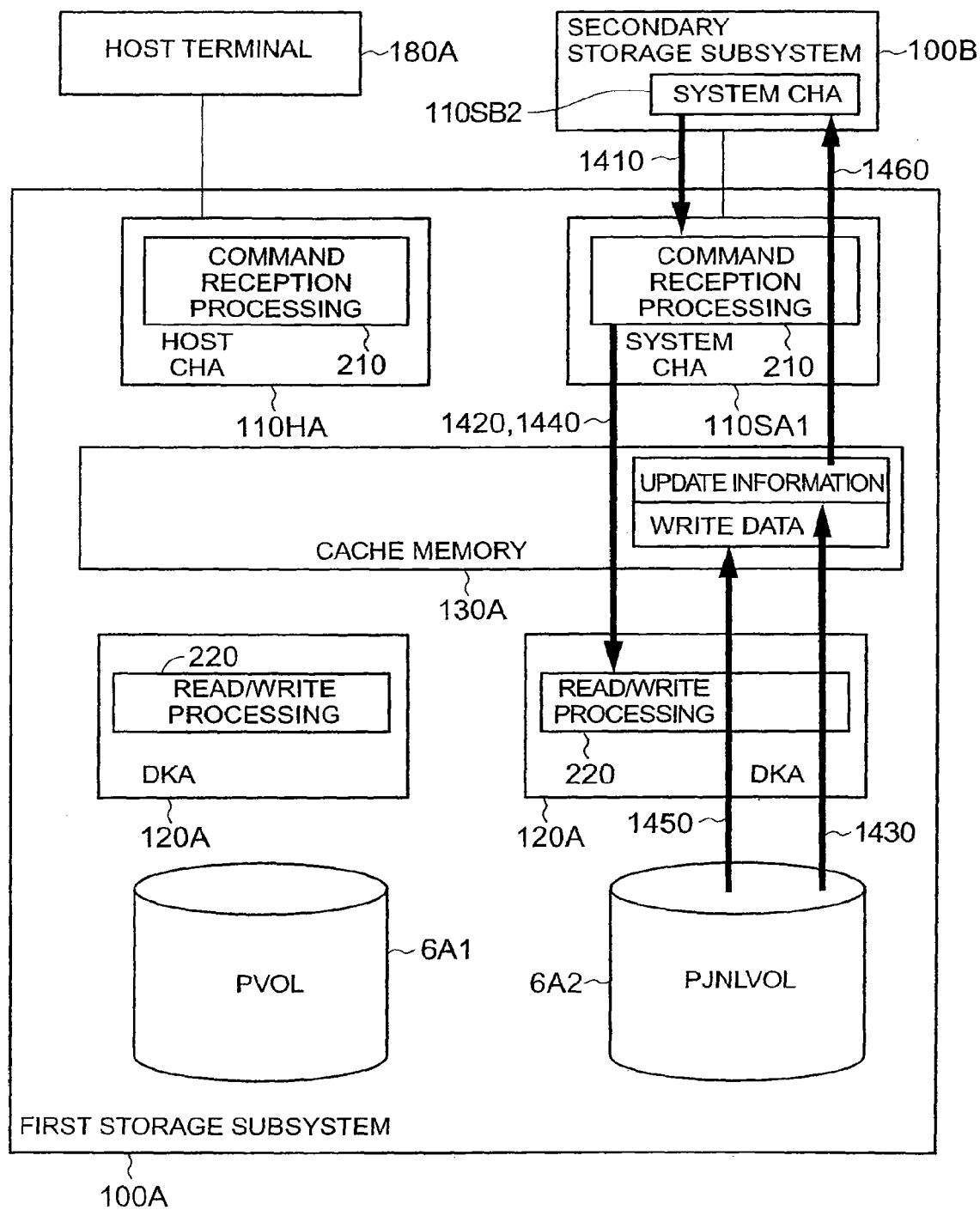
FIG. 14 is a view illustrating JNL read reception processing in an embodiment of the present invention.
Figure 15:
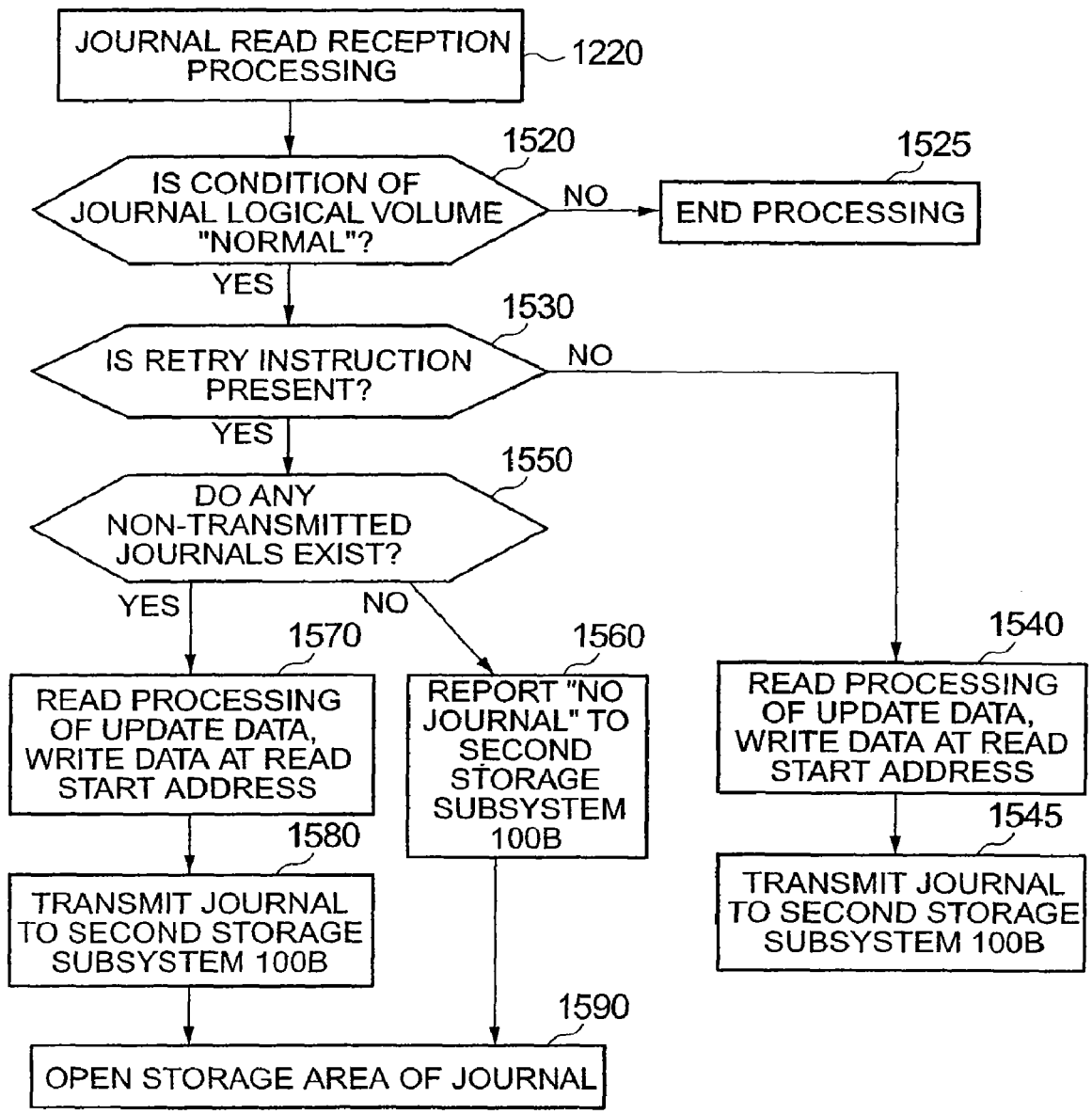
FIG. 15 is a flowchart of the JNL read reception processing in an embodiment of the present invention.

FIG. 14 is a view illustrating operations of the host CHA 110HA in the first storage subsystem 100A upon reception of a JNL read command (JNL read reception processing), and FIG. 15 is a flowchart of JNL read reception processing. Operations performed when the first storage subsystem 100A receives a JNL read command from the second storage subsystem 100B will be described below using these drawings.

The system CHA 110SA1 receives an access command from the system CHA 110SB2. The access command comprises an identifier indicating that the command is a JNL read command, the read source (for example, the VOL ID of the PJNLVOL 6A2), and an indication of the presence or absence of a retry instruction (step 1220, 1410 in FIG. 14).

The system CHA 110SA1 then confirms the condition of the PJNLVOL 6A2 (step 1520). If, in the check in step 1520, the VOL condition of the PJNLVOL 6A2 is not "normal", for example "faulty", the system CHA 110SA1 ends the processing (step 1525). The system CHA 110SB2 then ends JNL read processing.

If, in the check in step 1520, the VOL condition of the PJNLVOL 6A2 is "normal", the system CHA 110SA1 checks whether the JNL read command is a retry instruction (step 1530).

If, in the check in step 1530, the JNL read command is a retry instruction, the system CHA 110SA1 retransmits the JNL 3 received previously to the second storage subsystem 100B. The system CHA 110SA1 then secures a cache area, and instructs the DKA 120 to read the information regarding the size of the update data 4 from the retry start address of the pointer management data 700 into the cache area (1420 in FIG. 14).

In response to the instruction from the system CHA 110SA1, the DKA 120 executes the read/write processing 220 to read the update data 4 from the PJNLVOL 6A2, and then stores the update data 4 in the cache area and notifies the system CHA 110SA1, which is the source of the instruction, that reading is complete (1430 in FIG. 14).

After receiving the notification that reading of the update data 4 is complete, the system CHA 110SA1 obtains the logical address and data size of the write data 2 from the update data 4 stored in the cache area, and then secures a cache area and instructs the DKA 120 to read the write data from the obtained logical address into the secured cache area (step 1540, 1440 in FIG. 14).

The DKA 120 reads the write data 2 from the PJNLVOL 6A2 (more specifically, from the instructed logical address) by means of the read/write processing 220, stores the write data 2 in the secured cache area, and notifies the system CHA 110SA1, which is the source of the instruction, that reading is complete (1450 in FIG. 14).

After receiving the notification that reading of the write data is complete, the system CHA 110SA1 transmits the update data 4 and write data 2 (that is, the JNL 3) to the second storage subsystem 100B, opens the cache area holding the JNL 3, and then ends the processing (step 1545, 1460 in FIG. 14).

If, in the check in step 1530, the JNL read command is not a retry instruction, the system CHA 110SA1 checks for the presence of an untransmitted JNL 3, and if found, transmits the JNL 3 to the second storage subsystem 100B. The system CHA 110SA1 then compares the read start address and newest update data address in the pointer management data 700 (step 1550).

When the read start address and newest update data address are equal, all of the JNLs 3 have been transmitted to the second storage subsystem 100B, and therefore the system CHA 110SA1 transmits "no JNL" to the second storage subsystem 100B (step 1560), and opens the storage area of the JNL 3 transmitted to the second storage subsystem 100B at the time of the previous JNL read command (step 1590).

In the processing to open the JNL storage area, the system CHA 110SA1 sets the retry start address in the oldest update data address of the pointer management data 700. When the oldest update data address becomes the write data area top address, the system CHA 110SA1 sets the oldest update data address to zero. The system CHA 110SA1 then alters the oldest write data address of the pointer management data 700 to a numerical value obtained by adding the size of the write data transmitted in accordance with the previous JNL read command. When the oldest write data address reaches a logical address that is equal to or greater than the capacity of the JNLVOL, the system CHA 110SA1 amends this by reducing the write data area top address.

If, in the check in step 1550, an untransmitted JNL exists, the system CHA 110SA1 secures a cache area, and instructs the DKA 120 to read the update data from the read start address in the pointer management data 700 into the secured cache area (in other words, to read information of a predetermined size from the read start address) (1420 in FIG. 14).

The DKA 120 reads the update data from the PJNLVOL 6A2 by executing the read/write processing 220 in response to this instruction, stores the update data in the cache memory 130, and then notifies the system CHA 110SA1, which is the source of the instruction, that reading is complete (1430 in FIG. 14).

After receiving this notification of the completion of update data reading, the system CHA 110SA1 obtains the logical address and size of the write data from the read update data, secures a cache area, and instructs the DKA 120 to read write data corresponding to the obtained size from the obtained logical address into the secured cache area (step 1570, 1440 in FIG. 14).

In accordance with this instruction, the DKA 120 reads the write data from the PJNLVOL 6A2 (i.e. the instructed logical address of the JNLVOL 6A2) by performing the read/write processing 220, stores the write data in the secured cache area, and notifies the system CHA 110SA1 that reading is complete (1450 in FIG. 14).

After receiving this notification of the completion of write data reading, the system CHA 110SA1 transmits the update data and write data to the second storage subsystem 100B (step 1580), and then opens the cache area holding the JNL 3 (1460 in FIG. 14). The system CHA 110SA1 then sets the read start address in the retry start address of the pointer management data 700, and sets a numerical value obtained by adding the update data size of the JNL transmitted to the read start address in the pointer management data 700 as a new read start address.

The system CHA 110SA1 then opens the storage area of the JNL transmitted to the second storage subsystem 100B during processing of the previous JNL read command (step 1590).

FIGS. 14 and 15 were described above. Note that in the JNL read reception processing described above, the first storage subsystem 100A transmits the JNLs 3 to the second storage subsystem 100B one by one, but a plurality of JNLs may be transmitted to the second storage subsystem 100B simultaneously. The number of JNLs to be transmitted in relation to a single JNL read command may be specified by the second storage subsystem 100B in the JNL read command, or may be specified in the first storage subsystem 100A or second storage subsystem 100B by the user. Moreover, the number of JNLs transmitted in relation to a single JNL read command may be modified dynamically by the first storage subsystem 100A or second storage subsystem 100B according to the transfer capacity, load, and so on of the connection path 200A between the first storage subsystem 100A and secondary storage system 100B. Further, a JNL transfer amount may be specified, taking into account the size of the JNL write data, rather than the number of JNLs. This transfer amount may also be modified dynamically.

Furthermore, in the JNL read reception processing described above, the JNL is read from the storage device 150 into the cache memory 130, but when the JNL already exists in the cache memory 130, this processing need not be performed.

Furthermore, the JNL storage area opening processing within the JNL read reception processing described above is performed during processing of the next JNL read command, but may be performed immediately after transmitting the JNL to the second storage subsystem 100B. It is also possible for the second storage subsystem 100B to set the update number that may be opened in the JNL read command so that the first storage subsystem 100A opens the JNL storage area in accordance with the command.

Figure 16:
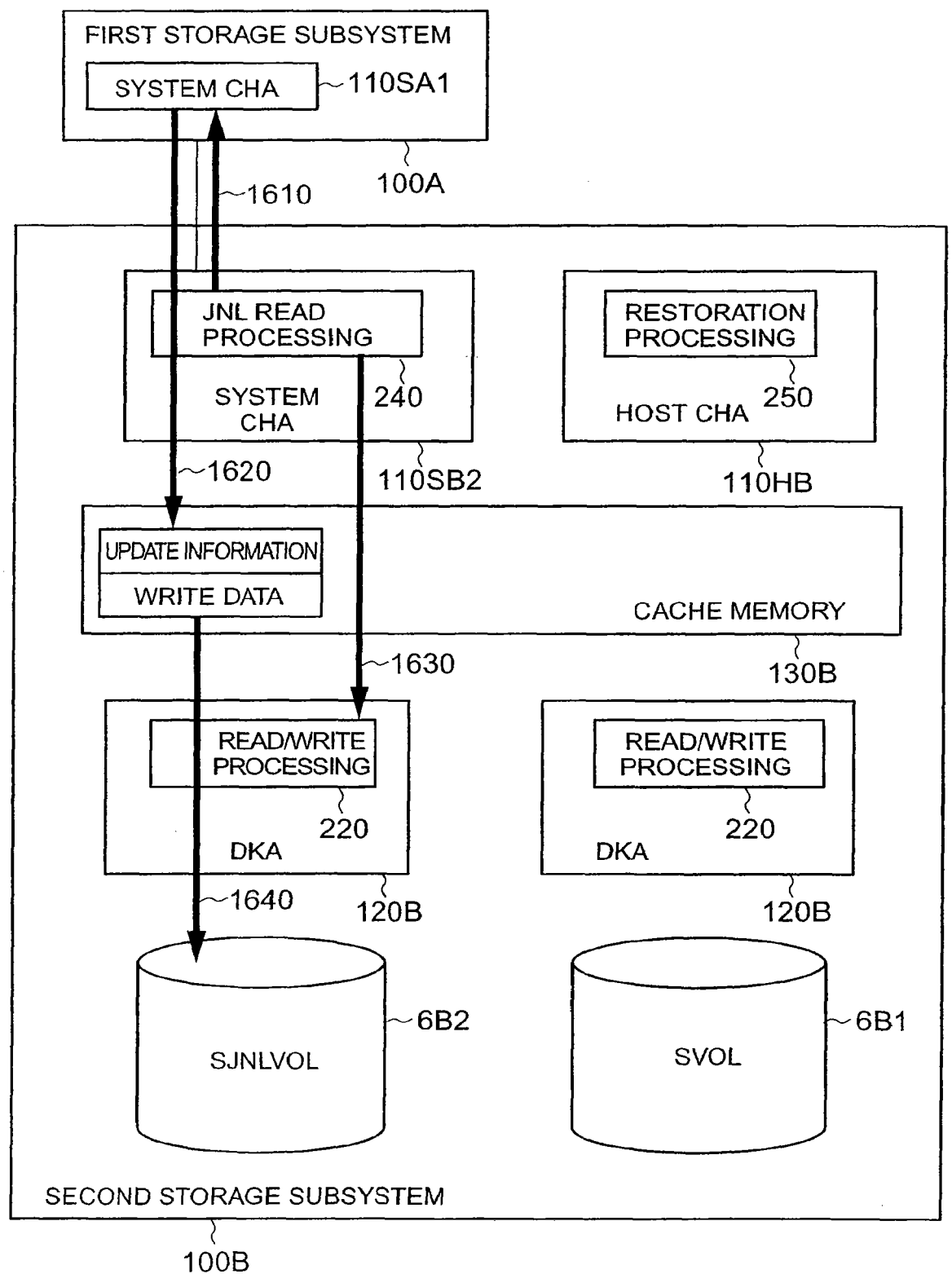
FIG. 16 is a view illustrating JNL read command processing in an embodiment of the present invention.
Figure 17:
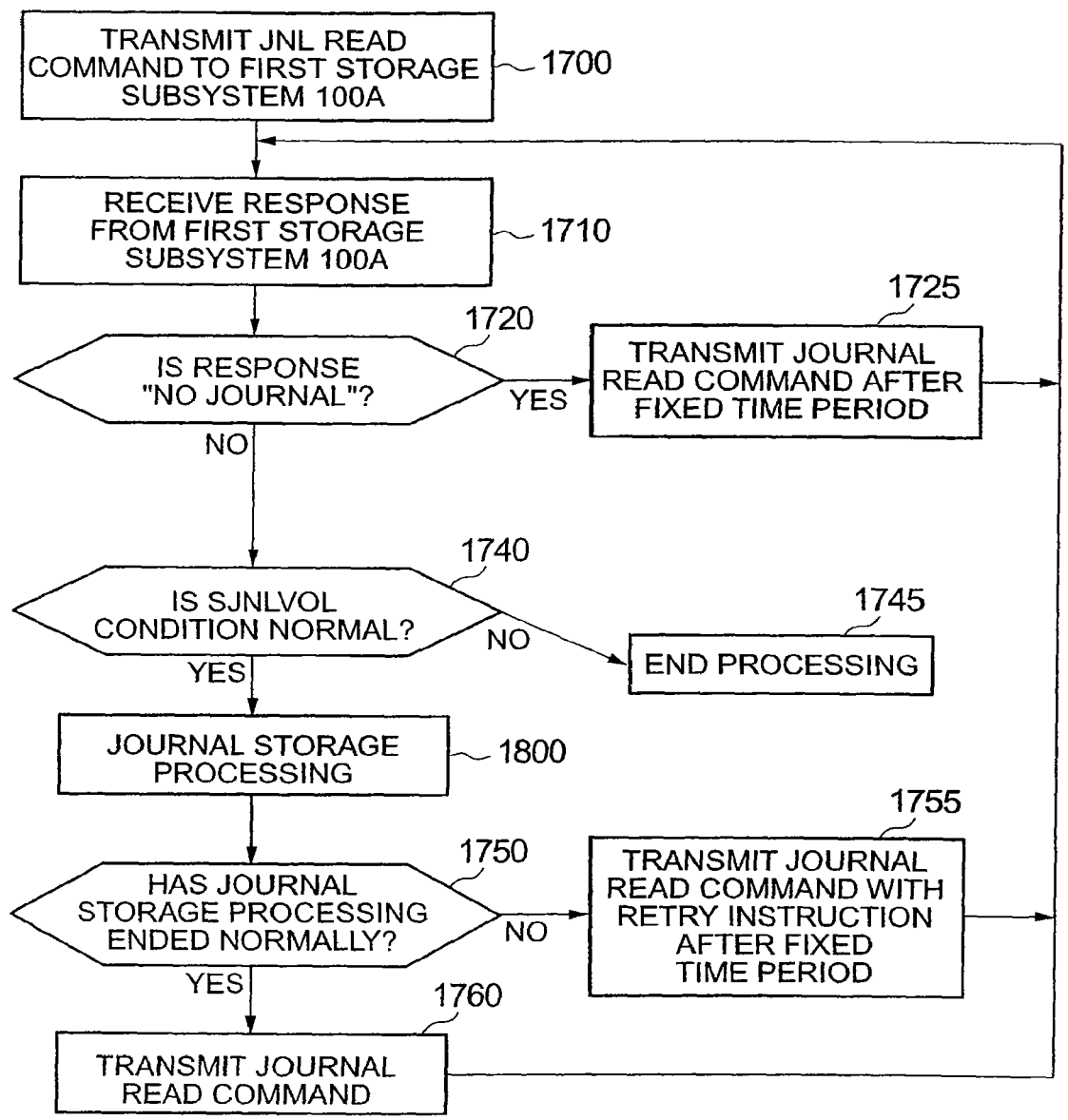
FIG. 17 is a flowchart of the JNL read command processing in an embodiment of the present invention.
Figure 18:
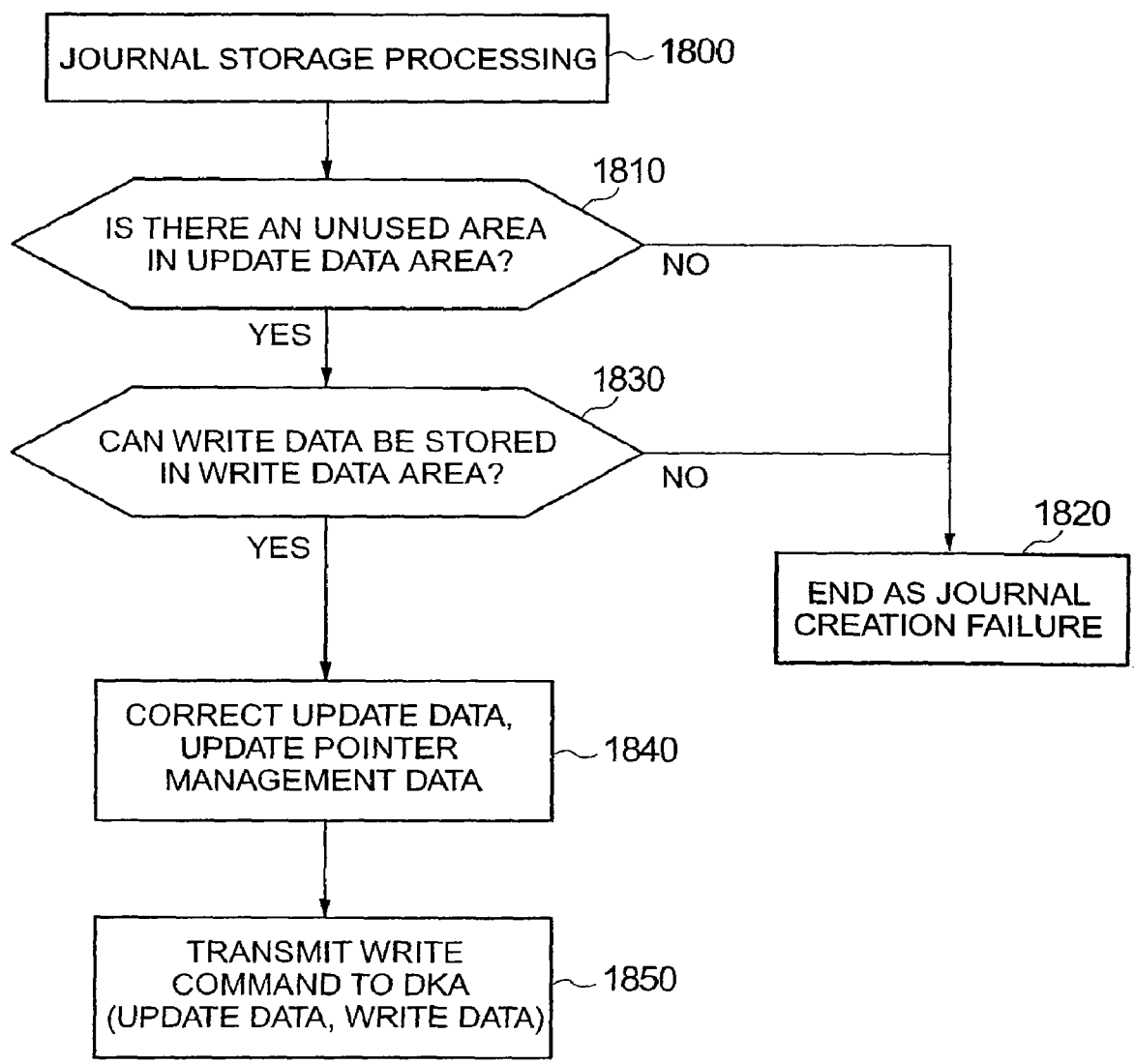
FIG. 18 is a flowchart of JNL storage processing in an embodiment of the present invention.

FIG. 16 is a view showing an outline of JNL read command processing 240, and FIG. 17 is a flowchart of the JNL read command processing 240. FIG. 18 is a flowchart of JNL storage processing. Operations performed by the system CHA 110SB2 in the second storage subsystem 100B to read a JNL from the PJNLVOL 6A2 in the first storage subsystem 100A and, on the basis of this JNL, store a JNL in the SJN-LVOL 6B1 in the second storage subsystem 100B will now be described using these drawings.

The system CHA 110SB2 secures a cache area for storing the JNL, generates an access command (comprising an identifier indicating that the command is a JNL read command, the VOL ID of the PJNLVOL 6A2, an indication of the presence or absence of a retry instruction, and so on, for example) for a JNL read command, and transmits the access command to the first storage subsystem 100A (step 1700, 1610 in FIG. 16).

The system CHA 110SB2 receives a response and the JNL from the first storage subsystem 100A (1620 in FIG. 16). The system CHA 110SB2 then checks the received response, and if the response is "no JNL", then no JNL 3 exists in the PJNLVOL 6A2 of the first storage subsystem 100A, and hence the system CHA 110SB2 transmits a JNL read command to the first storage subsystem 100A after a fixed time period (steps 1720, 1725).

When the response from the first storage subsystem 100A is a normal end, for example, the system CHA 110SB2 refers to the VOL management data 400B to confirm the VOL condition of the SJNLVOL 6B1 which is to become the replication destination (step 1740). When the VOL condition of the SJNLVOL 6B1\* is "abnormal", JNLs cannot be stored in the SJNLVOL 6B1\*, and hence the system CHA 110SB2 ends the processing (step 1745).

If, in the check in step 1740, the VOL condition of the SJNLVOL 6B1 is "normal", the system CHA 110SB2 performs JNL storage processing 1800 to be described below. When the JNL storage processing 1800 has come to a normal end, the system CHA 110SB2 transmits the next JNL read command (step 1760). Alternatively, the system CHA 110SB2 may generate and transmit the next JNL read command after the elapse of a fixed time period from the normal end of the JNL storage processing 1800. Note that the system CHA 110SB2 may transmit subsequent JNL commands periodically at fixed time intervals, or may determine the transmission timing of the next JNL command according to the number of received JNLs, the traffic on the connection path 200, the storage capacity of the JNLVOL in the second storage subsystem 100B, the load on the second storage subsystem 100B, and so on, or may obtain the JNL storage capacity in the first storage subsystem 100A (or the pointer management data 700 of the first storage subsystem 100A) and determine the transmission timing of the next JNL command on the basis of the obtained storage capacity. Transfer of the aforementioned information may be performed using a dedicated command, or the information may be incorporated into the response to the JNL read command. Subsequent processing is identical to that of step 1710 onward.

When the JNL storage processing in step 1800 does not end normally, the unused region of the SJNLVOL 6B1 is insufficient, and hence the system CHA 110SB2 destroys the received JNL, and after a fixed time period transmits a JNL read command with a retry instruction (step 1755). Alternatively, the system CHA 110SB2 may hold the JNL in the cache area and perform JNL storage processing again after a fixed time period. This is due to the fact that after a fixed time period, the unused area of the SJNLCVOL 6B1 may increase as a result of the restoration processing 250 to be described below. When this method is used, an indication of the presence or absence of a retry instruction need not be provided in the JNL read command.

Next, the JNL storage processing 1800 shown in FIG. 18 will be described.

The system CHA 110SB2 checks whether or not a JNL can be stored in the SJNLVOL 6B1. More specifically, the system CHA 110SB2 checks for the presence or absence of an unused area in the update data area of the SJNLVOL 6B1 (step 1810) using the pointer management data 700 in the second storage subsystem 100B (see FIG. 5). When the newest update data address and the oldest update data address in the pointer management data 700 are equal, then there is no unused area in the update data area, and hence the system CHA 110SB2 ends the processing as a JNL creation failure (step 1820).

If, in the check in step 1810, an unused area of the update data area exists in the SJNLVOL 6B1, the system CHA 110SB2 uses the pointer management data 700 to check whether or not write data can be stored in the write data area (step 1830). If the sum of the newest write data address and the data amount of the received JNL write data is equal to or greater than the oldest write data address, then the write data cannot be stored in the write data area, and hence the system CHA 110SB2 ends the processing as a JNL creation failure (step 1820).

When the JNL can be stored, the system CHA 110SB2 modifies the write data logical address comprised in the JNL update data received as a result of the JNL read processing 240 described above. Specifically, the system CHA 110SB2 alters the write data logical address in the update data 4 to the newest write data address in the pointer management data 700B of the second storage subsystem 100B. The system CHA 110SB2 then alters the newest update data address of the pointer management data 700B to a numerical value obtained by adding the size of the update data to the current newest update data address (step 1840).

The system CHA 110SB2 then secures a cache area, stores the updated update data and the write data in the received JNL in the secured cache area, instructs the DKA 120 to write the update data and write data into the SJNLVOL 6B1, and then ends the processing as a JNL creation success (step 1850, 1630 in FIG. 16). The DKA 120 then writes the update data and write data stored in the cache area into the SJNLVOL 6B1 by means of the read/write processing 220, and then opens the secured cache area (1640 in FIG. 16).

In the JNL storage processing described above, the JNL is stored in the SJNLVOL 6B1 (in other words, the storage device 150 comprising the SJNLVOL 6B1), but JNL cache areas of a fixed size may be prepared in advance, and JNLs may be stored in the SJNLVOL 6B1 from all of the cache areas after all of the cache areas have been used. The size of the JNL cache areas may be specified by the SVP 281B, for example.

Figure 19:
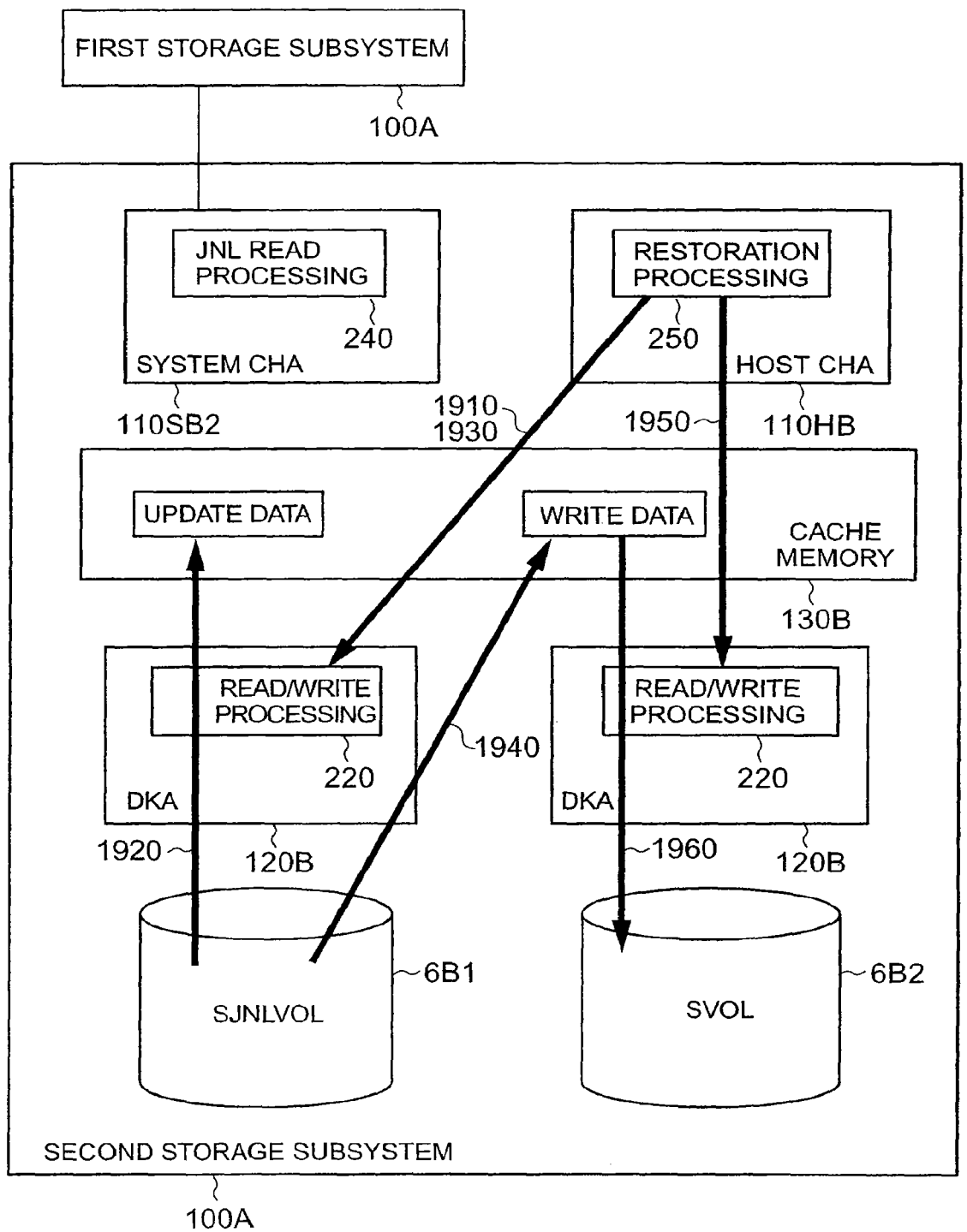
FIG. 19 is a view illustrating restoration processing in an embodiment of the present invention.
Figure 20:
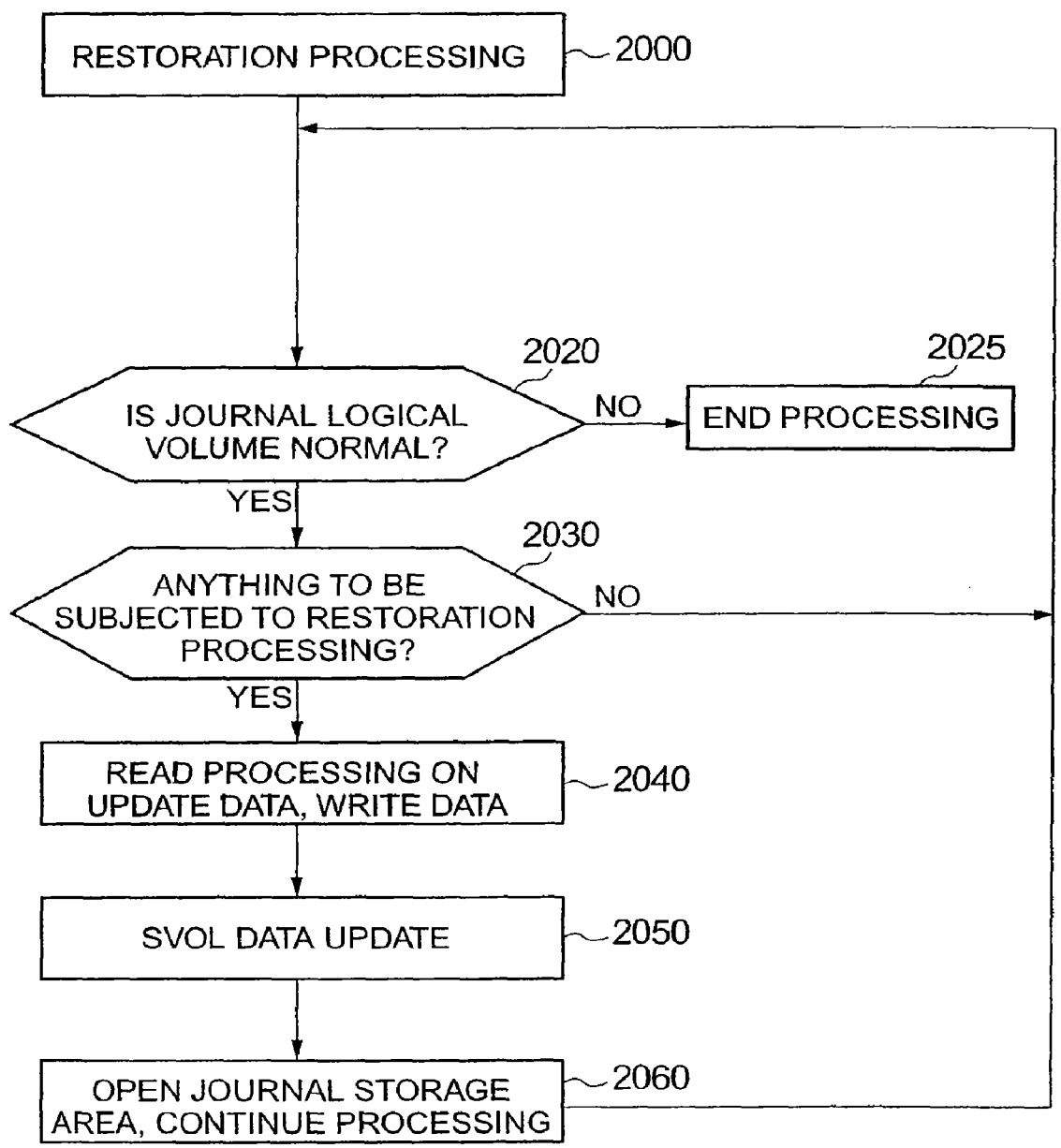
FIG. 20 is a flowchart of restoration processing in an embodiment of the present invention.

FIG. 19 is a view illustrating the restoration processing 250, and FIG. 20 is a flowchart of the restoration processing 250. An operation of the host CHA 110HB in the second storage subsystem 100B to update data using the JNL will now be described using these drawings. Note that the restoration processing 250 may be performed by another CHA 110B (the system CHA 110SB2, for example), or by the DKA 120 in the second storage subsystem 100B.

The host CHA 110HB confirms the VOL condition of the SJNLVOL 6B1 by referring to the VOL management data 400B, the path management data 500B, and so on (step 2020). If, in the check in step 2020, the VOL condition of the JNL-VOL 6B1 is "abnormal", access is impossible, and hence the host CHA 110HB ends the processing (step 2025).

If, in the check in step 2020, the VOL condition of the SJNLVOL 6B1 is "normal", the host CHA 110HB determines whether the JNL to be subjected to restoration exists in the SJNLVOL 6B1. More specifically, the host CHA 110HB obtains the oldest update data address and newest update data address from the pointer management data 700B, and compares the two. When the oldest update data address and newest update data address are equal, the JNL is not present in the SJNLVOL 6B1, and hence the host CHA 110HB ends the restoration processing, then restarts the restoration processing after a fixed time period (step 2030).

If, in the check in step 2030, the restoration subject JNL exists, the host CHA 110HB performs the following processing on the JNL having the oldest (smallest) update number. The update data of the JNL having the oldest (smallest) update number are stored from the oldest update data address in the pointer management data 700B. The host CHA 110HB secures a cache area, and then instructs the DKA 120B to read information corresponding to the size of the update data from the oldest update data address (i.e. the update data itself) from the SJNLVOL 6B1 (1910 in FIG. 19).

In response to this instruction, the DKA 120B reads the update data from the SJNLVOL 6B1 by means of the read/write processing 220, stores the update data in the secured cache area, and notifies the host CHA 110HB that reading is complete (1920 in FIG. 19).

After receiving this notification of the completion of update data reading, the host CHA 110HB obtains the logical address and size of the write data from the update data in the cache area, secures a cache area, and instructs the DKA 120B to read data corresponding to the size of the write data from the logical address (in other words, one set of write data) from the SJNLVOL 6B1 (1930 in FIG. 19).

In response to this instruction, the DKA 120B reads the write data from the SJNLVOL 6B1* (i.e. the specified logical address) by means of the read/write processing 220, stores the write data in the cache area, and notifies the host CHA 110HB that reading is complete (step 2040, 1940 in FIG. 19).

The host CHA 110HB then determines the logical address of the SVOL 6B2 to be updated (in other words, the logical address in the write command (see FIG. 2)) from the update data, and instructs the DKA 120B to write the write data into the address of the SVOL 6B2 specified by the logical address (step 2050, 1950 in FIG. 19). In response to this instruction, the DKA 120 writes the write data stored in the cache area into the storage area of the storage device 150 corresponding to the logical address of the SVOL 6B2 (the logical address of the write command) by means of the read/write processing 220, opens the cache area, and notifies the host CHA 110HB of the completion of write processing (1960 in FIG. 19).

Having received notification of the completion of write processing from the DKA 120B, the host CHA 110HB opens the JNL storage area. In the processing to open the JNL storage area, the host CHA 110HB alters the oldest update data address in the pointer management data 700B provided in the second storage subsystem 100B to a numerical value obtained by adding the size of the update data to the current oldest update data address. When the oldest update data address reaches the write data area top address, the host CHA 110HB sets the write data area top address to zero. The host CHA 110HB then alters the oldest write data address in the pointer management data 700B to a numerical value obtained by adding the size of the written write data to the current oldest write data address. When the oldest write data address reaches a logical address that is equal to or greater than the capacity of the SJNLVOL 6B1, the host CHA 110HB amends this by reducing the write data area top address. The host CHA 110HB then begins the next restoration processing (step 2060).

FIGS. 19 and 20 were described above. Note that in the restoration processing 250 described above, the JNL is read from the SJNLVOL 6B1 to the cache memory 130, but when the JNL already exists in the cache memory 130, this processing need not be performed.

In the JNL read reception processing and the JNL read command processing 240 described above, the second storage subsystem 100B may determine the JNL to be received. For example, the system CHA 110SB2 adds an update number to the JNL read command. In this case, a table or retrieval method may be provided in the shared memory 140 of the first storage subsystem 100A to determine the logical address at which the update data are stored from the update number so that during JNL read reception processing, the system CHA 110SA1 which receives the JNL read command can determine the logical address of the update data comprising the update number specified by the second storage subsystem 100B.

Furthermore, a JNL read command is used in the JNL read reception processing and the JNL read command processing 240 described above, but a normal read command may be used instead. For example, the pointer management data 700A of the first storage subsystem 100A may be transferred to the second storage subsystem 100B in advance so that the second storage subsystem 100B reads the JNL of the PJNLVOL 6A2 in the first storage subsystem 100A.

Further, in the JNL read reception processing described above, JNLs are transmitted from the first storage subsystem 100A to the second storage subsystem 100B in order of update number, but the JNLs do not have to be transmitted in order of update number. Also, a plurality of JNL read commands may be transmitted from the first storage subsystem 100A to the second storage subsystem 100B. In this case, a table or retrieval method may be provided in the second storage subsystem 100B to determine from the update number the logical address at which the update data are stored so that during restoration processing, the JNLs can be processed in update number order.

An embodiment relating to the fundamentals of data processing using a JNL was described above. In the methods described up to this point, a JNL is generated on the basis of the original write data 2 stored in a PVOL, the generated JNL is stored in a PJNLVOL, the JNL is copied from the PJNLVOL to an SJNLVOL, and write data are restored by being written into an SVOL on the basis of the JNL stored in the SJNLVOL. By putting this structure to practical usage, multitarget system replication processing, multihop system replication processing, switching dynamically between a multitarget system and a multihop system, and so on can be realized. In the following, the multitarget system will be described in detail as a first example of the embodiment described above, after which the multihop system will be described in detail as a second example of this embodiment.

Example 1

FIG. 21A shows an outline of replication processing performed during a normal operation by a data processing system according to a first example of an embodiment of the present invention, FIG. 21B shows an outline of replication processing after a fault occurs in a first host terminal of the data processing system, and FIG. 22 shows the flow of processing to switch from the multitarget system to the multihop system, which is performed when a fault occurs in the first host terminal. The following description will focus on points of difference with the embodiment described above, and similarities will be either omitted or simplified.

As shown in FIG. 21A, in the data processing system 1 according to the first example, the first host terminal 180A and the first storage subsystem 100A connected thereto exist in a first site 840A, the second host terminal 180B and the second storage subsystem 100B connected thereto exist in a second site 840B, and the third host terminal 180C and the third storage subsystem 100C connected thereto exist in a third site 840C.

During a normal operation (when no faults have occurred in the data processing system 1, for example), as shown in FIG. 21A, the original write data 2 written into the PVOL 6A1 of the first storage subsystem 100A are transmitted along two replication paths and replication directions having the PVOL 6A1 as the replication start VOL, and replicated in the first SVOL 6B2 and second SVOL 6C2, which serve as the respective replication goal VOLs of the two replication paths and replication directions. In other words, during a normal operation, multitarget system replication processing is performed with the VOL 6A1 of the first storage subsystem 100A as the replication start VOL, and the VOL 6B2 of the second storage subsystem 100B and the VOL 6C2 of the third storage subsystem 100C as the replication goal VOLs.

When a fault occurs in the first host terminal 180A that is connected to the first storage subsystem 100A comprising the replication start VOL in this case, multitarget system replication processing is switched to multihop system replication processing. The flow of processing to switch from multitarget system replication processing to multihop system replication processing will now be described with reference to FIGS. 21B and 22.

When a fault occurs in the first host terminal 180A (step S100), this is detected in the data processing system 1. More specifically, for example, a fault may be determined to have occurred in the first host terminal 180A when the first storage subsystem 100A is unable to obtain a response to a predetermined signal transmitted to the first host terminal 180A periodically, or a fault in the first host terminal 180A may be detected by the second host terminal 180B (or another device) using a method such as heartbeat communication.

When a fault occurs in the first host terminal 180A, takeover processing enabling the second host terminal 180B (or third host terminal 180C) to take over the processing of the first host terminal 180A is performed. The host terminal that is to take over the processing may be determined in advance, or the host terminal that is connected to the storage subsystem comprising the SVOL in which restoration processing is most or least advanced may be used. In the following description, the second host terminal 180B is used as the processing takeover destination.

When a fault occurs in the first host terminal 180A, the processing of the first host terminal 180A is taken over by the second host terminal 180B (S101). The second host terminal 180B then transmits a processing start instruction to the second storage subsystem 100B (S102).

In response to the processing start instruction, the second storage subsystem 100B transmits a JNL read command relating to the first PJNLVOL 6A2 to the first storage subsystem 100A, reads a JNL 3 from the first PJNLVOL 6A2, and stores the read JNL 3 in the first SJNLVOL 6B1 (S103A). The second storage subsystem 100B repeats this processing until all of the JNLs 3 stored in the first PJNLVOL 6A2 have been read. The first storage subsystem 100A retrieves the JNL comprising an identical number to the JNL replication update number in the mirror management sub data 502A from the first PJNLVOL 6A2, transmits this JNL to the second storage subsystem 100B, and then increases the value of the JNL replication update number by one. When the JNL replication update number and the JNL generation update number (the update number "16", for example) in the mirror management sub data 502A become equal, the first storage subsystem 100A may notify the second storage subsystem 100B that no more JNLs to be replicated exist in the first PJNLVOL 6A2, whereby the second storage subsystem 100B acknowledges that all of the JNLs have been replicated. Further, when a JNL 3 has been read from the first PJNLVOL 6A2, the first storage subsystem 100A may delete the read JNL 3 from the PJNL-VOL 6A2. In other words, when all of the JNLs have been read from the first PJNLVOL 6A2, the first PJNLVOL 6A2 may be emptied.

At the same (or a different) time as the JNLs 3 read from the first PJNLVOL 6A2 are written into the first SJNLVOL 6B1 by the second storage subsystem 100B, the second storage subsystem 100B executes restoration processing into the first SVOL 6B2 based on the JNLs 3 stored in the first SJNLVOL 6B1 (S103B). The second storage subsystem 100B repeats this processing until all of the JNLs 3 stored in the first SJNLVOL 6B1 have been read.

By performing the processing of S103A and S103B described above, the content of the replication goal VOL 6B2 can be made perfectly identical to the content of the replication start VOL 6A2.

Next, the second storage subsystem 100B executes copy reversal processing to reverse the replication direction of the VOL group comprising the SJNLVOL 6B1 (S104A). More specifically, for example, the second storage subsystem 100B generates a JNL copy reversal instruction including the mirror ID "1" of the mirror pair comprising the SJNLVOL 6B1, and specifies the PJNLVOL which constitutes the mirror pair with the SJNLVOL 6B1 and the primary storage subsystem comprising this PJNLVOL by referring to the path management data 500B. The second storage subsystem 100B then transmits the generated JNL copy reversal instruction to the specified primary storage subsystem (that is, the first storage subsystem) 100A. Further, for example, the second storage subsystem 100B switches the PJNLVOL-ID, PVOL-ID, and primary storage subsystem ID relating to the mirror ID "1" with the SJNLVOL-ID, SVOL-ID, and secondary storage subsystem ID in the path management data 500B. Further, for example, the second storage subsystem 100B associates the JNL generation update number received during the copy reversal processing of the first storage subsystem 100A, to be described below, with the reversed PJNLVOL 6B1, and sets this JNL generation update number in the path management data 500B.

Having received the JNL copy reversal instruction from the second storage subsystem 100B, the first storage subsystem 100A executes copy reversal processing in response to the instruction (S104B). More specifically, for example, the first storage subsystem 100A notifies the second storage subsystem 100B of the JNL generation update number (the update number "16", for example) relating to the PJNLVOL 6A2 by referring to the path management data 500A. Further, for example, the first storage subsystem 100A switches the PJNLVOL-ID, PVOL-ID, and primary storage subsystem ID relating to the mirror ID "1" with the SJNLVOL-ID, SVOL-ID, and secondary storage subsystem ID in the path management data 500A. The first storage subsystem 100A also transmits a JNL read command relating to the reversed PJNLVOL 6B1 to the second storage subsystem 100B so that the JNLs in the PJNLVOL 6B1 can be read and stored in the reversed SJNLVOL 6A2.

The second storage subsystem 100B then transmits a usability notification to the second host terminal 180B (S105). Note that the second storage subsystem 100B may also notify the second host terminal 180B of the VOL-ID of the SVOL 6B2 so that the second host terminal 180B can transmit a write command relating to the VOL 6B2.

Thereafter, the multihop system replication processing shown in FIG. 21B is performed. More specifically, for example, the following replication processing is performed in the VOL group comprising the reversed PVOL 6B2.

After the second storage subsystem 100B receives the usability notification as a result of the processing in S104, the second storage subsystem 100B generates write data and transmits the write data to the second storage subsystem 100B together with a write command including the VOL-ID of the reversed PVOL 6B2. The second storage subsystem 100B stores the received write data in the reversed PVOL 6B2, generates a JNL comprising the write data and the JNL generation update number (the update number "16", for example) notified by the first storage subsystem 100A, and stores the JNL in the reversed PJNLVOL 6B1.

At the same (or a different) time as the JNL is stored in the reversed SJNLVOL 6A2, the first storage subsystem 100A reads the JNL in the SJNLVOL 6A2, and stores the write data included in the JNL in the reversed SVOL (more accurately, the SVPOL) 6A1.

As a result of this flow, write data replication is performed in the VOL group comprising the reversed PVOL 6B2 from the reversed PVOL 6B2 to the reversed SVOL 6A1. Note that similar processing to that of a normal operation, as shown in FIGS. 21A and 21B, is performed in the other VOL groups that have not been subjected to copy reversal processing.

According to this first example, when a fault occurs in the first host terminal 180A which is connected to the first storage subsystem 100A comprising the replication start VOL, the VOL attributes of the JNLVOL 6A2 relating to the replication start VOL 6A1 and the JNLVOL 6B1 relating to the replication goal VOL 6B2 are reversed on the basis of the path management data 500A of the first storage subsystem 100A and the path management data 500B of the second storage subsystem 100B, and the VOL attributes of the replication start VOL 6A1 and replication goal VOL 6B2 are reversed accordingly. As a result of this processing, the replication direction is reversed. At this time, JNL replication processing from the PJNLVOL 6A2 to the SJNLVOL 6B1 and restoration processing from the SJNLVOL 6B1 to the SVOL 6B2 are repeated until the JNL generation update number for the pre-reversal PJNLVOL matches the JNL replication update number and restoration update number for the pre-reversal SJNLVOL. As a result, the content of the pre-reversal replication start VOL becomes identical to the content of the pre-reversal replication goal VOL. Hence in the first example, when a fault occurs in the first host terminal 180A, the replication direction of one of the two VOL groups 16, 16 comprising the PVOL 6A1 is reversed automatically so that highly reliable redundant replication processing is continued.

The first example was described above. To describe the first example in the abstract, the first storage subsystem 100A comprises a first storage device 6A1 and one or more second storage devices 6A2, 6A3, the second storage subsystem 100B comprises a third storage device 6B1 and a fourth storage device 6B2, and the third storage subsystem 100C comprises a fifth storage device 6C1 and a sixth storage device 6C2. The first storage subsystem 100A generates data sets comprising an update number expressing the update order of the first storage device 6A1 and write data stored in the first storage device 6A1, stores the data sets in the one or more second storage devices 6A2, 6A3, and transmits the data sets to the second and third storage subsystems 100B, 100C. The second and third storage subsystems 100B, 100C each store the received data sets in the third or fifth storage device 6B1, 6C1, read the data sets from the third or fifth storage device 6B1, 6C1 according to the update number, and then store the write data within the data sets in the fourth or sixth storage device 6B2, 6C2.

The first example may be subjected to a number of conceivable modifications. These modified examples will be described below.

(A) First Modified Example of First Example

Figure 23:
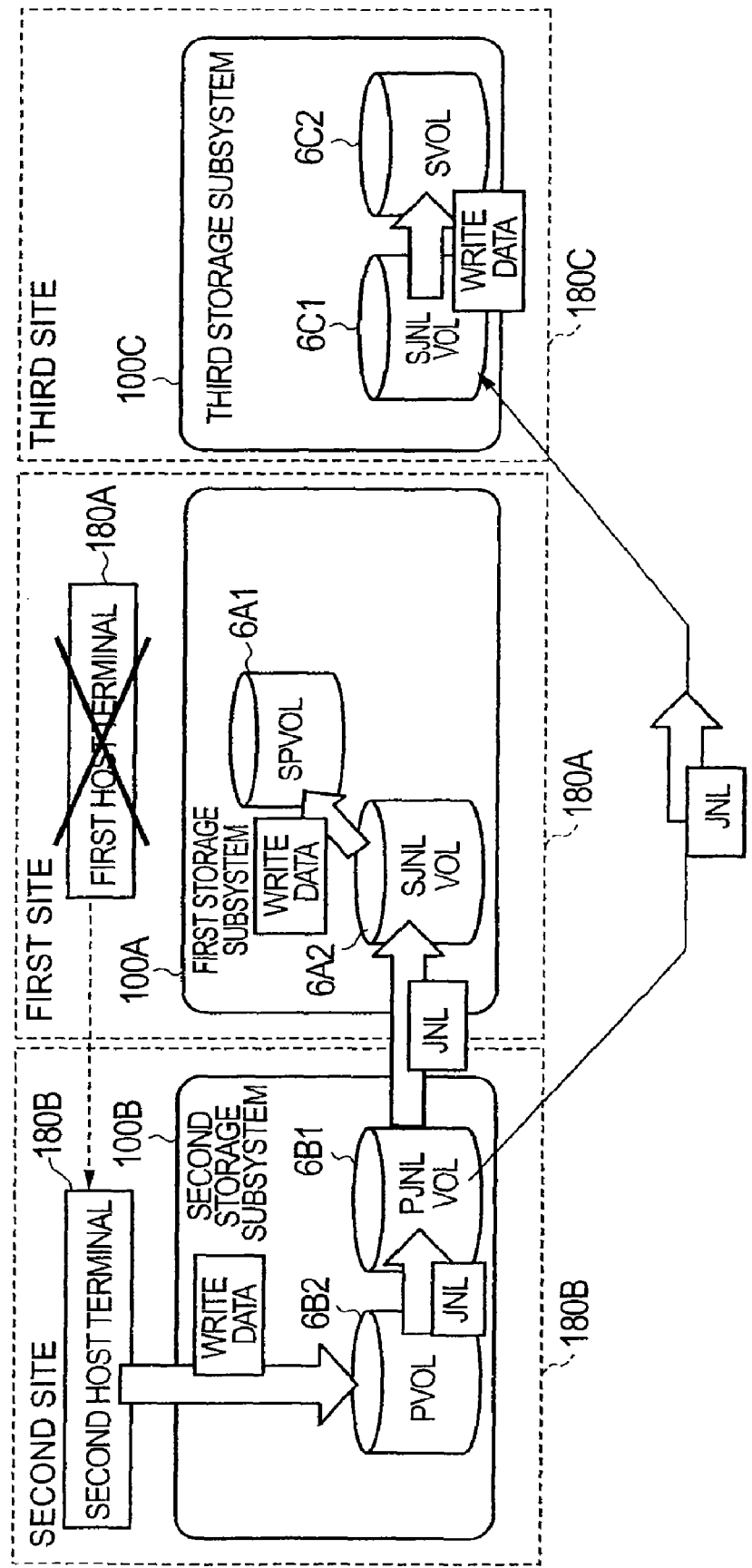
FIG. 23 shows an outline of replication processing after a fault occurs in the first host terminal 180A, which is performed as a first modified example of the multitarget system replication processing shown in FIG. 21A.

FIG. 23 shows an outline of replication processing after a fault occurs in the first host terminal 180A, which is performed as a first modified example of the multitarget system replication processing shown in FIG. 21A, and FIG. 24 shows the flow of processing to switch from the multitarget system to another multitarget system, which is performed when a fault occurs in the first host terminal 180A. The following description will focus on points of difference with the first example described above, and similarities will be either omitted or simplified.

In the "other multitarget system" of the first modified example, as shown in FIG. 23, a single PJNLVOL 6B1 is associated with a single PVOL 6B2, rather than a plurality of PJNLVOLs being associated with a single PVOL, and a plurality of SJNLVOLs 6A2, 6C1 is associated with the single PJNLVOL 6B1.

As shown in FIG. 24, when a fault occurs in the first host terminal 180A in the first modified example, similar processing to that of S101 to S105 is performed, and in addition, VOL group restructuring processing (S106) is performed. This will now be described in detail.

The first storage subsystem 100A specifies the VOL ID of the PJNLVOL 6B1 following copy reversal and the VOL ID of the second SJNLVOL 6C1 from the path management data 500A, and transmits a mirror formation instruction to associate these two VOL IDs, or in other words an instruction to form a mirror pair from the PJNLVOL 6B1 and second SJNLVOL 6C1, to the second storage subsystem 100B and third storage subsystem 100C. The first storage subsystem 100A also specifies the VOL ID of the PJNLVOL 6A3 and the VOL ID of the SJNLVOL 6C1 from the path management data 500A, and transmits a mirror disengagement instruction to disengage the relationship between these two VOL IDs, or in other words, an instruction to disengage the mirror pairing between the PJNLVOL 6A3 and SJNLVOL 6C1, to the third storage subsystem 100C.

In response to the mirror formation instruction from the first storage subsystem 100A, the second storage subsystem 100B sets information indicating the mirror pairing between the PJNLVOL 6B1 and SJNLVOL 6C1 in the path management data 500B.

In response to the mirror disengagement instruction from the first storage subsystem 100A, the third storage subsystem 100C removes information indicating the mirror pairing between the PJNLVOL 6A3 and SJNLVOL 6C1 from the path management data 500C*. Moreover, in response to the mirror formation instruction from the first storage subsystem 100A, the third storage subsystem 100C sets information indicating the mirror pairing between the PJNLVOL 6B1 and SJNLVOL 6C1 in the path management data 500C.

As a result of this series of processes, a new VOL group is established with the VOL 6B2 as the replication start VOL, JNLVOLs 6B1 and 6C1 as the relay JNLVOLs, and the VOL 6C2 as the replication goal VOL.

Replication processing following the other multitarget system is then executed.

For example, after receiving a usability notification as a result of the processing of the second storage subsystem 100B in S104, the second host terminal 180B generates write data, and transmits the generated write data to the second storage subsystem 100B together with a write command relating to the PJNLVOL 6B1*. The second storage subsystem 100B stores the received write data in the PVOL 6B2, generates a JNL comprising the write data and the JNL generation update number (the update number "16", for example) notified by the first storage subsystem 100A, and stores the JNL in the PJNLVOL 6B1.

On the basis of the updated path management data 500A, the first storage subsystem 100A transmits a JNL read command relating to the PJNLVOL 6B1 to the second storage subsystem 100B, receives the JNL in the PJNLVOL 6B1 from the second storage subsystem 100B in response to this command, and stores the received JNL in the SJNLVOL 6A2 which constitutes a mirror pair with the PJNLVOL 6B1. Further, at the same (or a different) time as the JNL is stored in the SJNLVOL 6A2, the first storage subsystem 100A reads a JNL in the SJNLVOL 6A2, and stores the write data comprised in the JNL in the SVOL 6A1.

On the basis of the updated path management data 500C, the third storage subsystem 100C transmits a JNL read command relating to the PJNLVOL 6B1 to the second storage subsystem 100B, receives the JNL in the PJNLVOL 6B1 from the second storage subsystem 100B in response to this command, and stores the received JNL in the SJNLVOL 6C1 which constitutes a mirror pair with the PJNLVOL 6B1. Further, at the same (or a different) time as the JNL is stored in the SJNLVOL 6C1, the third storage subsystem 100C reads a JNL in the SJNLVOL 6C1, and stores the write data comprised in the JNL in the SVOL 6C2.

In the first modified example of the first example described above, when a fault occurs in the first host terminal 180A, the replication direction of one of the two VOL groups 16, 16 comprising the PVOL 6A1 is reversed automatically, and and a plurality of SJNLVOLs is associated with the reversed PJNLVOL. As a result, another multitarget system is established, and replication processing is continued. Thus the entire data processing system 1 does not break down even when a fault occurs in the first host terminal 180A, enabling replication processing to be continued with a high degree of reliability.

(B) Second Modified Example of First Example

Figure 25:
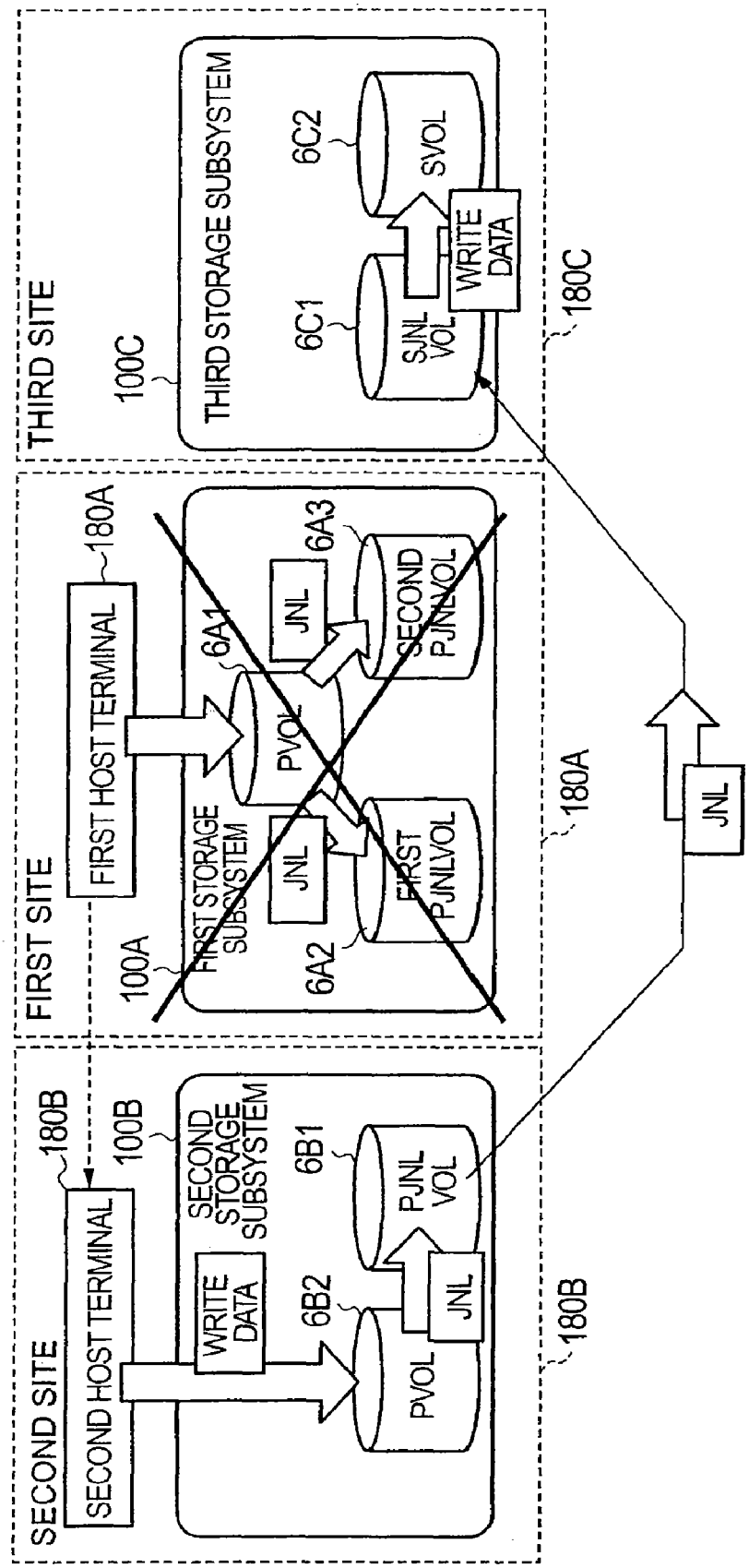
FIG. 25 shows an outline of replication processing after a fault occurs in the first storage subsystem 100A during the multitarget system replication processing shown in FIG. 21A.

FIG. 25 shows an outline of replication processing after a fault occurs in the first storage subsystem 100A during the multitarget system replication processing shown in FIG. 21A, and FIG. 26 shows the flow of processing performed when a fault occurs in the first storage subsystem 100A.

When a fault occurs in the first storage subsystem 100A (S110), the processing of the first host terminal 180A is taken over by the second host terminal 180B (S111). Note that a fault in the first storage subsystem 100A can be determined when no JNL is received by the second storage subsystem 100B or third storage subsystem 100C in response to a JNL read command transmitted to the first storage subsystem 100A after a fixed time period has elapsed following transmission of the JNL read command, for example. In this case, the storage subsystem that makes this determination may notify the host terminal to which it is connected of the determination so that the host terminal, having received the notification, can perform takeover processing from the first host terminal 180A*.

Next, VOL group restructuring processing is performed (S112). A concrete example of this processing will now be described.

The second storage subsystem 100B connected to the second host terminal 180B* which takes over processing from the first host terminal 180A* switches the attribute of the JNLVOL 6B1 from an SJNLVOL attribute to a PJNLVOL attribute, and accordingly switches the attribute of the VOL 6B2 from an SVOL attribute to a PVOL attribute. The second storage subsystem 100B then adds information relating to this new mirror pair constituted by the PJNLVOL 6B1 and SJNLVOL 6C1 to the path management data 500B. The second storage subsystem 100B also transmits to the third storage subsystem 100C a pair partner modification instruction to switch the mirror pair partner of the SJNLVOL 6C1 from the second PJNLVOL 6A3 to the PJNLVOL 6B1, and to switch the VOL pair partner of the SVOL 6C2 from the PVOL 6A1 to the PVOL 6B2. In response to the pair partner modification instruction from the second storage subsystem 100B, the third storage subsystem 100C updates the content of the pair management data 500C to indicate that the mirror pair partner of the SJNLVOL 6C1 is the PJNLVOL 6B1 and the VOL pair partner of the SVOL 6C2 is the PVOL 6B2.

By means of this series of processes, a new VOL group is established with the VOL 6B2 as the replication start VOL, JNLVOLs 6B1 and 6C1 as the relay JNLVOLs, and the VOL 6C2 as the replication goal VOL. Processing corresponding to this new VOL group is then executed. For example, when the second storage subsystem 100B generates a JNL to be stored in the PJNLVOL 6B1 for the first time after the establishment of the new VOL group, the JNL comprises the next update number after the newest update number in the one or more JNLs in the PJNLVOL 6B1. When the second storage subsystem 100B reads the JNL in the PJNLVOL 6B1 and transmits the JNL to the third storage subsystem 100C for the first time after the establishment of the new VOL group, the JNL which is read and transmitted to the third storage subsystem 100C is the JNL comprising an update number specified by the third storage subsystem 100C or having the oldest update number from among the one or more JNLs in the PJNLVOL 6B1. Having received the JNL having the oldest update number, the third storage subsystem 100C destroys the received JNL in cases where a JNL having this update number already exists in the SJNLVOL 6C1 (or when restoration processing based on the JNL is complete) (such a case can be determined by referring to the path management data 500C, for example). When the update number in the received JNL is the next update number ("8", for example) after the newest update number ("7", for example) in the one or more JNLs in the SJNLVOL 6C1, the third storage subsystem 100C stores the JNL in the SJNLVOL 6C1. When the third storage subsystem 100C receives the JNL having the oldest update number and the oldest update number is greater ("9", for example) than the next number after the newest update number ("7", for example) of the one or more JNLs stored in the SJNLVOL 6C1, the third storage subsystem 100C halts replication processing due to the fact that continuous restoration processing in update number order cannot be performed.

In the second modified example of the first example described above, when a fault occurs in the first storage subsystem 100A, a new VOL group is established with the VOLs of the first storage subsystem 100A removed, and replication processing is continued with the new VOL group.

(C) Third Modified Example of First Example

Figure 27:
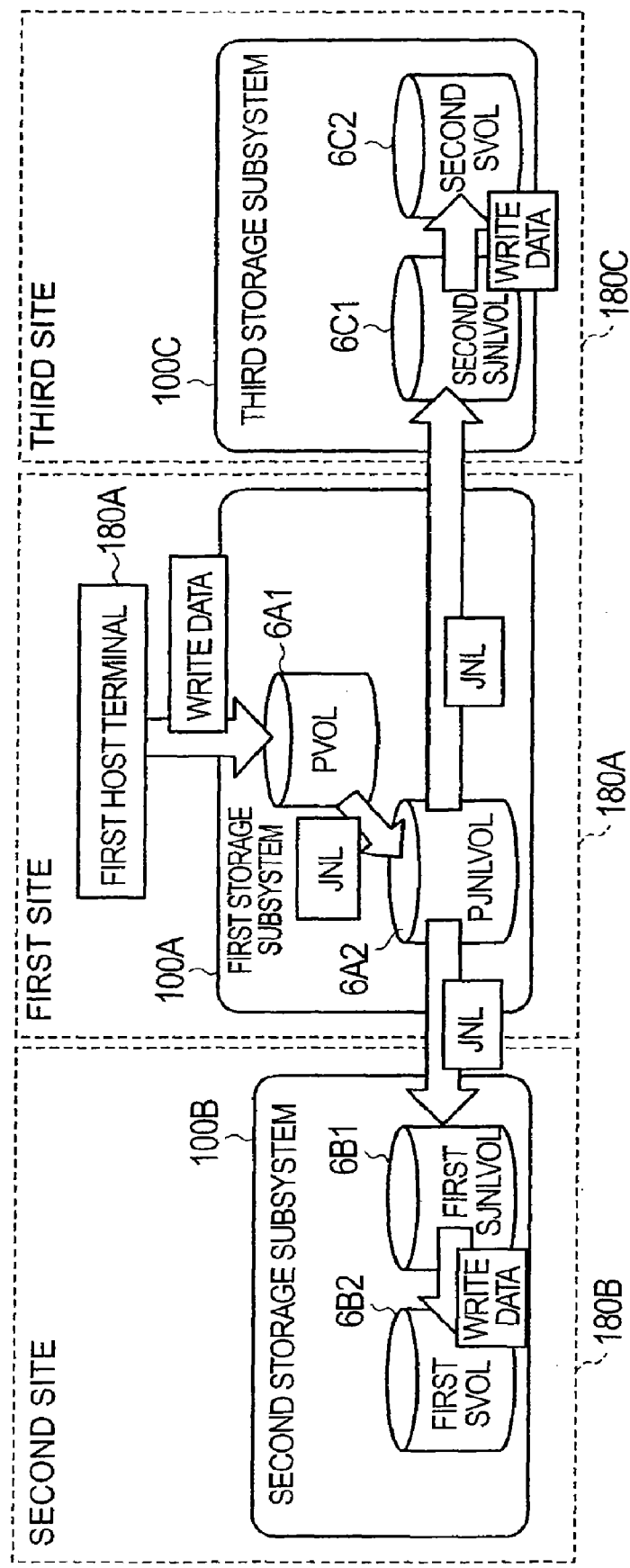
FIG. 27 shows an outline of multitarget system replication processing according to a third modified example of the first example of the present invention.

FIG. 27 shows an outline of multitarget system replication processing according to a third modified example of the first example.

In the third modified example, a single PJNLVOL 6A2 is associated with a single PVOL 6A1, rather than a plurality of PJNLVOLs being associated with the single PVOL 6A1, and a plurality of SJNLVOLs 6B1, 6C1 is associated with the single PJNLVOL 6B1, as shown in FIG. 27. In this case, both the second storage subsystem 100B and the third storage subsystem 100C transmit a JNL read command relating to the PJNLVOL 6A2, and as a result, receive from the first storage subsystem 100A a JNL read from the PJNLVOL 6A2.

According to the third modified example, the first storage subsystem 100A does not need to create a plurality of JNLs for one set of original write data 2, and hence the load on the first storage subsystem 100A can be lightened. Also according to the third modified example, only one PJNLVOL 6A2 need be prepared for the PVOL 6A1, and hence the storage capacity can be reduced.

(D) Fourth Modified Example of First Example

Figure 28A:
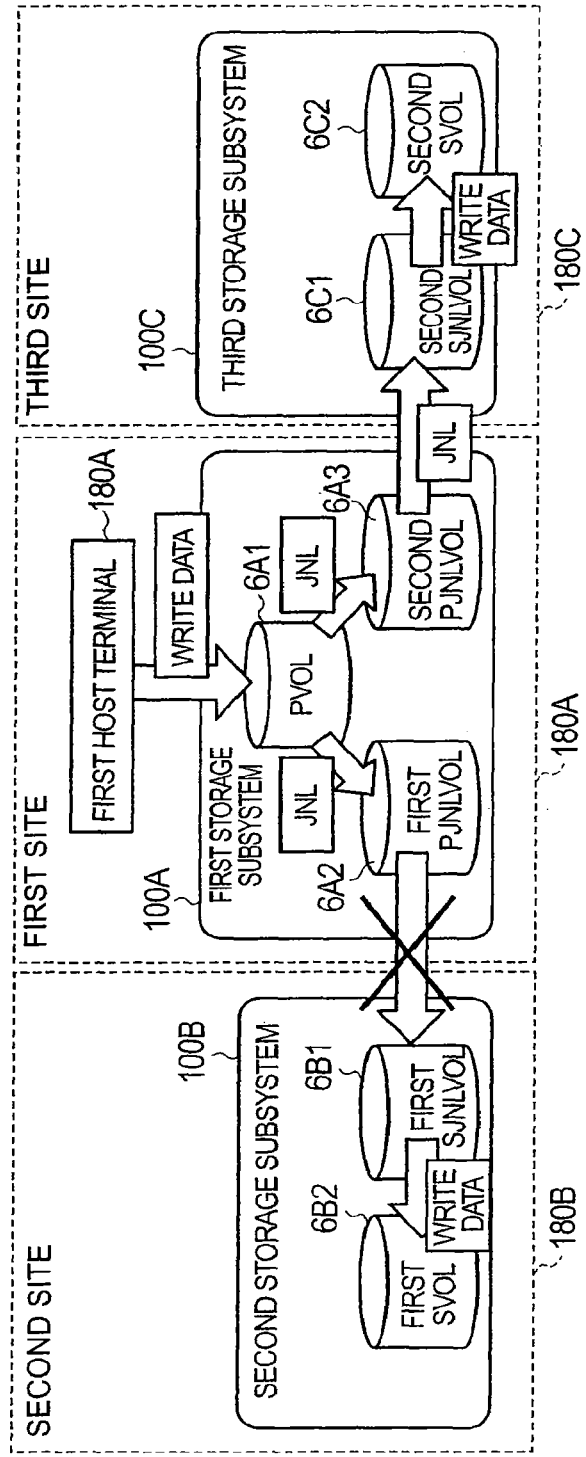
FIG. 28A shows an example of a case in which, during the multitarget system replication processing shown in FIG. 21A, JNL replication from the first storage subsystem 100A to the second storage subsystem 100B becomes impossible.

FIG. 28A shows an example of a case in which, during the multitarget system replication processing shown in FIG. 21A, JNL replication from the first storage subsystem 100A to the second storage subsystem 100B becomes impossible.

Figure 28B:
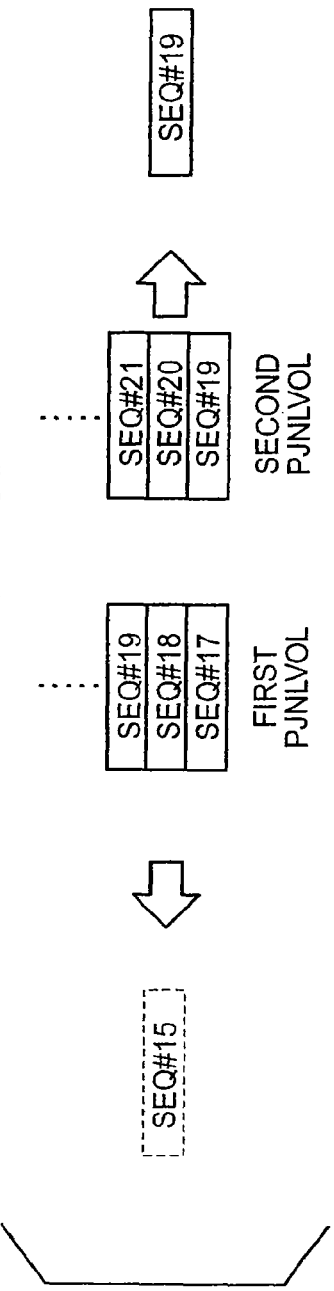
FIG. 28B shows a concrete example of the cause of such a case.

In the multitarget system replication processing shown in FIG. 21A, it may become impossible to perform JNL replication from the first storage subsystem 100A to the second storage subsystem 100B. Examples of such a case include a fault occurring in the connection path 200A which connects the first storage subsystem 100A and second storage subsystem 100B, the absence of the JNL to be read by the second storage subsystem 100B from the PJNLVOL 6A2, as shown in FIG. 28B, and so on. A situation in which the JNL to be read by the second storage subsystem 100B does not exist in the PJNLVOL 6A2 may occur when the JNL having the oldest update number is deleted from the PJNLVOL 6A2 after the PJNLVOL 6A2 becomes filled with JNLs, for example (this applies likewise to multihop system replication processing).

In such a case, as shown in FIG. 28, the first storage subsystem 100A halts JNL replication to the second storage subsystem 100B, but continues JNL replication to the third storage subsystem 100C.

According to the fourth modified example of the first example, even when replication processing along a certain replication path and replication direction is halted, replication processing along the other replication path and replication direction is unaffected.

(E) Fifth Modified Example of First Example

Figure 29:
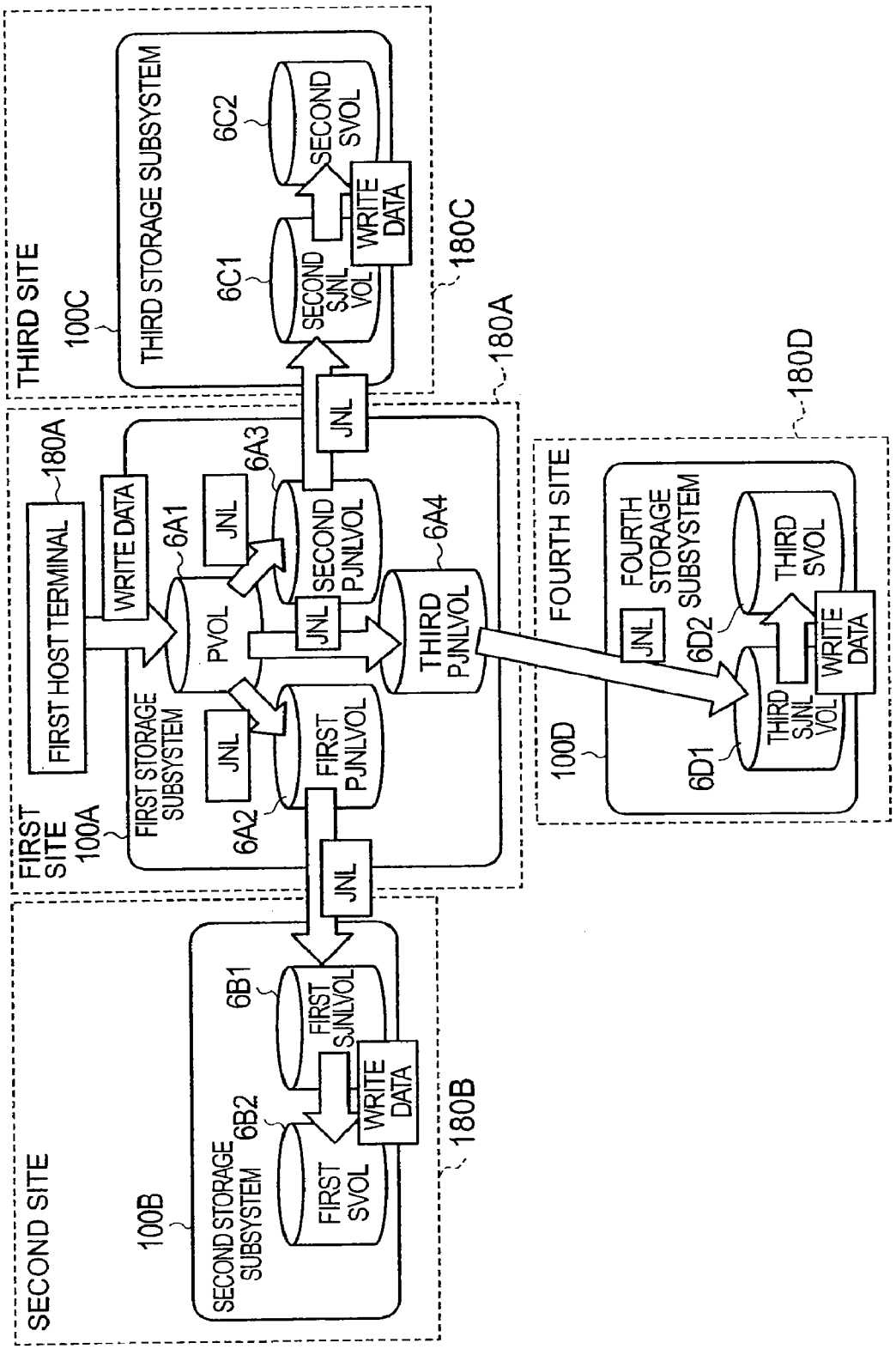
FIG. 29 shows an outline of multitarget system replication processing according to a fifth modified example of the first example of the present invention.

FIG. 29 shows an outline of multitarget system replication processing according to a fifth modified example of the first example.

According to the multitarget system of the fifth modified example, a third PJNLVOL 6A4 is prepared for the PVOL 6A1 in the first storage subsystem 100A, and a third SJNLVOL 6D1 provided in a fourth storage subsystem 100D is associated with the third PJNLVOL 6A4. A third SVOL 6D2 is associated with the third SJNLVOL 6D1.

On the basis of the embodiment and first example of the present invention, multitarget system replication processing can be realized regardless of the number of storage subsystems by determining which PJNLVOL is to be associated with which PVOL, which SJNLVOL is to be associated with which PJNLVOL to form a mirror pair, and which SVOL is to be associated with which SJNLVOL.

Example 2

Next, a second example of the embodiment of the present invention, or in other words the multihop system, will be described in detail.

FIG. 30A shows an outline of multihop system replication processing performed during a normal operation by a data processing system according to a second example of the embodiment of the present invention, FIG. 30B shows an outline of replication processing after a fault occurs in the second host terminal of the data processing system, and FIG. 31 shows the flow of processing to switch from the multihop system to the multitarget system, which is performed when a fault occurs in the second host terminal.

As shown in FIG. 30, during a normal operation (for example, when no faults occur in the data processing system 1), the original write data 2 written in the PVOL 6B2 of the second storage subsystem 100B flow downstream along a single replication path and replication direction in which the PVOL 6B2 serves as the replication start VOL and the VOL 6C2 of the third storage subsystem 100C serves as the replication goal VOL. More specifically, for example, the second storage subsystem 100B generates a JNL 3 on the basis of the original write data 2 written in the PVOL 6B2, and stores the JNL 3 in the PJNLVOL 6B1. The first storage subsystem 100A transmits a JNL read command relating to the PJNLVOL 6B1, receives the JNL read from the PJNLVOL 6B1 from the second storage subsystem 100B in response, and stores the JNL in the SJNLVOL 6A2. Further, the first storage subsystem 100A restores the write data 2 comprised in the JNL 3 in the SPVOL 6A1 at the same timing as the JNL 3 is stored in the SJNLVOL 6A2, for example. Further, at the same (or a different) timing as the write data 2 are restored in the SPVOL 6A1, for example, the first storage subsystem 100A generates a JNL comprising the write data 2 and an update number corresponding thereto, and stores the JNL in the PJNLVOL 6A3. In other words, at an identical site 840A and a substantially identical timing (the timing may be different), the JNL 3 is replicated in the SJNLVOL 6A2, the write data 2 in the JNL 3 are restored in the SPVOL 6A1, and a JNL 3 comprising the restored write data 2 is generated and stored in the PJNLVOL 6A3. The JNL stored in the PJNLVOL 6A3 is read in accordance with a JNL read command from the third storage subsystem 100C, and the write data 2 in the read JNL are restored in the replication goal VOL (SVOL) 6C2 which constitutes a VOL pair with the SPVOL 6A1.

When a fault occurs in the second host terminal 180B that is connected to the second storage subsystem 100B comprising the replication start VOL in this case, multihop system replication processing is switched to multitarget system replication processing. The flow of processing to switch from multihop system replication processing to multitarget system replication processing will now be described with reference to FIGS. 30B and 31.

When a fault occurs in the second host terminal 180B (step S200), this is detected in the data processing system 1. A similar detection method to those described in the first example may be employed.

When a fault occurs in the second host terminal 180B, takeover processing enabling the first host terminal 180A (or third host terminal 180C) to take over the processing of the second host terminal 180B is performed. The host terminal that is to take over the processing may be determined in advance, or the host terminal that is connected to the storage subsystem comprising the SVOL in which restoration processing is most or least advanced may be used. In the following description, the first host terminal 180A is used as the processing takeover destination.

When a fault occurs in the second host terminal 180B, the processing of the second host terminal 180B is taken over by the first host terminal 180A (S201). The first host terminal 180A then transmits a processing start instruction to the first storage subsystem 100A (S202).

In response to the processing start instruction, the first storage subsystem 100A transmits a JNL read command relating to the PJNLVOL 6B1 to the second storage subsystem 100B, reads the JNL 3 from the PJNLVOL 6B1, and stores the read JNL 3 in the SJNLVOL 6A2 (S203A). The first storage subsystem 100A repeats this processing until all of the JNLs 3 stored in the PJNLVOL 6B1 have been read. The second storage subsystem 100B retrieves the JNL comprising an identical number to the JNL replication update number in the mirror management sub data 502B from the PJNLVOL 6B1, transmits this JNL to the first storage subsystem 100A, and then increases the value of the JNL replication update number by one. When the JNL replication update number and the JNL generation update number (the update number "16", for example) in the mirror management sub data 502B become equal, the second storage subsystem 100B may notify the first storage subsystem 100A that no more JNLs to be replicated exist in the PJNLVOL 6B1, whereby the first storage subsystem 100A acknowledges that all of the JNLs have been replicated. Further, when a JNL 3 has been read from the PJNLVOL 6B1, the second storage subsystem 100B may delete the read JNL 3 from the PJNLVOL 6B1. In other words, when all of the JNLs have been read from the PJNLVOL 6B1, the PJNLVOL 6B1 may be emptied.

At the same (or a different) timing as the JNLs 3 read from the PJNLVOL 6B1 are written into the SJNLVOL 6A2 by the first storage subsystem 100A, the first storage subsystem 100A executes restoration processing into the SPVOL 6A1 based on the JNLs 3 stored in the SJNLVOL 6A" (S203B). The first storage subsystem 100A repeats this processing until all of the JNLs 3 stored in the SJNLVOL 6A2 have been read.

By performing the processing of S203A and S203B described above, the content of the SPVOL 6A1 can be made perfectly identical to the content of the replication start VOL 6B2.

Next, the first storage subsystem 100A transmits a usability notification to the first host terminal 180A (S205). Note that the first storage subsystem 100A may also notify the first host terminal 180A of the VOL-ID of the VOL 6A1 so that the first storage subsystem 100A can transmit a write command relating to the VOL 6A1.

Thereafter, the multitarget system replication processing shown in FIG. 30B is performed. More specifically, for example, the following replication processing is performed in the VOL group comprising the reversed SVOL 6B2.

After the first storage subsystem 100A receives the usability notification as a result of the processing in S204, the first host terminal 180A generates write data, and transmits the generated write data to the first storage subsystem 100A together with a write command including the VOL-ID of the reversed PVOL 6A1. In this case, the multitarget system replication processing described with reference to FIGS. 1A and 21A is executed.

According to this second example, when a fault occurs in the second host terminal 180B* which is connected to the second storage subsystem 100B comprising the replication start VOL, the VOL attributes of the JNLVOL 6B1 relating to the replication start VOL 6B2 and the JNLVOL 6A2 relating to the SPVOL 6A1 are reversed on the basis of the path management data 500B of the second storage subsystem 100B and the path management data 500A of the first storage subsystem 100A, and the VOL attributes of the replication start VOL 6B2 and the SPVOL 6A1 are reversed accordingly. As a result of this processing, the replication direction is reversed. At this time, JNL replication processing from the PJNLVOL 6B1 to the SJNLVOL 6A2 and restoration processing from the SJNLVOL 6A2 to the SPVOL 6A1 are repeated until the JNL generation update number for the pre-reversal PJNLVOL matches the JNL replication update number and restoration update number for the pre-reversal SJNLVOL. As a result, the content of the pre-reversal replication start VOL becomes identical to the content of the SPVOL. Hence in the second example, when a fault occurs in the second host terminal 180B\*, the replication direction of the VOL group 16 comprising the PVOL 6B2 is reversed automatically so that highly reliable redundant replication processing is continued.

The second example was described above. Note that the second example may be subjected to a number of conceivable modifications. These modified examples will be described below.

(A) First Modified Example of Second Example

Figure 32:
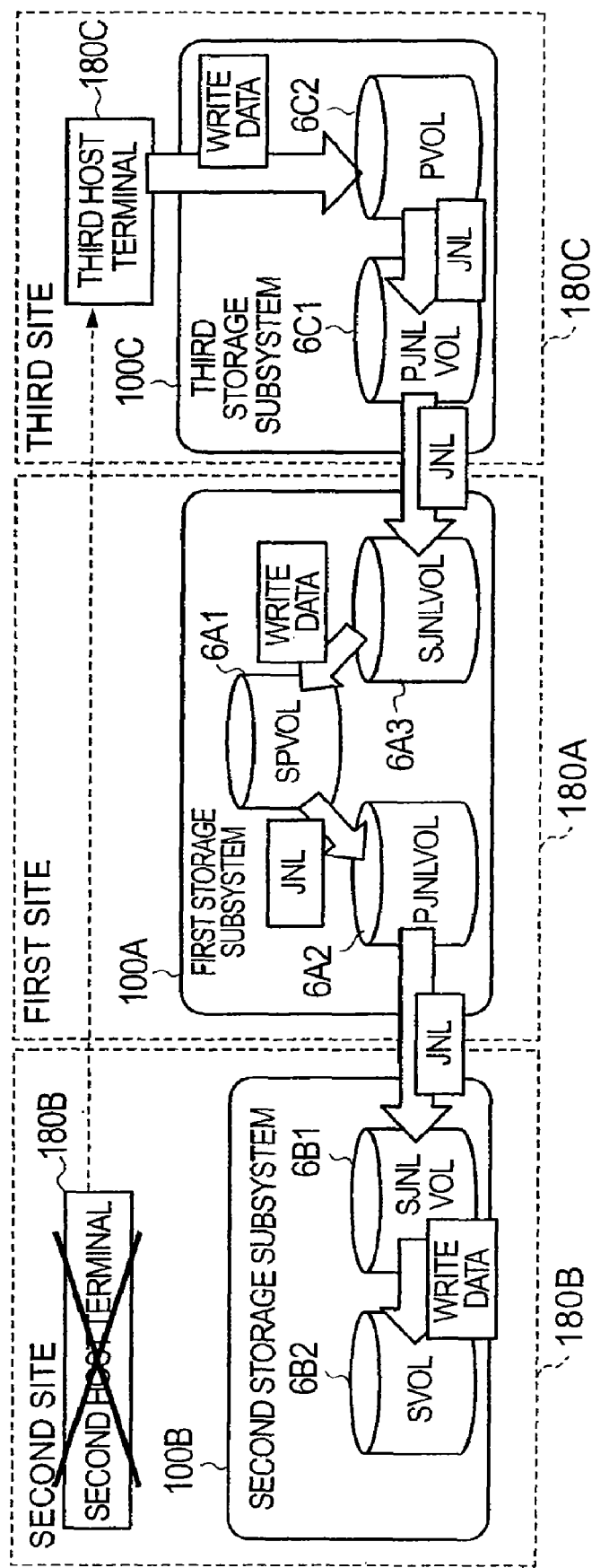
FIG. 32 shows an outline of replication processing after a fault occurs in the second host terminal 180B, which is performed as a first modified example of the multihop system replication processing shown in FIG. 30A.

FIG. 32 shows an outline of replication processing after a fault occurs in the second host terminal 180B, which is performed as a first modified example of the multihop system replication processing shown in FIG. 30A, and FIG. 33 shows the flow of processing to switch from the multihop system to another multihop system, which is performed when a fault occurs in the second host terminal 180B. The following description will focus on points of difference with the first example described above, and similarities will be either omitted or simplified.

In the "other multihop system" of the first modified example, as shown in FIG. 32, the replication path is identical to the replication path shown in FIG. 30A, but the replication direction is opposite to the replication direction exemplified in FIG. 30A. In other words, the replication direction of each VOL group is reversed so that the replication start VOL and replication goal VOL are reversed, and the attribute of each VOL in each VOL group is also reversed.

In the first modified example, when a fault occurs in the second host terminal 180B connected to the second storage subsystem 100B comprising the replication start VOL, the third host terminal 180C connected to the third storage subsystem 100C comprising the replication goal VOL takes over the processing of the second host terminal 180B (S211). The third host terminal 180C then transmits a processing start instruction to the first storage subsystem 100A and third storage subsystem 100C (S212).

Following the processing start instruction to the first storage subsystem 100A, similar processing to that of S203A and S203B, described above, is performed (S213A and S213B). In addition, at the same timing as the write data 2 comprised in the JNL 3 stored in the SJNLVOL 6A2 are restored in the SPVOL 6A1, the first storage subsystem 100A generates a JNL based on these write data 2, and stores the JNL in the PJNLVOL 6A3 (S213C). As a result, the newest update number of the one or more JNLs stored in the SJNLVOL 6A2 becomes equal to the newest update number of the one or more JNLs stored in the PJNLVOL 6A3.

In response to the processing start instruction, the third storage subsystem 100C transmits a JNL read command relating to the PJNLVOL 6A3 to the first storage subsystem 100A, reads the JNL 3 from the PJNLVOL 6A3, and stores the read JNL 3 in the SJNLVOL 6C1 (S213D). The third storage subsystem 100C repeats this processing until all of the JNLs 3 stored in the PJNLVOL 6A3 have been read. The first storage subsystem 100A retrieves the JNL comprising an identical number to the JNL replication update number in the mirror management sub data 502A from the PJNLVOL 6A3, transmits this JNL to the third storage subsystem 100C, and then increases the value of the JNL replication update number by one. When the JNL replication update number and the JNL generation update number (the update number "16", for example) in the mirror management sub data 502A become equal, the first storage subsystem 100A may notify the third storage subsystem 100C that no more JNLs to be replicated exist in the PJNLVOL 6A3, whereby the third storage subsystem 100C acknowledges that all of the JNLs have been replicated. Further, when a JNL 3 has been read from the PJNLVOL 6A3, the first storage subsystem 100A may delete the read JNL 3 from the PJNLVOL 6A3. In other words, when all of the JNLs have been read from the PJNLVOL 6A3, the PJNLVOL 6A3 may be emptied.

At the same (or a different) time as the JNLs 3 read from the PJNLVOL 6A3 are written into the SJNLVOL 6C1 by the third storage subsystem 100C, the third storage subsystem 100C executes restoration processing into the SVOL 6C2 based on the JNLs 3 stored in the SJNLVOL 6C1 (S213E). The third storage subsystem 100C repeats this processing until all of the JNLs 3 stored in the SJNLVOL 6C1 have been read.

By performing the processing of S213A through S213E described above, the content of the SVOL 6C2 can be made perfectly identical to the content of the replication start VOL 6B2.

By having the first storage subsystem 100A and second storage subsystem 100B perform similar processing to S204A and S204B described above, the replication direction of the VOL group comprising the SJNLVOL 6A2 is reversed (S214A and S214B). The first storage subsystem 100A (or second storage subsystem 100B) then notifies the third storage subsystem 100C of whether reversal of the VOL group comprising the SJNLVOL 6A2 was a success or a failure (S214C).

The third storage subsystem 100C then executes copy reversal processing to reverse the replication direction of the VOL group comprising the SJNLVOL 6C1 (S214D). More specifically, for example, the third storage subsystem 100C generates a JNL copy reversal instruction including the mirror ID "2" of the mirror pair comprising the SJNLVOL 6C1, and specifies the PJNLVOL which constitutes the mirror pair with the SJNLVOL 6C1 and the primary storage subsystem comprising this PJNLVOL by referring to the path management data 500C. The third storage subsystem 100C then transmits the generated JNL copy reversal instruction to the specified primary storage subsystem (that is, the first storage subsystem) 100A. Further, for example, the third storage subsystem 100C switches the PJNLVOL-ID, PVOL-ID, and primary storage subsystem ID relating to the mirror ID "2" for the SJNLVOL-ID, SVOL-ID, and secondary storage subsystem ID in the path management data 500C. Further, for example, the third storage subsystem 100C associates the JNL generation update number received during copy reversal processing of the first storage subsystem 100A\* with the reversed PJNLVOL 6C1, and sets this JNL generation update number in the path management data 500C\*.

Having received the JNL copy reversal instruction from the third storage subsystem 100C, the first storage subsystem 100A executes copy reversal processing in response to the instruction (S214A). More specifically, for example, the first storage subsystem 100A notifies the third storage subsystem 100C of the JNL generation update number (the update number "16", for example) relating to the PJNLVOL 6A3 by referring to the path management data 500A. Further, for example, the first storage subsystem 100A switches the PJNLVOL-ID, PVOL-ID, and primary storage subsystem ID relating to the mirror ID "2" for the SJNLVOL-ID, SVOL-ID, and secondary storage subsystem ID in the path management data 500A. Further, for example, the first storage subsystem 100A transmits a JNL read command relating to the reversed PJNLVOL 6C1 to the third storage subsystem 100C so that the JNLs in the PJNLVOL 6C1 can be read and stored in the reversed SJNLVOL 6A3.

When the third storage subsystem 100C receives notification of a reversal failure from the first storage subsystem 100A, the third storage subsystem 100C notifies the third host terminal 180C of the reversal failure, and when the third storage subsystem 100C receives notification of a reversal success from the first storage subsystem 100A, the third storage subsystem 100C transmits a usability notification to the third host terminal 180C (S215). Note that in the latter case, the third storage subsystem 100C may notify the third host terminal 180C of the VOL-ID of the VOL 6C2 so that the third host terminal 180C can transmit a write command relating to the VOL 6C2.

When the third host terminal 180C receives notification of a reversal failure from the third storage subsystem 100C, the third host terminal 180C does not generate write data or transmit a write command.

On the other hand, when notification of a reversal success is transmitted to the third host terminal 180C, replication processing according to the new multihop system shown in FIG. 32 is performed. More specifically, for example, the following replication processing is performed in the VOL group comprising the reversed PVOL 6C2.

The third host terminal 180C generates write data, and transmits the generated write data to the third storage subsystem 100C together with a write command including the VOL-ID of the reversed PVOL 6C2. The third storage subsystem 100C stores the received write data in the PVOL 6C2, generates a JNL comprising the write data and the JNL generation update number (the JNL generation update number corresponding to the PJNLVOL 6C1) set in the path management data 500C, and stores the JNL in the reversed PJNLVOL 6C1. The first storage subsystem 100A transmits a JNL read command relating to the PJNLVOL 6C1 to the third storage subsystem 100C, and stores the JNL read in response to the JNL read command in the SJNLVOL 6A3. The first storage subsystem 100A stores the write data comprised in the JNL stored in the SJNLVOL 6A3 in the SPVOL 6A1, generates a JNL comprising these write data and the JNL generation update number (the JNL generation update number corresponding to the PJNLVOL 6A2) set in the path management data 500A, and then stores the JNL in the PJNLVOL 6A2. The JNL is then replicated in the SJNLVOL 6B1 from the PJNLVOL 6A2, and the write data in the JNL are restored in the SVOL 6B2.

In the first modified example of the second example, when a fault occurs in the second host terminal 180B, the replication direction is reversed automatically in all of the storage subsystems, and hence a new multihop system is established automatically so that replication processing can be performed in accordance with this new multihop system. Hence, even when a fault occurs in the second host terminal 180B, the entire data processing system 1 does not break down, and therefore highly reliable replication processing can be continued. Note that according to this first modified example, a new multihop system can also be established in the multihop system shown in FIG. 36, to be described below, by reversing the replication direction (in particular the JNL replication direction, or in other words the JNLVOL attributes) of all of the storage subsystems.

(B) Second Modified Example of Second Example

Figure 34:
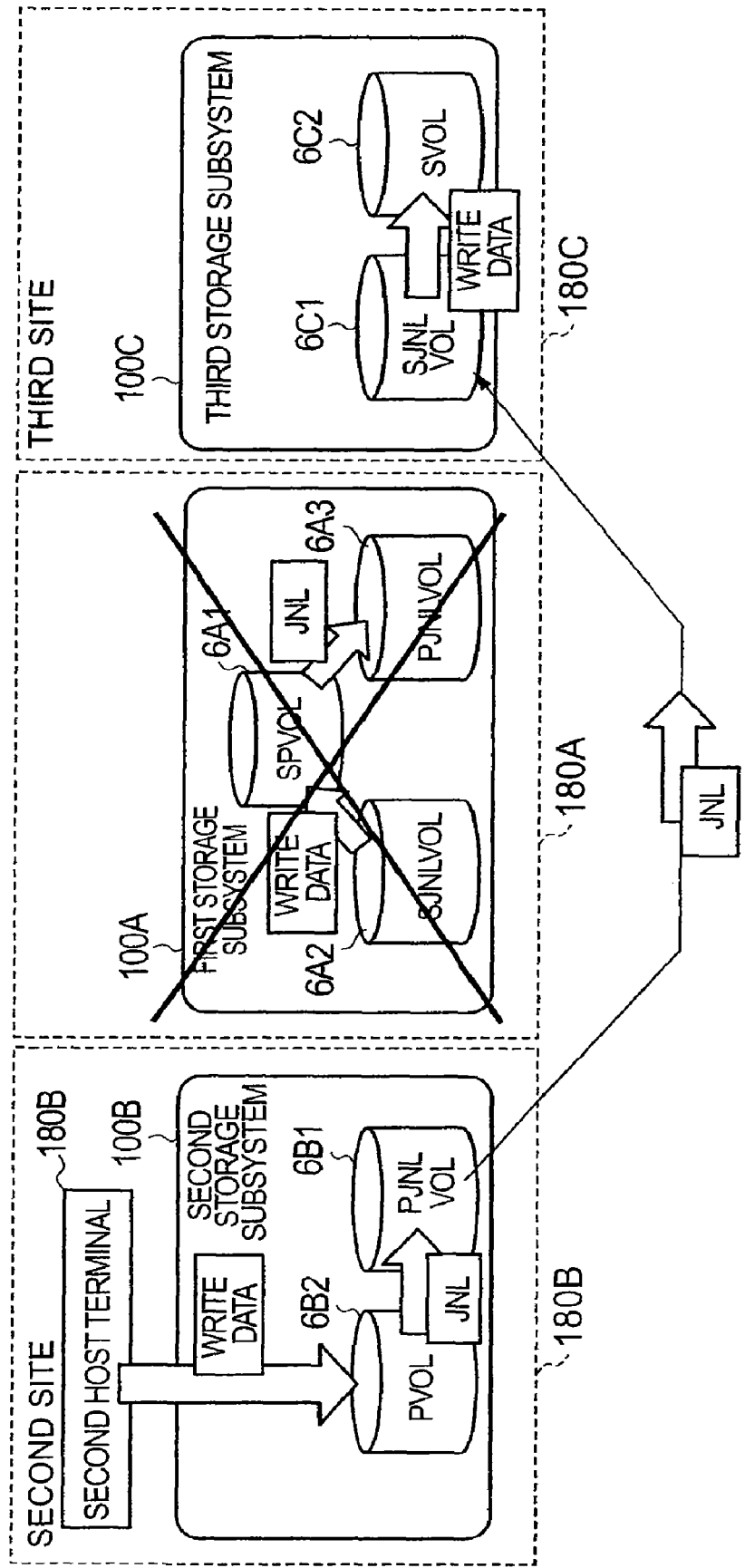
FIG. 34 shows an outline of replication processing after a fault occurs in the first storage subsystem 100A during the multihop system replication processing shown in FIG. 30A.

FIG. 34 shows an outline of replication processing after a fault occurs in the first storage subsystem 100A during the multihop system replication processing shown in FIG. 30A, and FIG. 35 shows the flow of processing performed when a fault occurs in the first storage subsystem 100A.

When a fault occurs in the first storage subsystem 100A (S220), this is detected using a similar method to those described in the second modified example of the first example. When a fault in the first storage subsystem 100A is detected, VOL group restructuring processing is performed (S221). The processing of S221 is similar to S112 described above (see FIG. 26).

The second storage subsystem 100B adds information relating to the new mirror pair constituted by the PJNLVOL 6B1 and SJNLVOL 6C1 to the path management data 500B. The second storage subsystem 100B also transmits to the third storage subsystem 100C a pair partner modification instruction to switch the mirror pair partner of the SJNLVOL 6C1 from the second PJNLVOL 6A3 to the PJNLVOL 6B1, and to switch the VOL pair partner of the SVOL 6C2 from the PVOL 6A1 to the PVOL 6B2. In response to the pair partner modification instruction from the second storage subsystem 100B, the third storage subsystem 100C updates the content of the pair management data 500C to indicate that the mirror pair partner of the SJNLVOL 6C1 is the PJNLVOL 6B1 and the VOL pair partner of the SVOL 6C2 is the PVOL 6B2.

By means of this series of processes, a new VOL group is established with the VOL 6B2 as the replication start VOL, the JNLVOLs 6B1 and 6C1 as the relay JNLVOLs, and the VOL 6C2 as the replication goal VOL. Processing corresponding to this new VOL group is then executed. For example, when the second storage subsystem 100B generates a JNL to be stored in the PJNLVOL 6B1 for the first time after the establishment of the new VOL group, the JNL comprises the next update number ("16", for example) after the newest update number in the one or more JNLs in the PJNLVOL 6B1. When the second storage subsystem 100B reads the JNL in the PJNLVOL 6B1 and transmits the JNL to the third storage subsystem 100C for the first time after the establishment of the new VOL group, the JNL which is read and transmitted to the third storage subsystem 100C is the JNL comprising an update number specified by the third storage subsystem 100C or having the oldest update number from among the one or more JNLs in the PJNLVOL 6B1. Having received the JNL having the oldest update number, the third storage subsystem 100C destroys the received JNL in cases where a JNL having this update number already exists in the SJNLVOL 6C1 (or when restoration processing based on the JNL is complete). When the update number in the received JNL is the next update number ("8", for example) after the newest update number ("7", for example) in the one or more JNLs in the SJNLVOL 6C1, the third storage subsystem 100C stores the JNL in the SJNLVOL 6C1. When the third storage subsystem 100C receives the JNL having the oldest update number and the oldest update number is greater ("9", for example) than the next number after the newest update number ("7", for example) of the one or more JNLs stored in the SJNLVOL 6C1, the third storage subsystem 100C halts replication processing due to the fact that continuous restoration processing in update number order cannot be performed.

In the second modified example of the second example described above, when a fault occurs in the first storage subsystem 100A, a new VOL group is established with the VOLs of the first storage subsystem 100A removed, and replication processing is continued with the new VOL group.

(C) Third Modified Example of First Example

Figure 36:
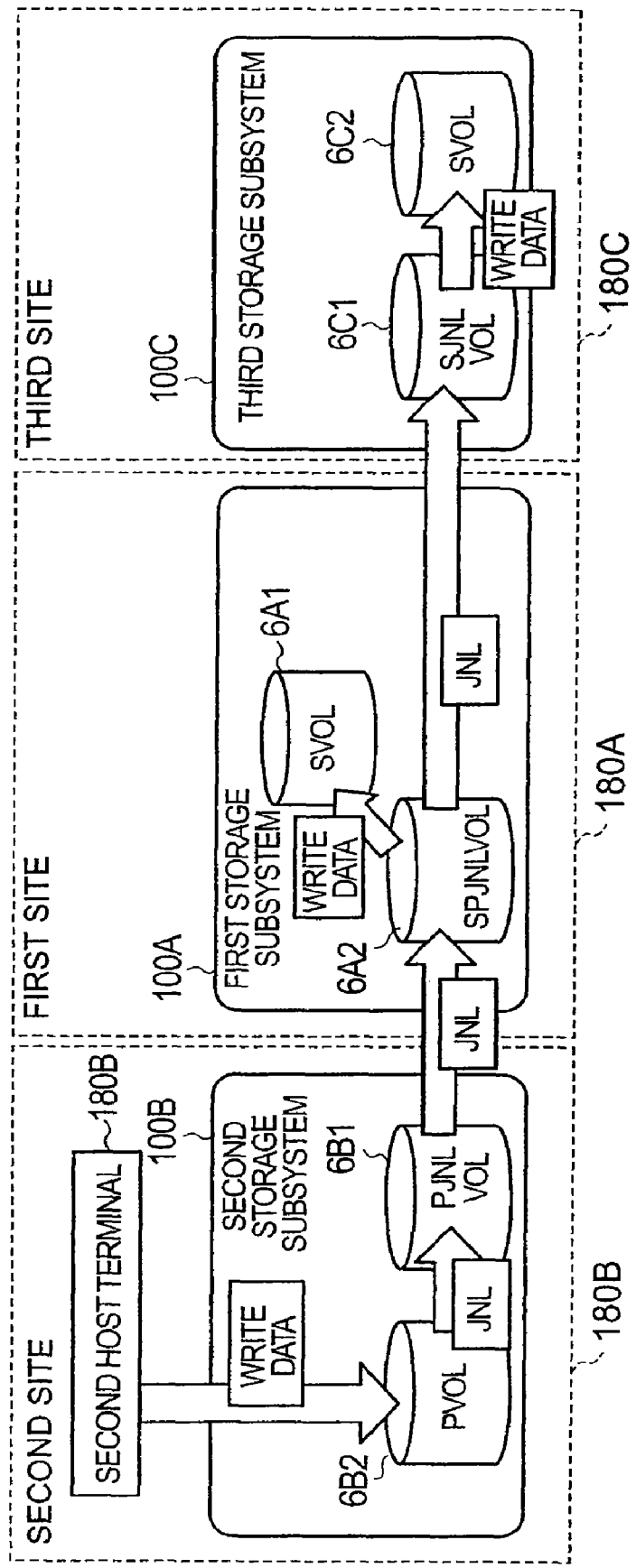
FIG. 36 shows an outline of multihop system replication processing according to a third modified example of the second example of the present invention.

FIG. 36 shows an outline of multihop system replication processing according to a third modified example of the second example.

In the third modified example, the JNLVOL 6A2 becomes an SPJNLVOL having both an SJNLVOL attribute and a PJNLVOL attribute, and the SVOL 6A1 and SJNLVOL 6C1 are associated with the SPJNLVOL 6A2. In this case, the write data comprised in a JNL transmitted from the PJNLVOL 6B1 to SPJNLVOL 6A2 are restored in the SVOL 6A1, and the JNL stored in the SPJNLVOL 6A2 is replicated in the SJNLVOL 6C1.

According to the third modified example, the first storage subsystem 100A no longer needs to create a JNL, and hence the load on the first storage subsystem 100A can be lightened. Also according to the third modified example, the JNLVOL 6A3 becomes unnecessary, and hence the storage capacity can be reduced.

Figure 38A:
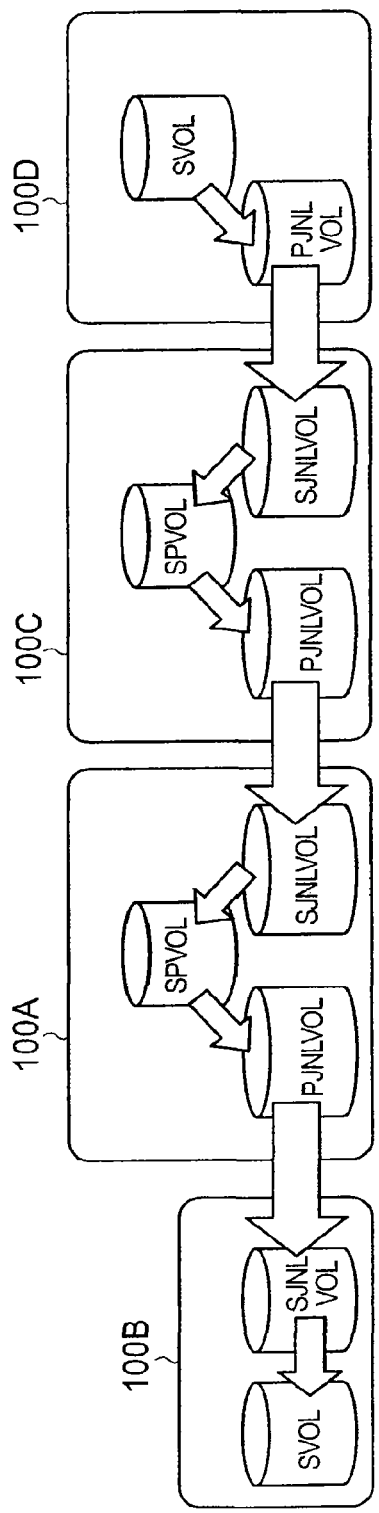
FIG. 38A shows an outline of multihop system replication processing according to a sixth modified example of the second example of the present invention.
Figure 38B:
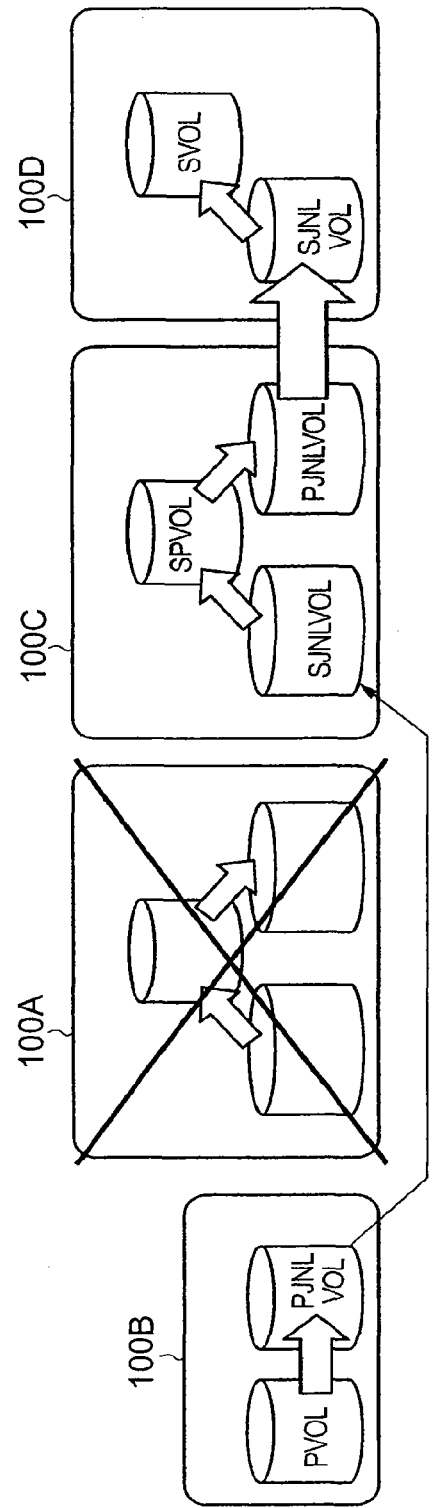
FIG. 38B shows an outline of multihop system replication processing according to a seventh modified example of the second example of the present invention.

Modified examples of the second example were described above. Note that according to the description up to this point, a multihop system may be established with four or more storage subsystems 100. According to the description of FIG. 30A, for example, the multihop system shown in FIG. 37A can be established. According to the description of FIG. 36, the multihop system shown in FIG. 37B can be established. Further, according to the description of FIGS. 32 and 33, when a fault occurs in the second host terminal 180B, for example, a mechanism for switching from the multihop system shown in FIG. 37A to another multihop system shown in FIG. 38A can be established. Further, according to the description of FIGS. 34 and 35, when a fault occurs in the first storage subsystem 100A, for example, a mechanism for switching from the multihop system shown in FIG. 37A to another multihop system shown in FIG. 38B can be established.

Example 3

Next, a third example of the embodiment of the present invention will be described. The third example relates to an example of a method of setting various information for realizing at least one of the embodiment, first example, and second example described above. GUI (graphical user interface) screens used when this method is employed will be described below. Note that the GUI screens to be described below are assumed to be GUI screens provided by software installed in the SVPs 281A to 281C or the management terminal 109. Furthermore, in the following description, an example is provided in which a VOL group is created from a first site 1 to a second site 2, but the description may be applied to a case in which a VOL group is created from another site to yet another site.

Figure 39A:
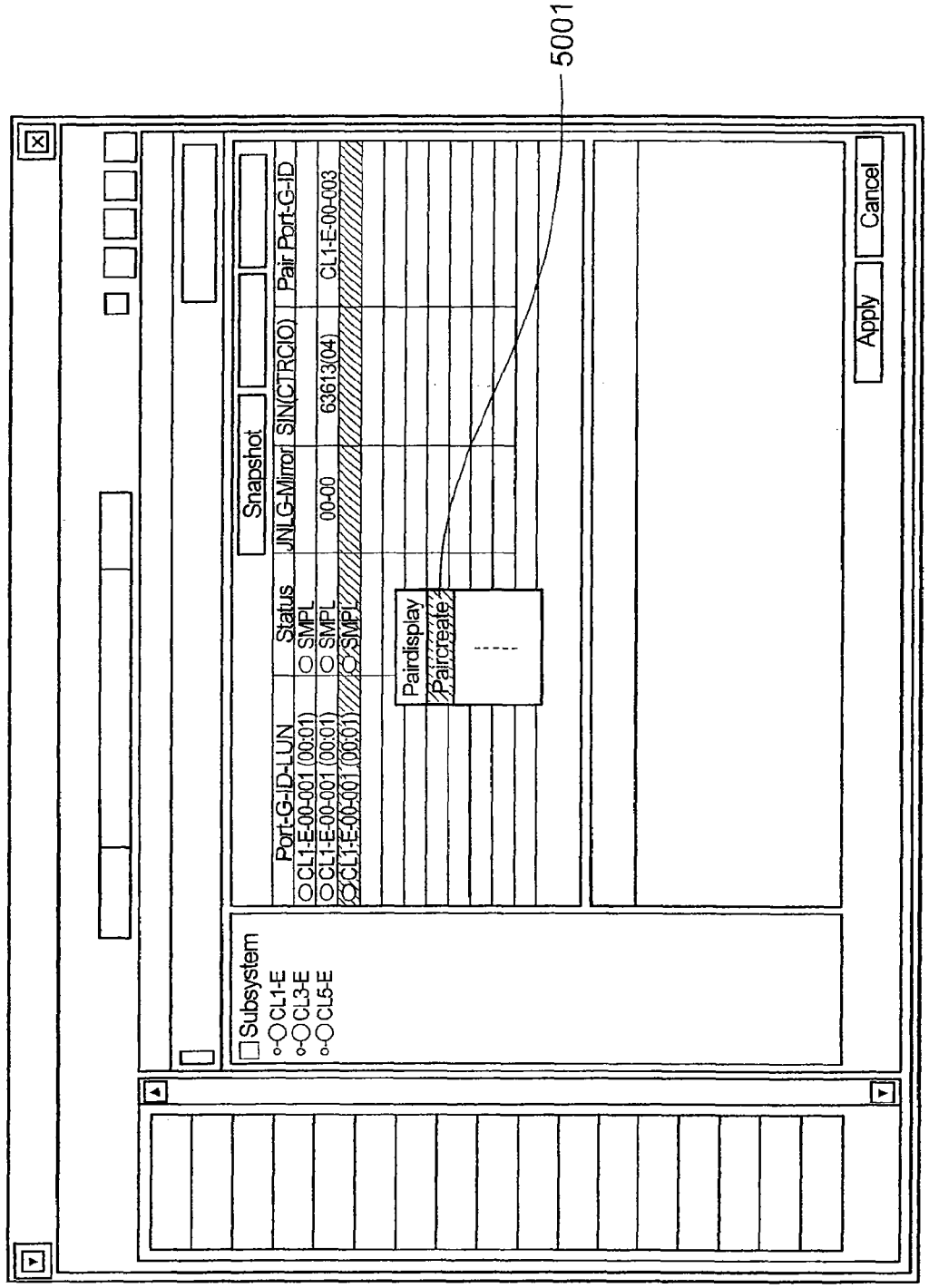
FIG. 39A shows a constitutional example of a first GUI screen according to a third example of the present invention.

FIG. 39A is an example of a first GUI screen.

The first GUI screen is used to specify the VOLs constituting a pair and to confirm the pair condition. When a "Pair Create" menu, indicated by the reference number 5001, is selected from the first GUI screen, a second GUI screen to be described below is displayed, enabling creation of a VOL group.

FIG. 39B is an example of the second GUI screen.

The second GUI screen is used to input information relating to the VOL group. Information relating to the VOL pair partner when the write data VOL 6A1 of the first site 840A is set as a PVOL, for example information relating to the write data VOL 6B2 of the second site 840B, may be input into the section indicated by the reference number 5002, for example. Information relating to the JNLVOL (PJNLVOL) 6A2 that is associated with the write data VOL 6A1 (PVOL) of the first site 840A may be input into the section indicated by the reference number 5003. Information relating to the JNLVOL (SJNLVOL) 6B1 which constitutes a mirror pair with the JNLVOL 6A2 and is associated with the write data VOL 6B2 may be input into the section indicated by the reference number 5005. The mirror ID of the mirror pair may be input into the section indicated by the reference number 5004. Information relating to the second storage subsystem 100B comprising the pair partner VOLs 6B2 and 6B1 may be input into the section indicated by the reference number 5006. Once this information has been input and a "SET" button 5007 has been pressed, a copy execution instruction is input from the management terminal 109 through the SVPs 281A and 281B to the first and second storage subsystems 100A, 100B, for example, whereby the initial copy processing shown in FIG. 10, for example, is executed. On the basis of the input information, the content of the volume management data 400A and 400B and the path management data 500A and 500B is updated.

A preferred embodiment and several examples of the present invention were described above, but it goes without saying that the present invention is not limited to this embodiment and examples, and may be subjected to various modifications within a scope that does not depart from the gist of the present invention.

For example, by providing four or more storage subsystems, a data processing system employing both the multitarget system and the multihop system can be established.

Further, for example, in the second modified example and so on of the first example or second example, the storage subsystem 100 may transmit a JNL read command to another storage subsystem 100 in order to receive a JNL from the other storage subsystem 100, and when the update number in the received JNL is larger than the next update number after the newest update number (or no larger than the newest update number) in the SJNLVOL comprised in the storage subsystem 100 itself, the storage subsystem 100 may destroy the received JNL and transmit a JNL read command (which may include specification of the desired update number) to another storage subsystem 100 in an attempt to receive a JNL comprising the next update number after the newest number in the SJNLVOL comprised in the storage subsystem 100 itself (in other words, the desired update number). Moreover, at this time a certain storage subsystem 100 may transmit a JNL read command to another storage subsystem 100 existing further downstream.

Further, for example, the control information 141 of each storage subsystem 100 provided in the data processing system 1 may include position data (for example, position data corresponding to the storage subsystem ID) indicating the position of the storage subsystem 100 itself and/or the other storage subsystems 100 on the replication path. By referring to one or more sets of position data, the storage subsystem 100 can specify the position of each storage subsystem 100 on the replication path. Also in this case, when a storage subsystem 100 fails to receive from another storage subsystem 100 a JNL comprising the next update number after the newest update number in the SJNLVOL comprised in the storage subsystem 100 itself (in other words, the desired update number), for example, the storage subsystem 100 can specify another storage subsystem 100 existing downstream of the aforementioned storage subsystem 100 (for example, the storage subsystem furthest downstream) by referring to its control information 141, and attempt to receive the JNL comprising the desired update number from the specified storage subsystem 100. This is believed to be particularly effective in the multihop system when the oldest JNL has been deleted due to the JNLVOL becoming filled with JNLs, for example. The reason for this is that in the multihop system, the storage subsystems 100 existing further downstream than upstream are more likely to be holding JNLs comprising older update numbers.

Further, for example, when at least one of the replication path and replication direction is restructured due to a fault in the host terminal, storage subsystem, or the like, the storage subsystem 100 may retrieve a new replication source VOL or replication destination VOL associated with a VOL comprised in itself, and update its control information 141 to show that the new replication source VOL or replication destination VOL is associated with the VOL. In this case, the new replication source VOL or replication destination VOL may be determined according to the following method. For example, when information relating to all of the replication paths and replication directions in the data processing system 1 (for example, a plurality of VOL IDs and storage subsystem IDs arranged in the replication direction) is recorded in the control information 141, the storage subsystem may refer to this information to determine the new replication source VOL or replication destination VOL. More specifically, for example, when a fault occurs in the first storage subsystem 100A, the second storage subsystem 100B may refer to the second control information 141B in which information relating to all of the replication paths and replication directions is recorded, select the JNLVOL 6C1 having a replication destination attribute, and associate the SJNLVOL 6C1 with the PJNLVOL 6B1.

Further, for example, the timing at which the storage subsystem 100 transmits a JNL read command (or JNL write command) may be determined according to the load on the storage subsystem 100 (the CPU usage rate, for example) being no more than a fixed load or the like.

Further, for example, when the first site 840A is taken over by the second site 840B, the following conditions (A) and (B), for example, may be employed as the conditions for executing this takeover.

(A) External (Constitutional) Conditions

The infrastructure of the first site 840A and second site 840B is normal. At least one host terminal is connected to the second site 840B serving as the takeover destination. Any host terminal may be used as long as it is capable of transmitting a takeover instruction to the second site 840B (for example, the storage subsystem 100B in the second site 840B).

(B) Internal (Processing) Conditions

Takeover is performed after the update condition in the PVOL of the first site 840A prior to takeover (for example, the update number corresponding to the write data written most recently in the PVOL) and the update condition in the SVOL of the second site 840B (for example, the update number corresponding to the write data restored most recently in the SVOL) have become identical. This is in order to preserve the consistency (uniformity) of the information. Note that when the oldest JNL in the first site 840A is destroyed such that the update condition in the PVOL of the first site 840A and the update condition in the SVOL of the second site 840B cannot be made identical, for example, the storage subsystem 100B of the second site 840B may either cancel the takeover, or access a different storage subsystem in another site, obtain the oldest JNL that was destroyed in the first site 840A from the other storage subsystem, and make the update condition in this site identical to the update condition of the first site 840A.

What is claimed is:
1. A storage system comprising:
a first storage apparatus coupled to a host computer, the first storage apparatus including a plurality of first disk drives for storing data and a first controller for controlling the storing of the data in the plurality of first disk drives;
a second storage apparatus coupled to the first storage apparatus, the second storage apparatus including a plurality of second disk drives for storing data and a second controller for controlling the storing of the data in the plurality of second disk drives; and
a third storage apparatus coupled to the first storage apparatus, the third storage apparatus including a plurality of third disk drives for storing data and a third controller for controlling the storing of the data in the plurality of third disk drives;
wherein the first controller is configured to:
  store data received from the host computer in a first volume of data storage created from a portion of the first disk drives;
  generate a data set that comprises the data stored in the first volume and an update number that expresses an update order of the data stored in the first volume;
  store the generated data set in a first journal volume of data storage created from another portion of the first disk drives; and
  transmit one or more generated data sets to the second storage apparatus and to the third storage apparatus;
wherein the second controller is configured to:
  store the one or more generated data sets transmitted from the first storage apparatus in a second journal volume created from a portion of the second disk drives; and
  store data related to the one or more data sets stored in the second journal volume in a second volume created from another portion of the second disk drives according to an update number included in the one or more generated data sets; and
wherein the third controller is configured to:
  store the one or more generated data sets transmitted from the first storage apparatus in a third journal volume created from a portion of the third disk drives; and
  store data related to the one or more data sets stored in the third journal volume in a third volume created from another portion of the third disk drives according to another update number included in the one or more generated data sets;
wherein, in response to a failure that occurs in the first storage apparatus,
the second controller is operable to transmit the one or more data sets stored in the second journal volume such that the third controller stores one or more data sets, comprising data not stored in the third volume, related to the one or more data sets, transmitted from the second storage apparatus in the third volume, according to the update number included in the one or more data sets stored in the second volume.

2. The storage system according to claim 1, wherein the third controller is operable to store a particular data set, comprising a data set not stored in the third journal volume, of the one or more data sets transmitted from the second storage apparatus in the third journal volume, according to the update number stored in the second volume.

3. The storage system according to claim 1, wherein the third controller is configured to:
store the one or more data sets transmitted from the second storage apparatus in a data volume other than the third journal volume, in response to an update number of a latest data set in the third journal volume and the update number of one of the one or more data sets transmitted from the second storage apparatus are not continuous.

4. The storage system according to claim 1, wherein the first controller is configured to transmit the one or more generated data sets to the second storage apparatus in response to a read request from the second storage apparatus.

5. The storage system according to claim 1, wherein the second controller is configured to read the one or more data sets from the second journal volume and store the read one or more data sets in the second volume at a different timing from a timing at which the one or more data sets are stored in the second journal volume.

6. The storage system according to claim 1, wherein the third controller is configured to:
manage the first volume as a source volume of the third volume, which comprises a destination volume of a replication pair; and
change the source volume of the third volume to the second volume from the first volume, in response to the failure that occurs in the first storage apparatus.

7. A method for operation of a storage system, wherein the storage system includes a first storage apparatus coupled to a host computer including a plurality of first disk drives for storing data and a first controller for controlling storing the data in the plurality of first disk drives, a second storage apparatus coupled to the first storage apparatus including a plurality of second disk drives for storing data and a second controller for controlling storing the data in the plurality of second disk drives, and a third storage apparatus coupled to the first storage apparatus including a plurality of third disk drives for storing data and a third controller for controlling storing the data in the plurality of third disk drives, the method comprising:
storing data transmitted from the host computer in a first volume of data storage created from a portion of the first disk drives;
generating a data set that comprises the data stored in the first volume and an update number expressing an update order of the data stored in the first volume;
storing the generated data set in a first journal volume of data storage created from another portion of the first disk drives;
transmitting one or more data sets to the second storage apparatus and to the third storage apparatus;
storing the one or more generated data sets transmitted from the first storage apparatus in a second journal volume created from a portion of the second disk drives;
storing data related to the one or more data sets stored in the second journal volume in a second volume created from another portion of the second disk drives according to an update number included in the one or more generated data sets;
storing the one or more generated data sets transmitted from the first storage apparatus in a third journal volume created from a portion of the third disk drives;
storing data related to the one or more data sets stored in the third journal volume in a third volume created from another portion of the third disk drives according to another update number included in the one or more generated data sets; and
in response to a failure that occurs in the first storage apparatus, transmitting the one or more data sets stored in the second journal volume from the second storage apparatus to the third storage apparatus such that the third controller stores one or more data sets, comprising data not stored in the third volume, related to the one or more data sets transmitted from the second storage apparatus in the third volume according to the update number included in the one or more data sets stored in the second volume.

8. The method according to claim 7, the method further comprising a step of:
storing a particular data set, comprising data set not stored in the third journal volume, of the one or more data sets transmitted from the second storage apparatus in the third journal volume according to the update number stored in the second volume.

9. The method according to claim 7, the method further comprising a step of:
storing the one or more data sets transmitted from the second storage apparatus in a data volume other than the third journal volume in response to an update number of a latest data set in the third journal volume and the update number of one of the one or more data sets transmitted from the second storage apparatus are not continuous.

10. The method according to claim 7, the method further comprising a step of:
transmitting the one or more generated data sets from the first storage apparatus to the second storage apparatus in response to a read request from the second storage apparatus.

11. The method according to claim 7, the method further comprising a step of:
reading the one or more data sets from the second journal volume and storing the read one or more data sets in the second volume at a different timing from a timing at which the one or more data sets are stored in the second journal volume.

12. The method according to claim 7, the method further comprising steps of:
managing the first volume as a source volume of the third volume which is a destination volume of a replication pair; and
changing the source volume of the third volume to the second volume from the first volume when the failure occurs in the first storage apparatus.

* * * * *

UNITED STATES PATENT AND TRADEMARK OFFICE
CERTIFICATE OF CORRECTION

PATENT NO. : 8,332,361 B2
APPLICATION NO. : 13/327613
DATED : December 11, 2012
INVENTOR(S) : Toru Suzuki et al.

It is certified that error appears in the above-identified patent and that said Letters Patent is hereby corrected as shown below:

Title Page:

In the bibliographic data item (75) Inventors,

"Suzuki; Toro (Odawara, JP), Hirakawa; Yusuke (Odawara, JP), Asaka; Yoshihiro (Odawara, JP), Kondo; Shuji (Odawara, JP)"

should read,

-- Suzuki; Toru (Odawara, JP), Hirakawa; Yusuke (Odawara, JP), Asaka; Yoshihiro (Odawara, JP), Kondo; Shuji (Odawara, JP) --

Signed and Sealed this
Thirtieth Day of April, 2013

Teresa Stanek Rea
*Acting Director of the United States Patent and Trademark Office*